United States Patent
Bito et al.

(10) Patent No.: US 9,285,573 B2
(45) Date of Patent: Mar. 15, 2016

(54) ZOOM LENS SYSTEM, IMAGING DEVICE AND CAMERA

(75) Inventors: Takakazu Bito, Osaka (JP); Shinji Yamaguchi, Osaka (JP); Yasunori Tochi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/586,880

(22) Filed: Aug. 16, 2012

(65) Prior Publication Data

US 2012/0307087 A1    Dec. 6, 2012

Related U.S. Application Data

(63) Continuation of application No. PCT/JP2011/000610, filed on Feb. 3, 2011.

(30) Foreign Application Priority Data

Feb. 16, 2010    (JP) .................................. 2010-031525

(51) Int. Cl.
*G02B 27/64* (2006.01)
*G02B 15/14* (2006.01)
(Continued)

(52) U.S. Cl.
CPC .............. *G02B 15/173* (2013.01); *G02B 13/18* (2013.01); *G02B 15/14* (2013.01); *G02B 27/64* (2013.01)

(58) Field of Classification Search
CPC ...... G02B 13/009; G02B 13/18; G02B 15/14; G02B 15/173; G02B 15/28; G02B 26/64; G02B 27/646
USPC .......................................... 359/557, 686–687
See application file for complete search history.

(56) References Cited

U.S. PATENT DOCUMENTS 7,369,325 B2 * 5/2008 Sato .............................. 359/686
7,492,524 B2 * 2/2009 Ito ................................. 359/683
(Continued)

FOREIGN PATENT DOCUMENTS

JP    H04-296809 A    10/1992
JP    2000-347102 A    12/2000
(Continued)

*Primary Examiner* — Thong Nguyen
(74) *Attorney, Agent, or Firm* — James W. Judge

(57) ABSTRACT

A zoom lens system comprising: a positive first lens unit; a negative second lens unit; a positive third lens unit; and a subsequent lens unit, wherein the first to third lens units move along an optical axis in zooming, a part of the third lens unit is a third-b lens unit moving in a direction perpendicular to the optical axis, and the conditions: $1.5<(D_2+D_{3b}+D_B)/Ir<2.4$, $BF/Ir<1.45$ and $Z=f_T/f_W>9.0$ ($D_2$, $D_{3b}$: optical axial thicknesses of the second and third-b lens units, $D_B$: an optical axial total thickness of the subsequent lens units, BF: a shortest optical axial distance between an apex of a most image side lens surface and an image surface, $Ir=f_T \times \tan(\omega_T)$, $f_T$, $f_W$: focal lengths of the entire system at a telephoto limit and a wide-angle limit, $\omega_T$: a half view angle at a telephoto limit) are satisfied.

20 Claims, 25 Drawing Sheets

(51) Int. Cl.
  *G02B 15/173* (2006.01)
  *G02B 13/18* (2006.01)

(56) References Cited

U.S. PATENT DOCUMENTS

| | | | |
|---|---|---|---|
| 2009/0040625 A1* | 2/2009 | Shinohara et al. | 359/687 |
| 2009/0109546 A1* | 4/2009 | Watanabe et al. | 359/687 |
| 2009/0116121 A1* | 5/2009 | Take | 359/687 |
| 2009/0208195 A1* | 8/2009 | Hatakeyama | 396/55 |
| 2010/0220399 A1* | 9/2010 | Ohtake | 359/687 |

FOREIGN PATENT DOCUMENTS

| | | |
|---|---|---|
| JP | 2001-350093 A | 12/2001 |
| JP | 2003-295060 A | 10/2003 |
| JP | 2006-133632 A | 5/2006 |
| JP | 2006-171655 A | 6/2006 |
| JP | 2006-184413 A | 7/2006 |
| JP | 2006-184416 A | 7/2006 |
| JP | 2006-189598 A | 7/2006 |
| JP | 2006-285019 A | 10/2006 |
| JP | 2007-003554 A | 1/2007 |
| JP | 2007-010695 A | 1/2007 |
| JP | 2007-047538 A | 2/2007 |
| JP | 2007-057931 A | 3/2007 |
| JP | 2007-065525 A | 3/2007 |
| JP | 2007-068063 A | 3/2007 |
| JP | 2007-079194 A1 | 3/2007 |
| JP | 2007-122019 A | 5/2007 |
| JP | 2007-264173 A | 10/2007 |
| JP | 2007-264174 A | 10/2007 |
| JP | 2007-264390 A | 10/2007 |
| JP | 2008-032923 A | 2/2008 |
| JP | 2008-292733 A | 12/2008 |
| JP | 2009-042269 A | 2/2009 |
| JP | 2009-042270 A | 2/2009 |
| JP | 2009-042271 A | 2/2009 |
| JP | 2009-080483 A | 4/2009 |
| JP | 2009-251343 A | 10/2009 |
| JP | 2009-282439 A | 12/2009 |

* cited by examiner

ZOOM LENS SYSTEM, IMAGING DEVICE AND CAMERA

BACKGROUND

1. Field

The present disclosure relates to zoom lens systems, imaging devices, and cameras.

2. Description of the Related Art

Particularly in recent years, cameras having an image sensor for performing photoelectric conversion, such as digital still cameras, digital video cameras and the like (simply referred to as digital cameras, hereinafter) have been desired to have, in addition to a high resolution and a high zooming ratio, a blur compensating function for optically compensating image blur caused by hand blurring, vibration and the like, and a reduced thickness. So, various kinds of zoom lens systems have been proposed.

Japanese Laid-Open Patent Publication No. 2007-122019 discloses a high-magnification zoom lens, in order from an object side, comprising: a first lens unit having positive refractive power; a second lens unit having negative refractive power; a third lens unit having positive refractive power; and a fourth lens unit having positive refractive power. In this high-magnification zoom lens, the entire third lens unit is provided with a blur compensating function.

Japanese Laid-Open Patent Publication No. 2009-282439 discloses a zoom lens, in order from an object side to an image side, comprising: a first lens unit having positive refractive power; a second lens unit having negative refractive power; a third lens unit having positive refractive power as a whole, and including a third-a lens unit having positive refractive power and a third-b lens unit having negative refractive power; and a fourth lens unit having positive refractive power. In this zoom lens, the third-a lens unit is provided with a blur compensating function.

Japanese Laid-Open Patent Publication No. 2003-295060 discloses a zoom lens, in order from an object side, comprising: a first lens unit having positive refractive power; a second lens unit having negative refractive power; and a third lens unit having positive refractive power as a whole, and including a third-a lens unit having positive refractive power and a third-b lens unit having negative refractive power. In this zoom lens, the third-b lens unit is provided with a blur compensating function.

SUMMARY

The present disclosure provides: a zoom lens system that has a high resolution and a high zooming ratio, and still has a blur compensating function for optically compensating image blur caused by hand blurring, vibration and the like, and can be reduced in thickness particularly at the time of retracting; an imaging device employing the zoom lens system; and a thin and compact camera employing the imaging device.

The novel concepts disclosed herein were achieved in order to solve the foregoing problems in the related art, and herein is disclosed:

a zoom lens system comprising a plurality of lens units each composed of at least one lens element, the zoom lens system, in order from an object side to an image side, comprising:

a first lens unit having positive optical power;
a second lens unit having negative optical power;
a third lens unit having positive optical power; and
a subsequent lens unit, wherein in zooming from a wide-angle limit to a telephoto limit at the time of image taking, the first lens unit, the second lens unit, and the third lens unit are moved along an optical axis to perform magnification change, wherein a part of the third lens unit is a third-b lens unit that moves in a direction perpendicular to the optical axis to optically compensate image blur, and wherein the following conditions (2), (3) and (a)' are satisfied:

$$1.5 < (D_2 + D_{3b} + D_B)/Ir < 2.4 \quad (2)$$

$$BF/Ir < 1.45 \quad (3)$$

$$f_T/f_W > 9.0 \quad (a)'$$

where, $D_2$ is an optical axial thickness of the second lens unit,
$D_{3b}$ is an optical axial thickness of the third-b lens unit,
$D_B$ is an optical axial total thickness of the respective subsequent lens units,
BF is a shortest optical axial distance that is converted with air, between an apex of a most image side lens surface and an image surface,
Ir is a value represented by the following equation:

$$Ir = f_T \times \tan(\omega_T),$$

$f_T$ is a focal length of the entire system at a telephoto limit,
$f_W$ is a focal length of the entire system at a wide-angle limit, and
$\omega_T$ is a half view angle (°) at a telephoto limit.

The novel concepts disclosed herein were achieved in order to solve the foregoing problems in the related art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein the zoom lens system is a zoom lens system comprising a plurality of lens units each composed of at least one lens element, the zoom lens system, in order from an object side to an image side, comprising:

a first lens unit having positive optical power;
a second lens unit having negative optical power;
a third lens unit having positive optical power; and
a subsequent lens unit, wherein in zooming from a wide-angle limit to a telephoto limit at the time of image taking, the first lens unit, the second lens unit, and the third lens unit are moved along an optical axis to perform magnification change, wherein a part of the third lens unit is a third-b lens unit that moves in a direction perpendicular to the optical axis to optically compensate image blur, and wherein the following conditions (2), (3) and (a)' are satisfied:

$$1.5 < (D_2 + D_{3b} + D_B)/Ir < 2.4 \quad (2)$$

$$BF/Ir < 1.45 \quad (3)$$

$$Z = f_T/f_W > 9.0 \quad (a)'$$

where, $D_2$ is an optical axial thickness of the second lens unit,
$D_{3b}$ is an optical axial thickness of the third-b lens unit,
$D_B$ is an optical axial total thickness of the respective subsequent lens units,
BF is a shortest optical axial distance that is converted with air, between an apex of a most image side lens surface and an image surface, Ir is a value represented by the following equation:

$$Ir = f_T \times \tan(\omega_T),$$

$f_T$ is a focal length of the entire system at a telephoto limit,
$f_W$ is a focal length of the entire system at a wide-angle limit, and
$\omega_T$ is a half view angle (°) at a telephoto limit.

The novel concepts disclosed herein were achieved in order to solve the foregoing problems in the related art, and herein is disclosed:

a camera for converting an optical image of an object into an electric image signal and then performing at least one of displaying and storing of the converted image signal, comprising:

an imaging device including a zoom lens system that forms the optical image of the object, and an image sensor that converts the optical image formed by the zoom lens system into the electric image signal, wherein the zoom lens system is a zoom lens system comprising a plurality of lens units each composed of at least one lens element, the zoom lens system, in order from an object side to an image side, comprising:

a first lens unit having positive optical power;
a second lens unit having negative optical power;
a third lens unit having positive optical power; and
a subsequent lens unit, wherein in zooming from a wide-angle limit to a telephoto limit at the time of image taking, the first lens unit, the second lens unit, and the third lens unit are moved along an optical axis to perform magnification change, wherein a part of the third lens unit is a third-b lens unit that moves in a direction perpendicular to the optical axis to optically compensate image blur, and wherein the following conditions (2), (3) and (a)' are satisfied:

$$1.5 < (D_2 + D_{3b} + D_B)/Ir < 2.4 \quad (2)$$

$$BF/Ir < 1.45 \quad (3)$$

$$Z = f_T/f_W > 9.0 \quad (a)'$$

where,
$D_2$ is an optical axial thickness of the second lens unit,
$D_{3b}$ is an optical axial thickness of the third-b lens unit,
$D_B$ is an optical axial total thickness of the respective subsequent lens units,
BF is a shortest optical axial distance that is converted with air, between an apex of a most image side lens surface and an image surface,
Ir is a value represented by the following equation:

$$Ir = f_T \times \tan(\omega_T),$$

$f_T$ is a focal length of the entire system at a telephoto limit,
$f_W$ is a focal length of the entire system at a wide-angle limit, and
$\omega_T$ is a half view angle (°) at a telephoto limit.

A zoom lens system in the present disclosure has a high resolution and a high zooming ratio, and still has a blur compensating function for optically compensating image blur caused by hand blurring, vibration and the like, and can be reduced in thickness particularly at the time of retracting. An imaging device in the present disclosure employs the zoom lens system, and a camera employing the imaging device is thin and compact.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

(Embodiments 1 to 8)

FIGS. 1, 4, 7, 10, 13, 16, 19 and 22 are lens arrangement diagrams of zoom lens systems according to Embodiments 1 to 8, respectively.

Figure 13:
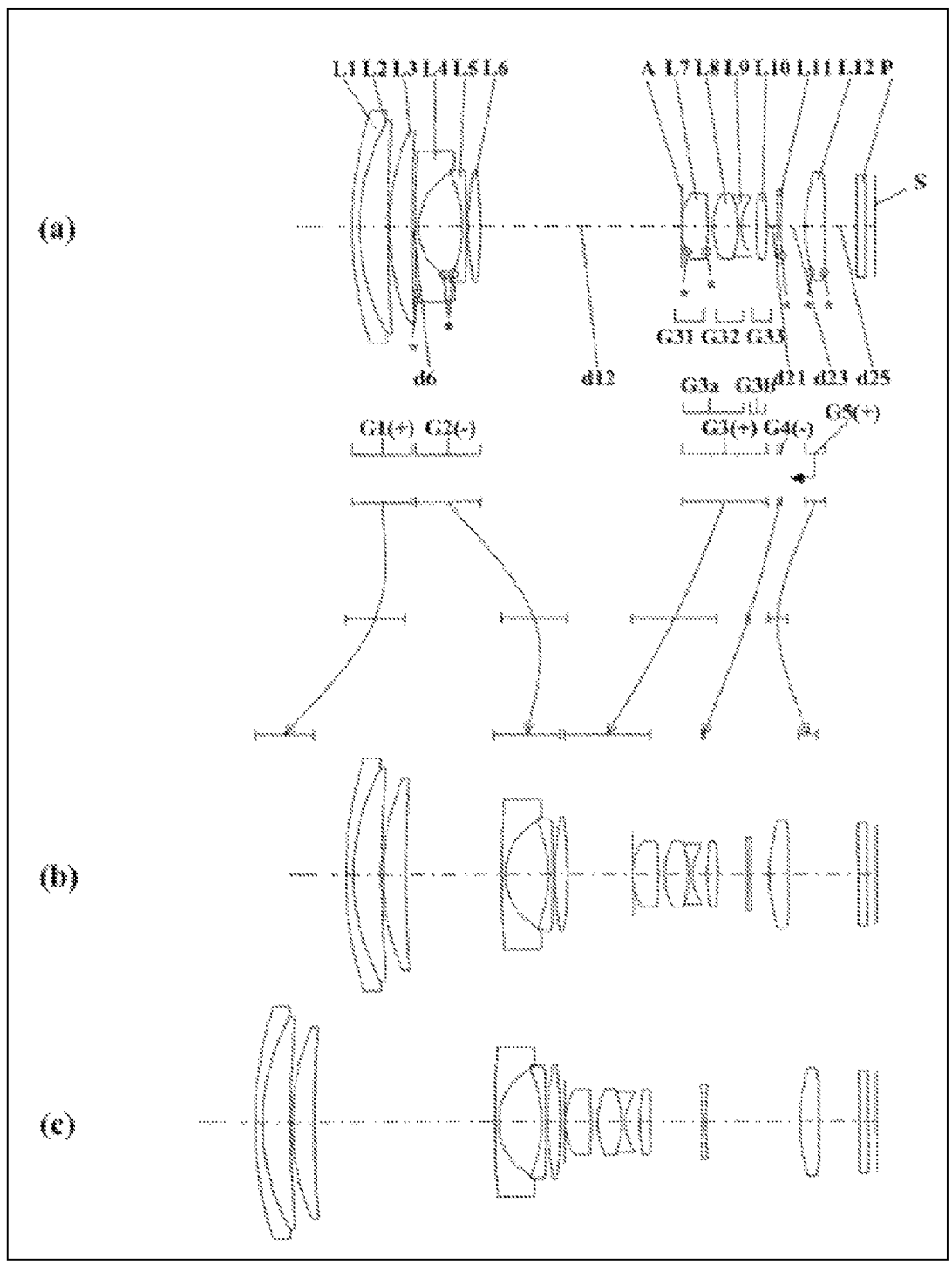
FIG. 13 is a lens arrangement diagram showing an infinity in-focus condition of a zoom lens system according to Embodiment 5 (Numerical Example 5)
Figure 14:
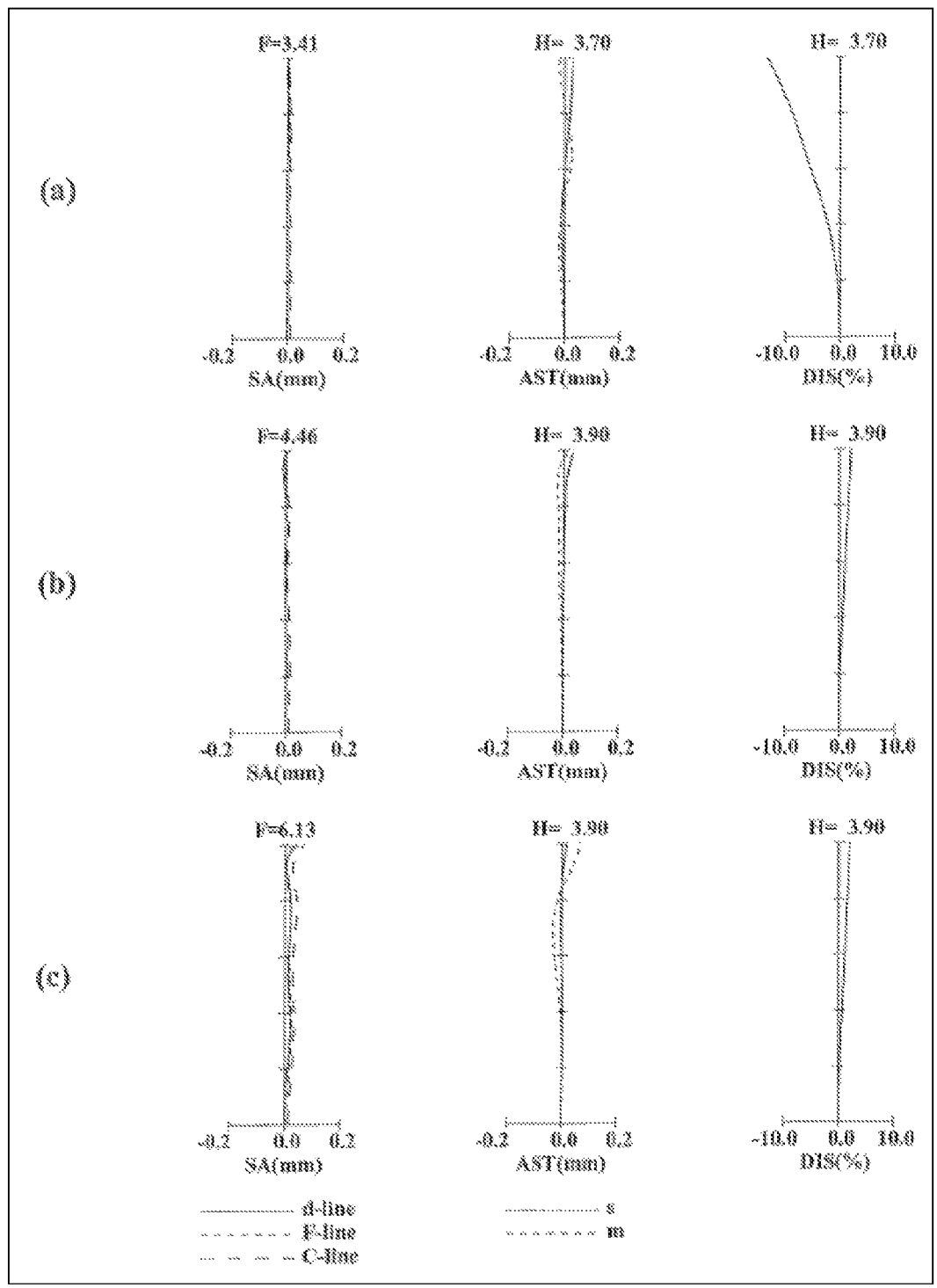
FIG. 14 is a longitudinal aberration diagram of an infinity in-focus condition of a zoom lens system according to Numerical Example 5.
Figure 15:
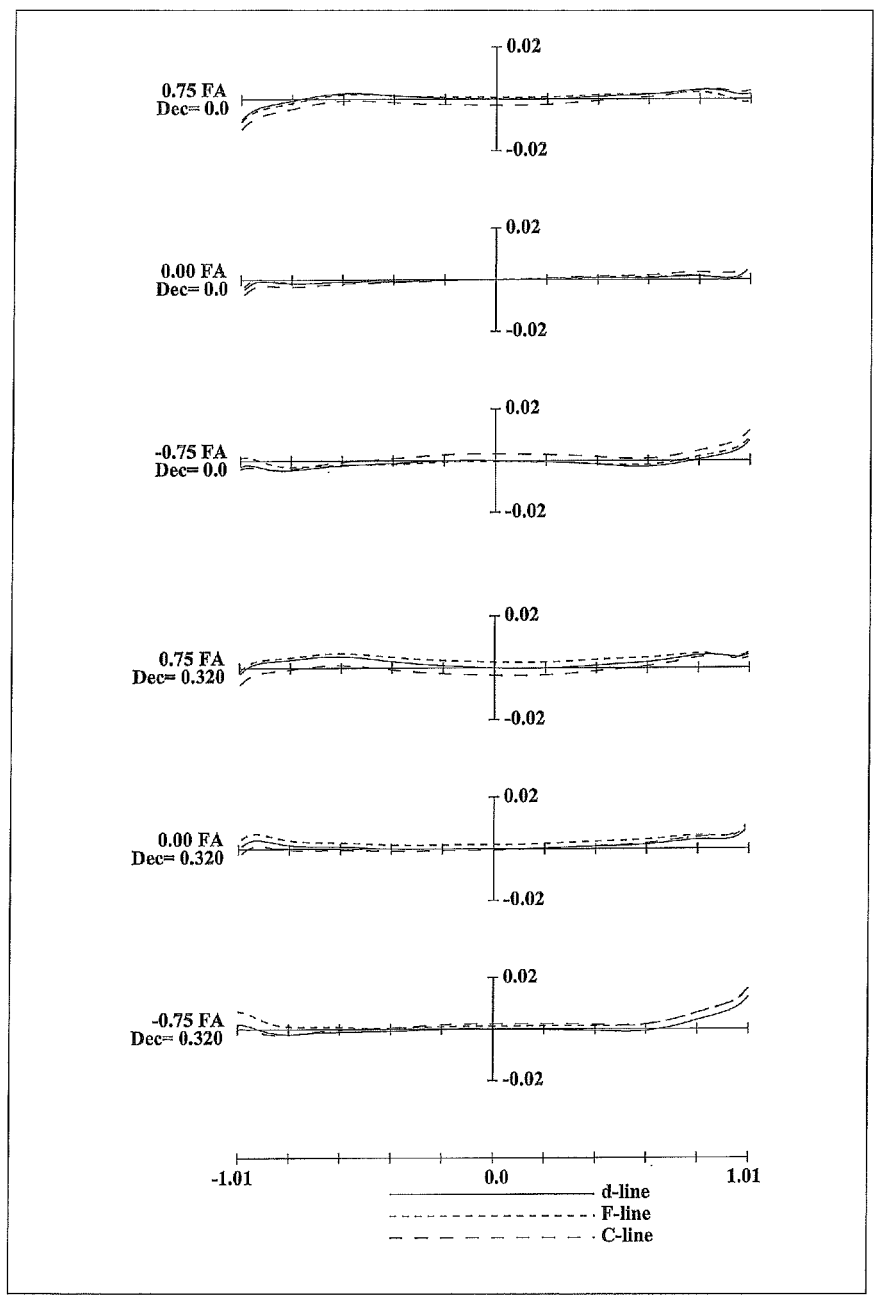
FIG. 15 is a lateral aberration diagram of a zoom lens system according to Numerical Example 5 at a telephoto limit in a basic state where image blur compensation is not performed and in an image blur compensation state.
Figure 16:
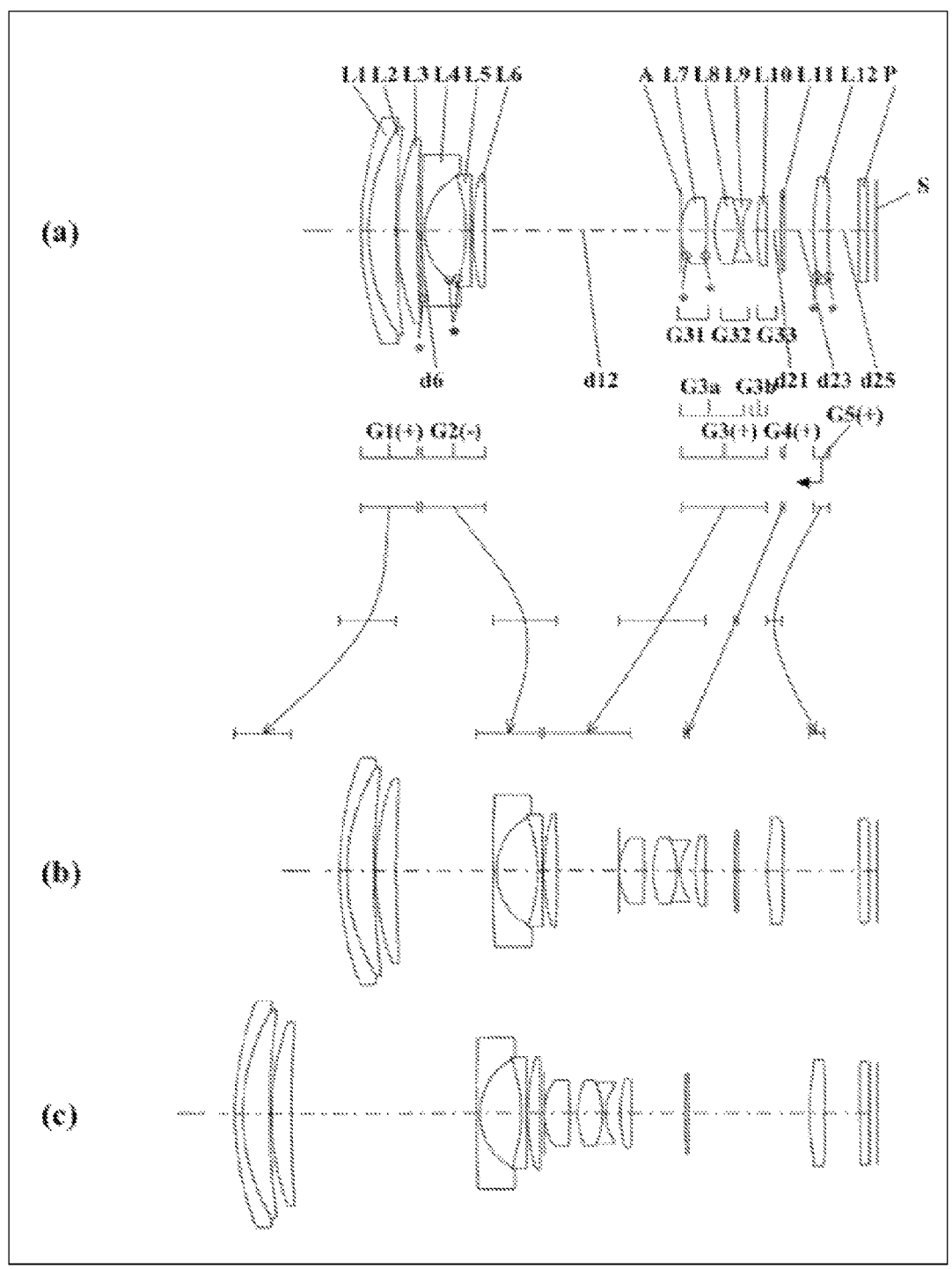
FIG. 16 is a lens arrangement diagram showing an infinity in-focus condition of a zoom lens system according to Embodiment 6 (Numerical Example 6)
Figure 17:
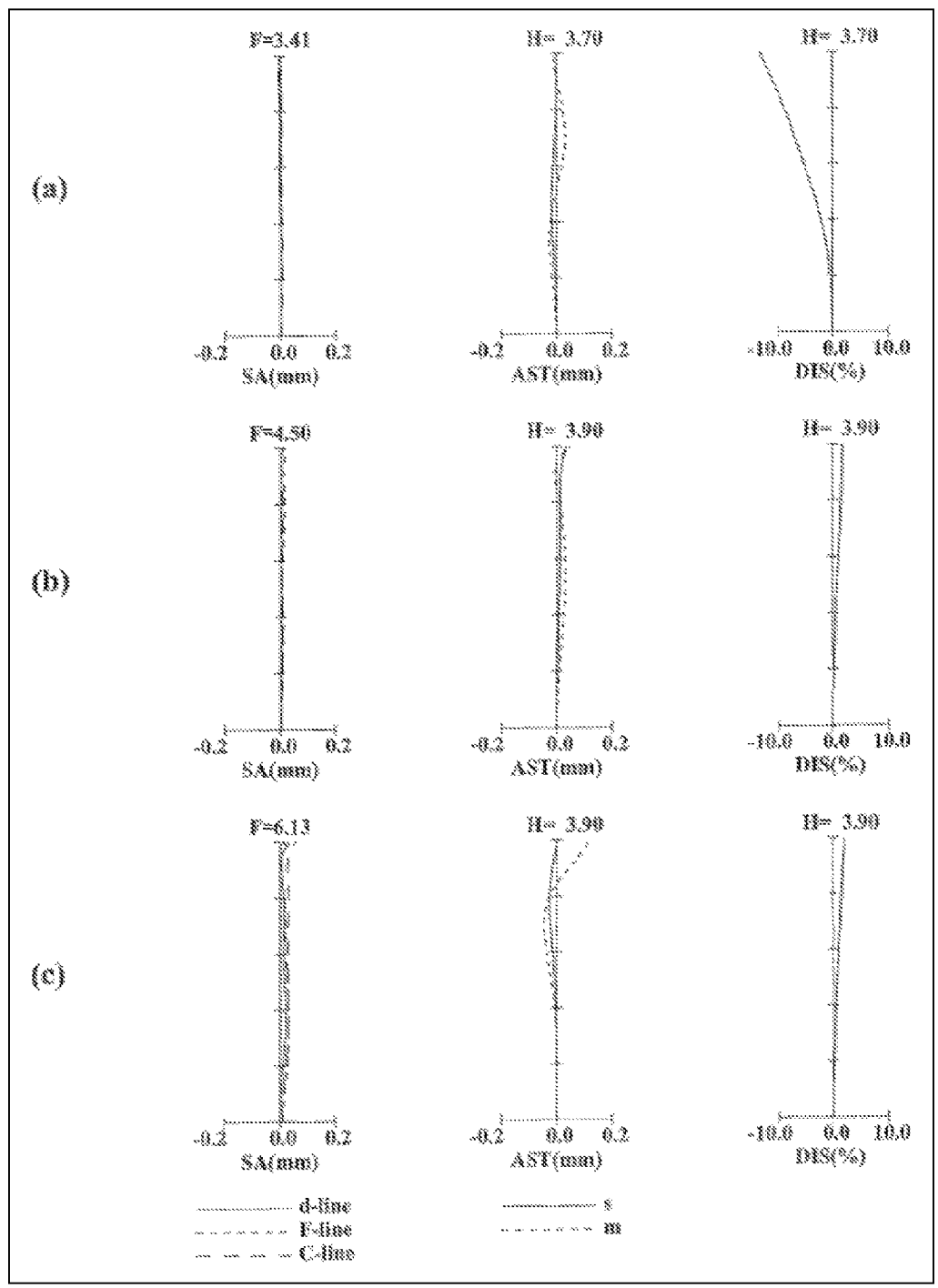
FIG. 17 is a longitudinal aberration diagram of an infinity in-focus condition of a zoom lens system according to Numerical Example 6.
Figure 18:
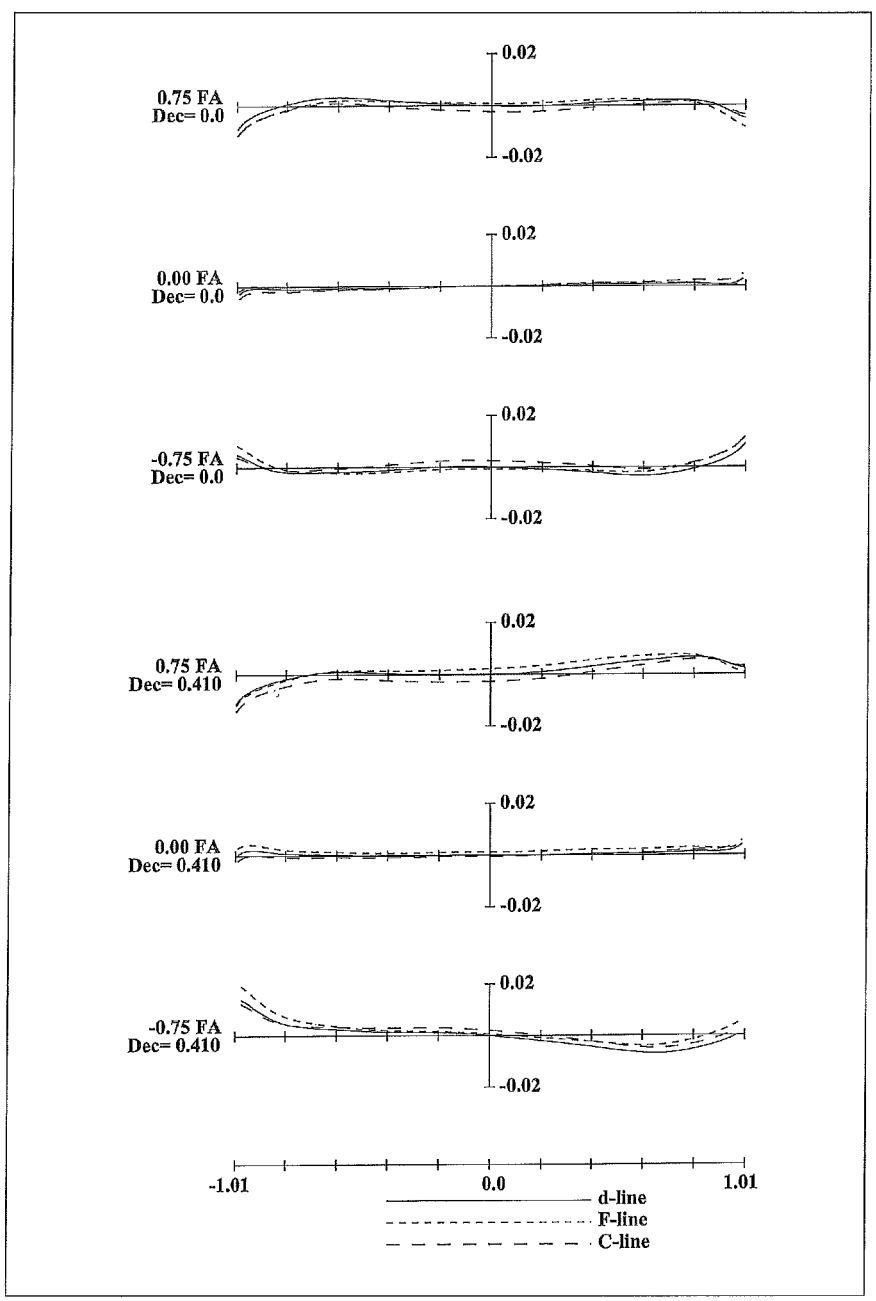
FIG. 18 is a lateral aberration diagram of a zoom lens system according to Numerical Example 6 at a telephoto limit in a basic state where image blur compensation is not performed and in an image blur compensation state.

Each of FIGS. 1, 4, 7, 10, 13, 16, 19 and 22 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., an arrow of a straight or curved line provided between part (a) and part (b) indicates the movement of each lens unit from a wide-angle limit through a middle position to a telephoto limit. Furthermore, in each Fig., an arrow imparted to a lens unit indicates focusing from an infinity in-focus condition to a close-object in-focus condition. That is, in FIGS. 1, 4, 7, 10, 19 and 22, the arrow indicates the direction in which a fourth lens unit G4 described later moves in focusing from the infinity in-focus condition to the close-object in-focus condition. In FIGS. 13 and 16, the arrow indicates the direction in which a fifth lens unit G5 described later moves in focusing from the infinity in-focus condition to the close-object in-focus condition.

Each of the zoom lens systems according to Embodiments 1 to 4 and 8, in order from the object side to the image side, comprises: a first lens unit G1 having positive optical power; a second lens unit G2 having negative optical power; a third lens unit G3 having positive optical power; and a fourth lens unit G4 having positive optical power. In the zoom lens system according to each embodiment, at the time of zooming, all the lens units move in a direction along the optical axis such that the intervals between the lens units, that is, the interval between the first lens unit G1 and the second lens unit G2, the interval between the second lens unit G2 and the third lens unit G3, and the interval between the third lens unit G3 and the fourth lens unit G4 all vary. In the zoom lens system according to each embodiment, by arranging these lens units in a desired optical power configuration, size reduction in the entire lens system is achieved while maintaining high optical performance.

Each of the zoom lens systems according to Embodiments 5 to 7, in order from the object side to the image side, comprises: a first lens unit G1 having positive optical power; a second lens unit G2 having negative optical power; a third lens unit G3 having positive optical power; a fourth lens unit G4; and a fifth lens unit G5 having positive optical power. In the zoom lens system according to Embodiment 5, the fourth lens unit G4 has negative optical power. In the zoom lens systems according to Embodiments 6 and 7, the fourth lens unit G4 has positive optical power. In the zoom lens system according to each embodiment, at the time of zooming, all the lens units move in a direction along the optical axis such that the intervals between the lens units, that is, the interval between the first lens unit G1 and the second lens unit G2, the interval between the second lens unit G2 and the third lens unit G3, the interval between the third lens unit G3 and the fourth lens unit G4, and the interval between the fourth lens unit G4 and the fifth lens unit G5 all vary. In the zoom lens system according to each embodiment, by arranging these lens units in a desired optical power configuration, size reduction in the entire lens system is achieved while maintaining high optical performance.

Figure 19:
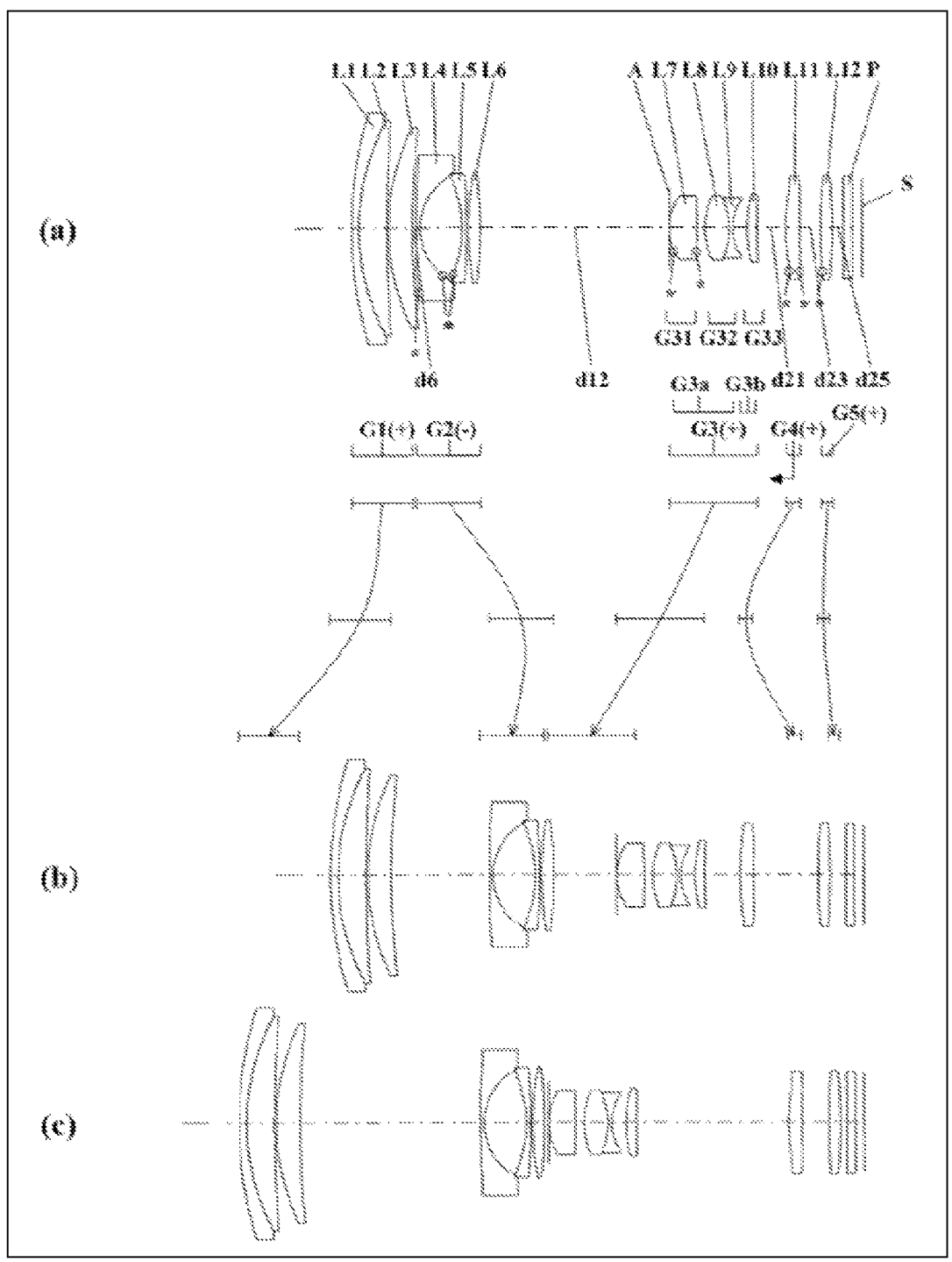
FIG. 19 is a lens arrangement diagram showing an infinity in-focus condition of a zoom lens system according to Embodiment 7 (Numerical Example 7)
Figure 20:
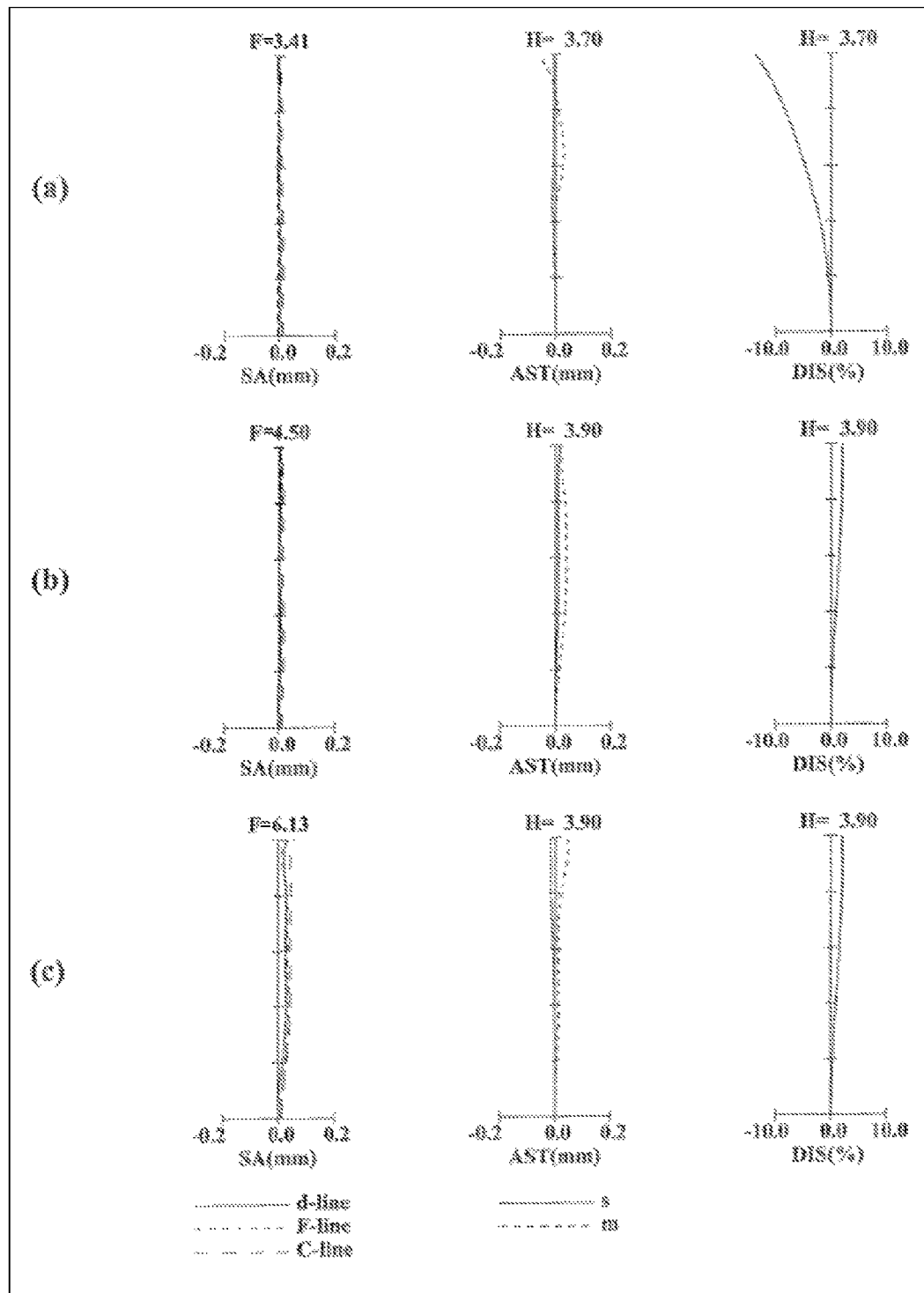
FIG. 20 is a longitudinal aberration diagram of an infinity in-focus condition of a zoom lens system according to Numerical Example 7.
Figure 21:
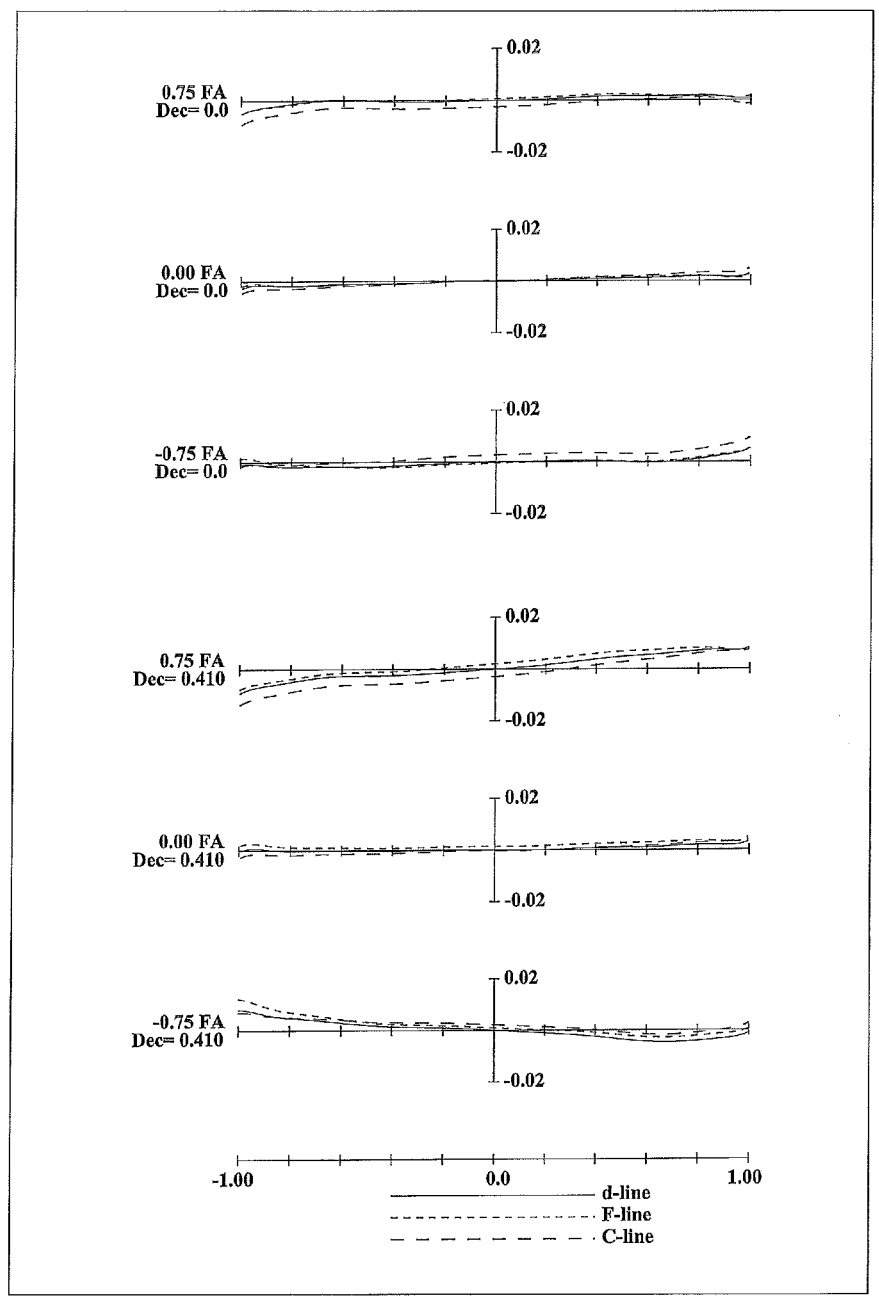
FIG. 21 is a lateral aberration diagram of a zoom lens system according to Numerical Example 7 at a telephoto limit in a basic state where image blur compensation is not performed and in an image blur compensation state.

In FIGS. 1, 4, 7, 10, 13, 16, 19 and 22, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (FIGS. 1, 4, 7, 10 and 22: between the image surface S and the most image side lens surface in the fourth lens unit G4; FIGS. 13, 16 and 19: between the image surface S and the most image side lens surface in the fifth lens unit G5), a plane parallel plate P equivalent to an optical low-pass filter or a face plate of an image sensor is provided.

Further, in FIGS. 1, 4, 7, 10, 13, 16, 19 and 22, an aperture diaphragm A is provided on the most object side of the third lens unit G3, that is, between the second lens unit G2 and the third lens unit G3. In zooming from a wide-angle limit to a telephoto limit at the time of image taking, the aperture diaphragm A moves along the optical axis to the object side, integrally with the third lens unit G3.

(Embodiment 1)

Figure 1:
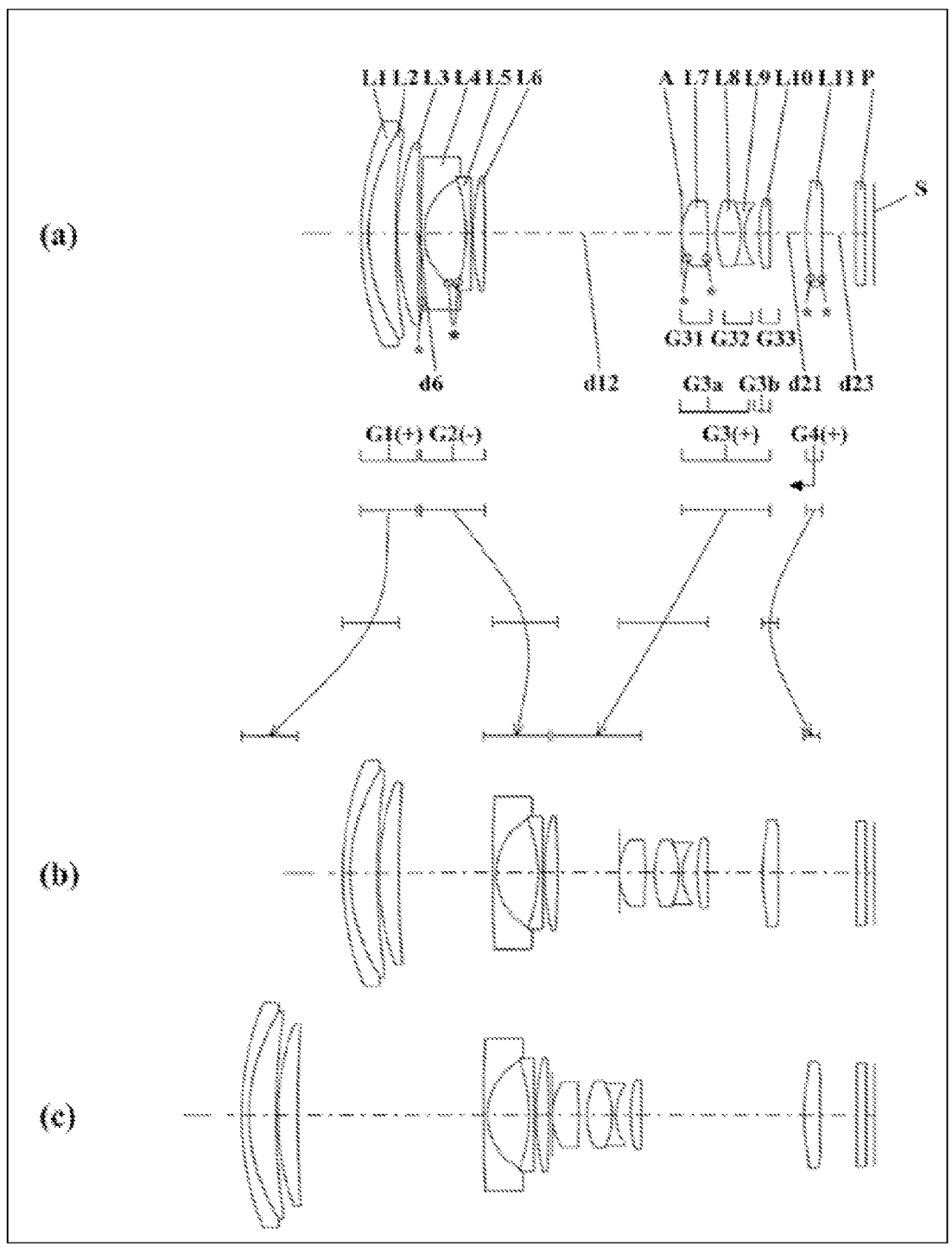
FIG. 1 is a lens arrangement diagram showing an infinity in-focus condition of a zoom lens system according to Embodiment 1 (Numerical Example 1)
Figure 2:
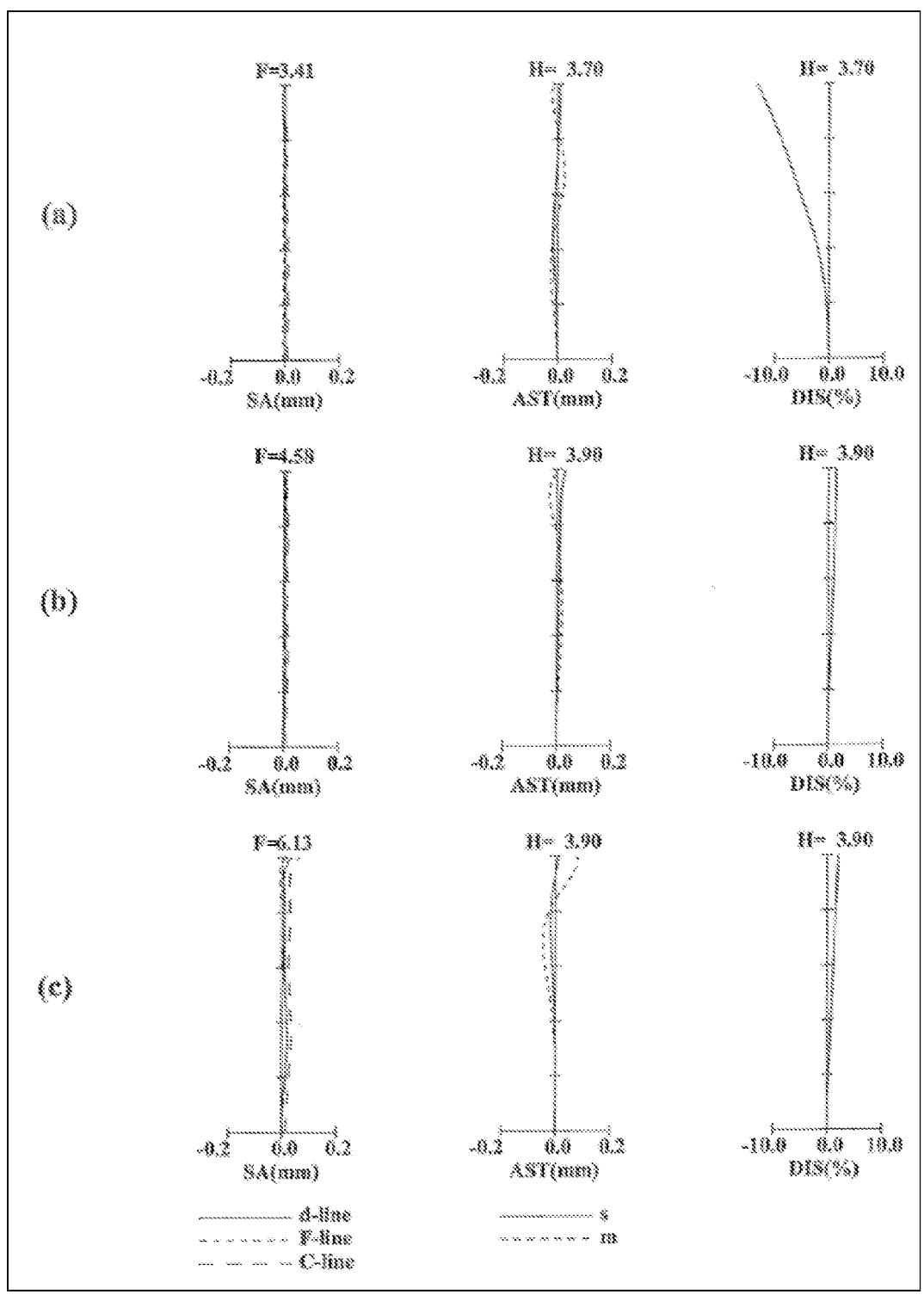
FIG. 2 is a longitudinal aberration diagram of an infinity in-focus condition of a zoom lens system according to Numerical Example 1.
Figure 3:
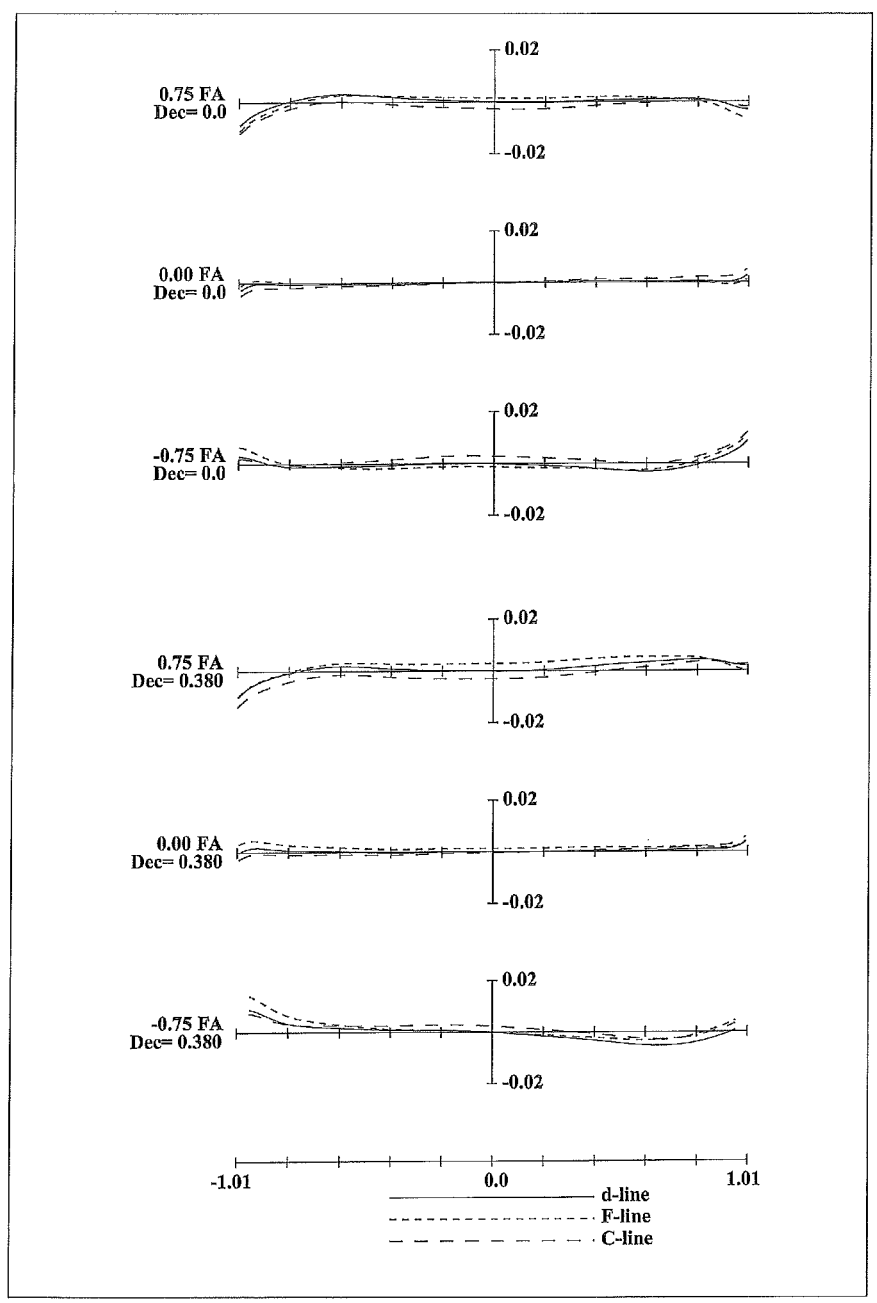
FIG. 3 is a lateral aberration diagram of a zoom lens system according to Numerical Example 1 at a telephoto limit in a basic state where image blur compensation is not performed and in an image blur compensation state.

As shown in FIG. 1, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a bi-concave fifth lens element L5; and a bi-convex sixth lens element L6. Among these, the fourth lens element L4 has two aspheric surfaces. The fifth lens element L5 has an aspheric object side surface.

The third lens unit G3, in order from the object side to the image side, comprises: a bi-convex seventh lens element L7; a bi-convex eighth lens element L8, a bi-concave ninth lens element L9; and a positive meniscus tenth lens element L10 with the convex surface facing the object side. Among these, the eighth lens element L8 and the ninth lens element L9 are cemented with each other. In the surface data of the corresponding Numerical Example described later, surface number 17 is imparted to an adhesive layer between the eighth lens element L8 and the ninth lens element L9. The seventh lens element L7 has two aspheric surfaces.

The third lens unit G3, as described later, consists of a third-a lens unit G3a and a third-b lens unit G3b in order from the object side to the image side. The third-a lens unit G3a, in order from the object side to the image side, comprises the seventh lens element L7, the eighth lens element L8, and the ninth lens element L9. The third-b lens unit G3b comprises solely the tenth lens element L10.

The fourth lens unit G4 comprises solely a positive meniscus eleventh lens element L11 with the convex surface facing the object side. The eleventh lens element L11 has two aspheric surfaces.

In the zoom lens system according to Embodiment 1, a plane parallel plate P is provided on the object side relative to the image surface S (between the image surface S and the eleventh lens element L11).

In the zoom lens system according to Embodiment 1, in zooming from a wide-angle limit to a telephoto limit at the time of image taking, the first lens unit G1 and the third lens unit G3 move to the object side, the second lens unit G2 moves to the image side with locus of a convex to the image side, and the fourth lens unit G4 moves with locus of a convex to the object side such that the position thereof at the telephoto limit is almost the same as the position at the wide-angle limit. That is, in zooming, the respective lens units individually move along the optical axis such that the interval between the first lens unit G1 and the second lens unit G2 increases, the interval between the second lens unit G2 and the third lens unit G3 decreases, and the interval between the third lens unit G3 and the fourth lens unit G4 increases.

(Embodiment 2)

Figure 4:
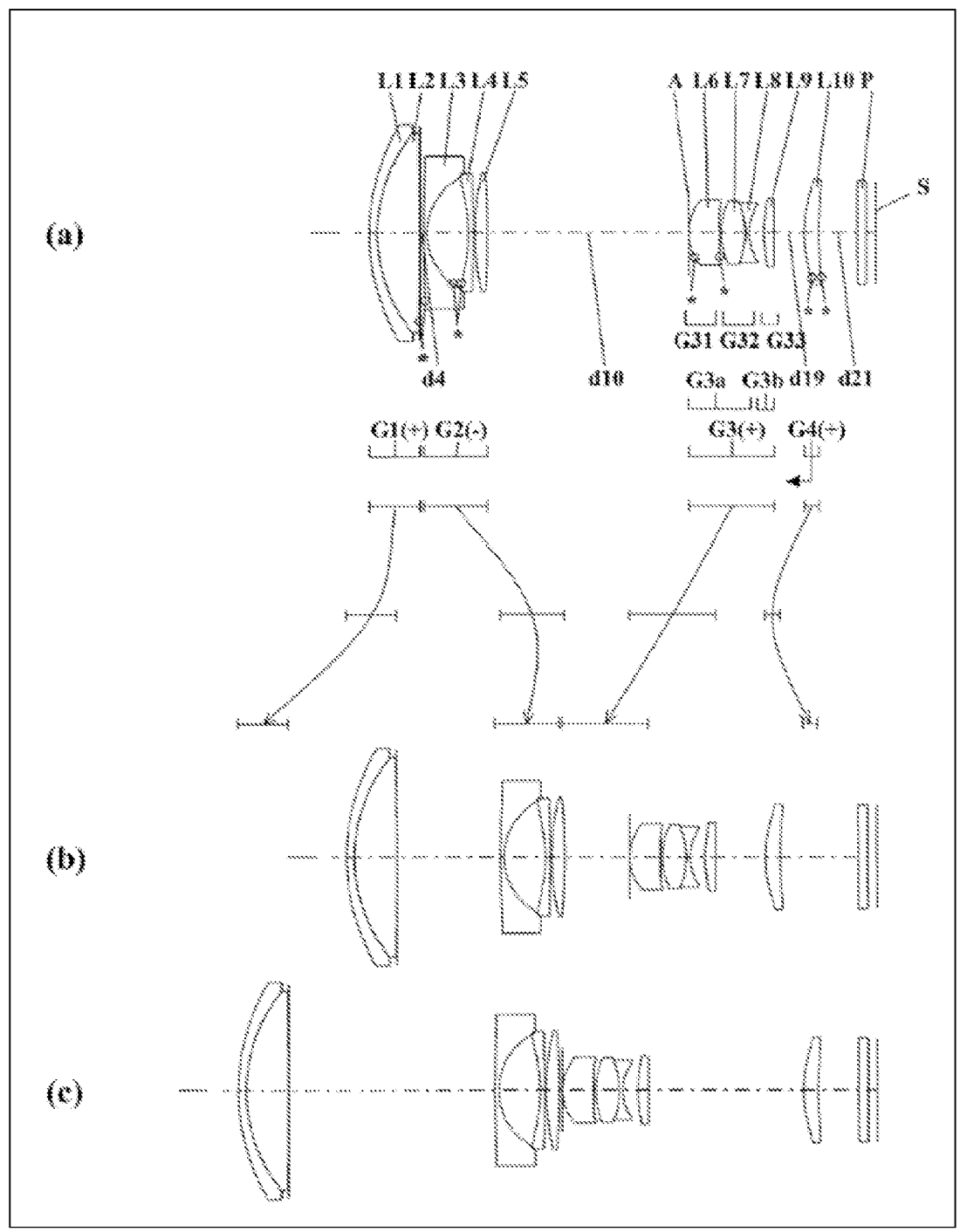
FIG. 4 is a lens arrangement diagram showing an infinity in-focus condition of a zoom lens system according to Embodiment 2 (Numerical Example 2)
Figure 5:
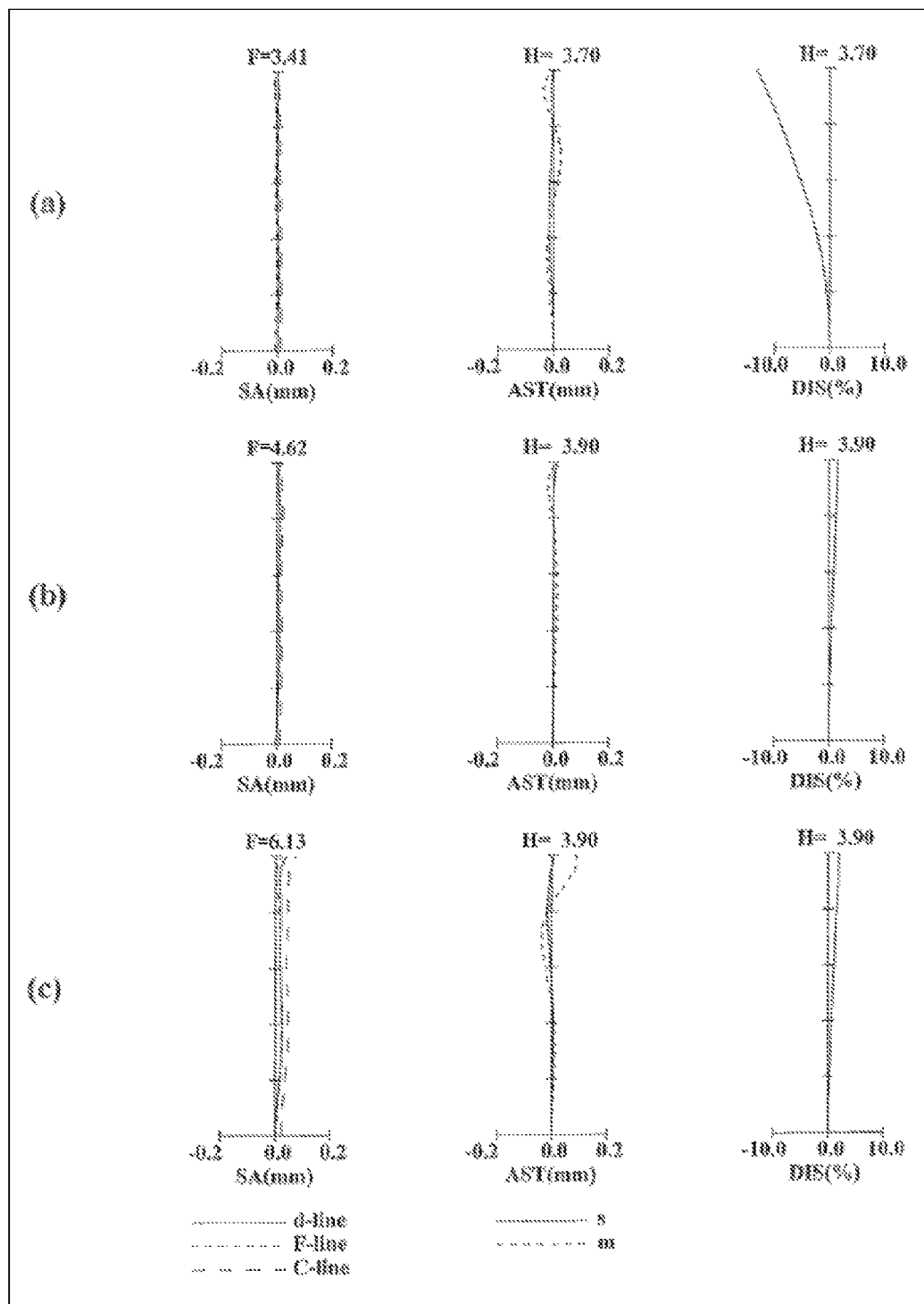
FIG. 5 is a longitudinal aberration diagram of an infinity in-focus condition of a zoom lens system according to Numerical Example 2.
Figure 6:
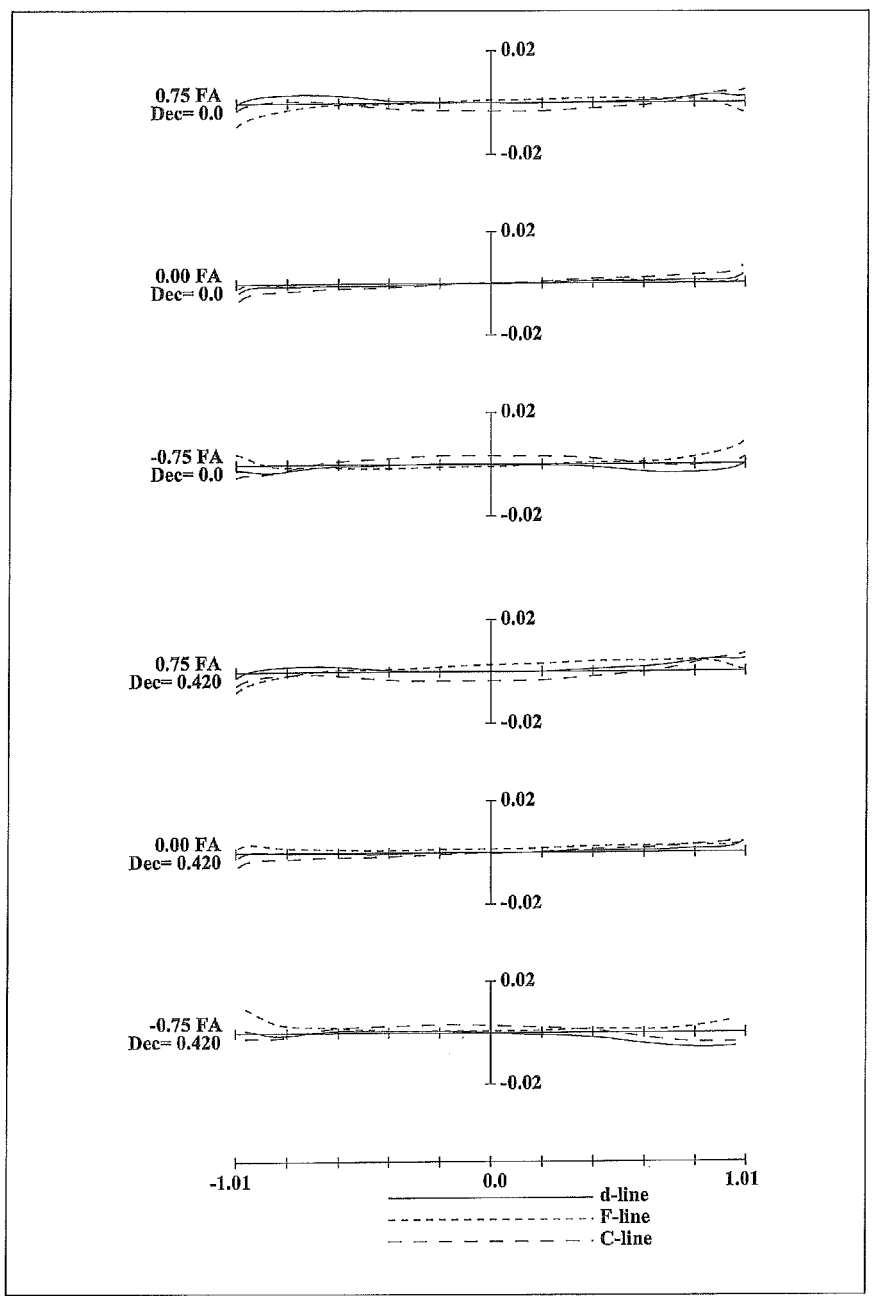
FIG. 6 is a lateral aberration diagram of a zoom lens system according to Numerical Example 2 at a telephoto limit in a basic state where image blur compensation is not performed and in an image blur compensation state.

As shown in FIG. 4, the first lens unit G1, in order from the object side to the image side, comprises: a negative meniscus first lens element L1 with the convex surface facing the object side; and a bi-convex second lens element L2. The first lens element L1 and the second lens element L2 are cemented with each other. In the surface data of the corresponding Numerical Example described later, surface number 2 is imparted to an adhesive layer between the first lens element L1 and the second lens element L2. Further, the second lens element L2 has an aspheric image side surface.

The second lens unit G2, in order from the object side to the image side, comprises: a negative meniscus third lens element L3 with the convex surface facing the object side; a negative meniscus fourth lens element L4 with the convex surface facing the image side; and a bi-convex fifth lens element L5. Among these, the third lens element L3 has two aspheric surfaces. The fourth lens element L4 has an aspheric object side surface.

The third lens unit G3, in order from the object side to the image side, comprises: a bi-convex sixth lens element L6; a bi-convex seventh lens element L7, a bi-concave eighth lens element L8; and a bi-convex ninth lens element L9. Among these, the seventh lens element L7 and the eighth lens element L8 are cemented with each other. In the surface data of the corresponding Numerical Example described later, surface number 15 is imparted to an adhesive layer between the seventh lens element L7 and the eighth lens element L8. The sixth lens element L6 has two aspheric surfaces.

The third lens unit G3, as described later, consists of a third-a lens unit G3a and a third-b lens unit G3b in order from the object side to the image side. The third-a lens unit G3a, in order from the object side to the image side, comprises the sixth lens element L6, the seventh lens element L7, and the eighth lens element L8. The third-b lens unit G3b comprises solely the ninth lens element L9.

The fourth lens unit G4 comprises solely a positive meniscus tenth lens element L10 with the convex surface facing the object side. The tenth lens element L10 has two aspheric surfaces.

In the zoom lens system according to Embodiment 2, a plane parallel plate P is provided on the object side relative to the image surface S (between the image surface S and the tenth lens element L10).

In the zoom lens system according to Embodiment 2, in zooming from a wide-angle limit to a telephoto limit at the time of image taking, the first lens unit G1 and the third lens unit G3 move to the object side, the second lens unit G2 moves to the image side with locus of a convex to the image side, and the fourth lens unit G4 moves with locus of a convex to the object side such that the position thereof at the telephoto limit is almost the same as the position at the wide-angle limit. That is, in zooming, the respective lens units individually move along the optical axis such that the interval between the first lens unit G1 and the second lens unit G2 increases, the interval between the second lens unit G2 and the third lens unit G3 decreases, and the interval between the third lens unit G3 and the fourth lens unit G4 increases.

(Embodiment 3)

Figure 7:
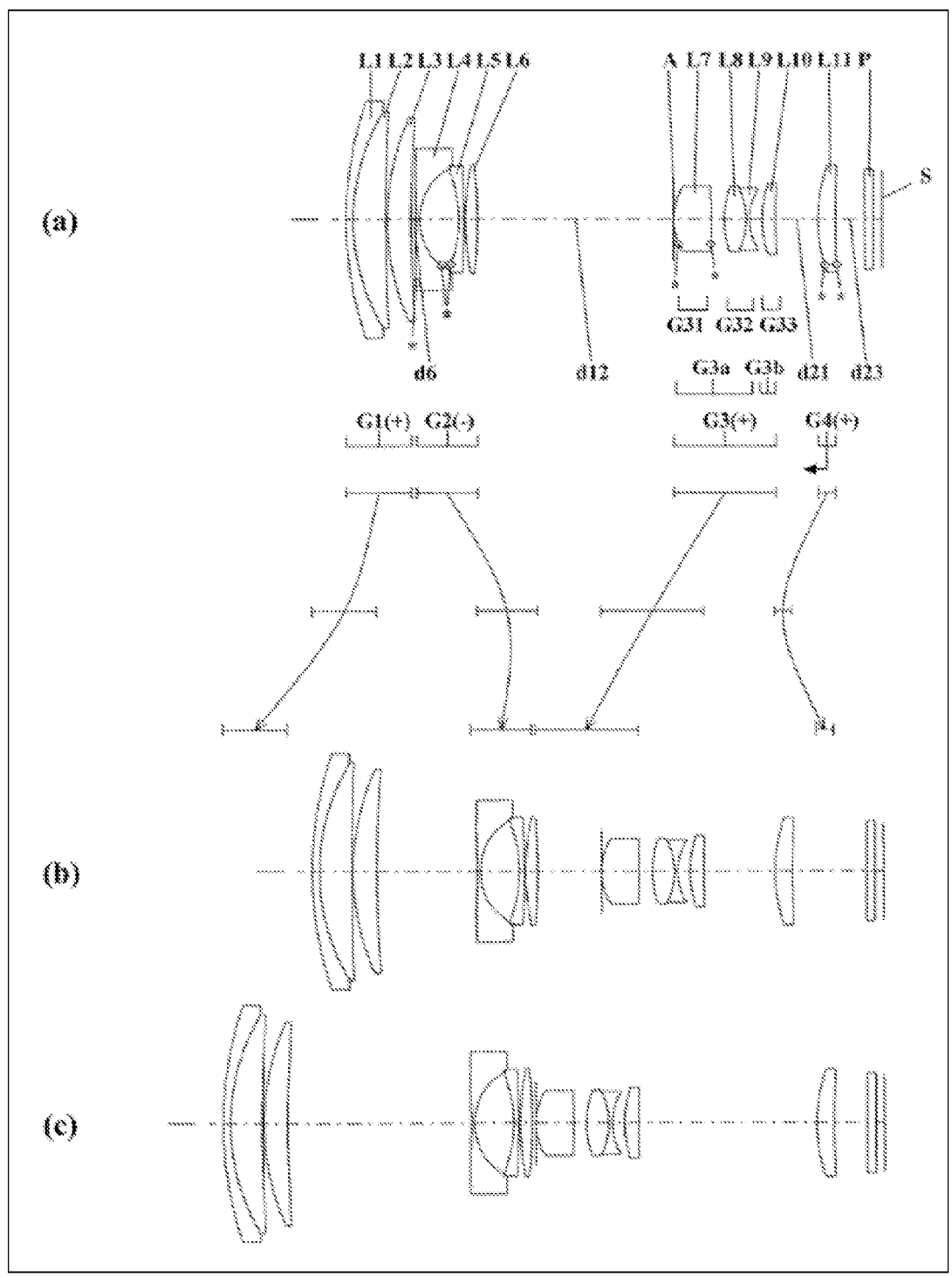
FIG. 7 is a lens arrangement diagram showing an infinity in-focus condition of a zoom lens system according to Embodiment 3 (Numerical Example 3)
Figure 8:
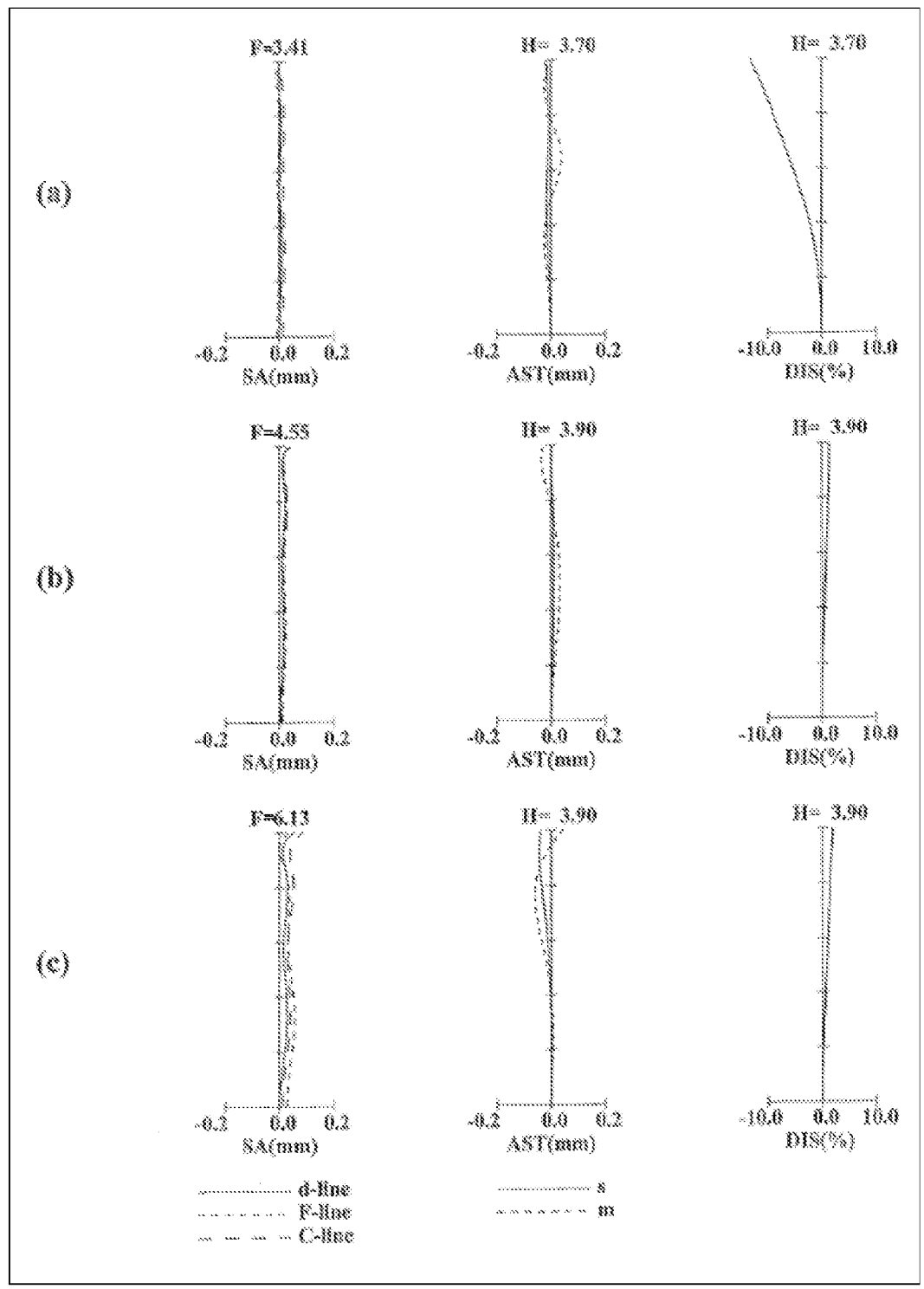
FIG. 8 is a longitudinal aberration diagram of an infinity in-focus condition of a zoom lens system according to Numerical Example 3.
Figure 9:
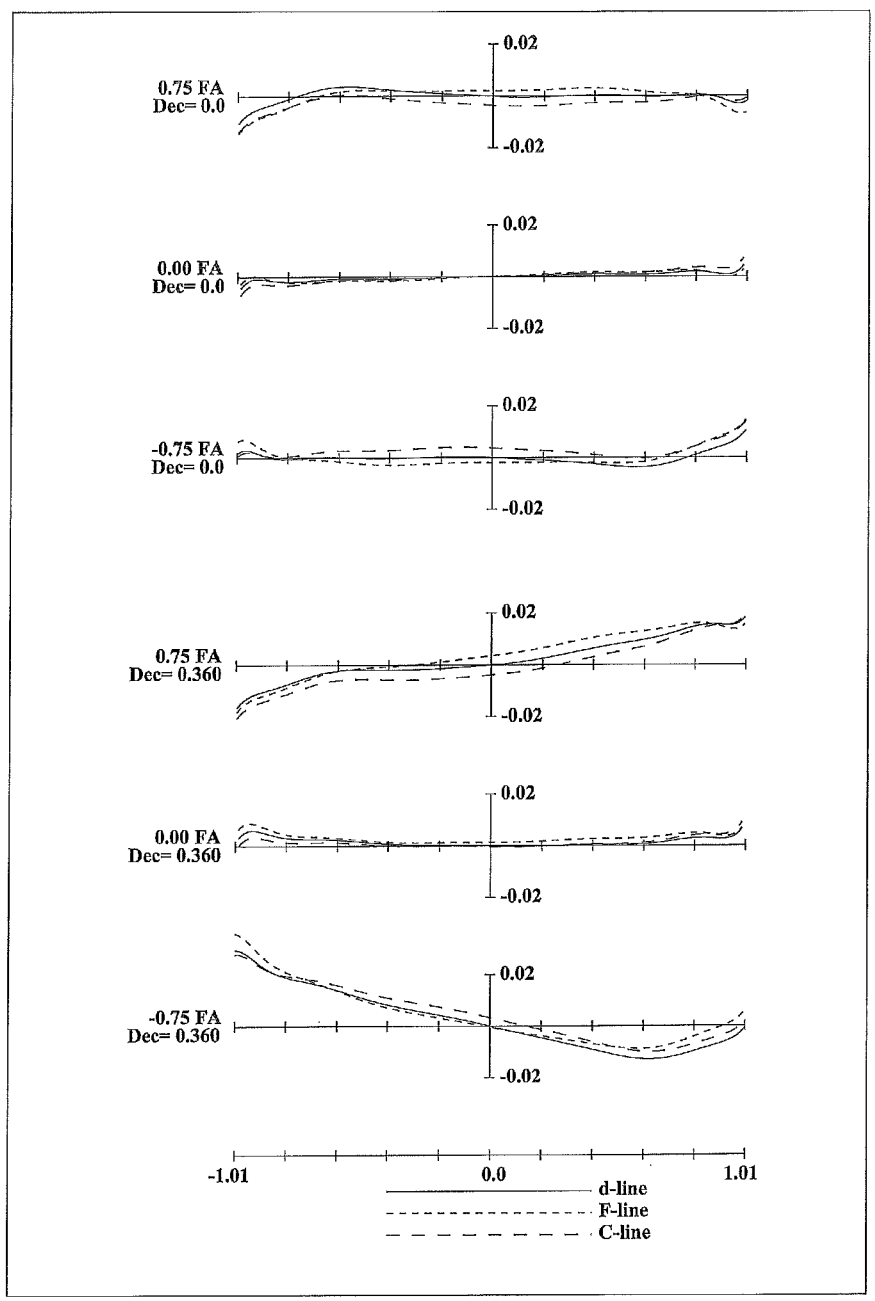
FIG. 9 is a lateral aberration diagram of a zoom lens system according to Numerical Example 3 at a telephoto limit in a basic state where image blur compensation is not performed and in an image blur compensation state.

As shown in FIG. 7, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a bi-concave fourth lens element L4; a negative meniscus fifth lens element L5 with the convex surface facing the image side; and a bi-convex sixth lens element L6. Among these, the fourth lens element L4 has two aspheric surfaces. The fifth lens element L5 has an aspheric object side surface.

The third lens unit G3, in order from the object side to the image side, comprises: a bi-convex seventh lens element L7; a bi-convex eighth lens element L8, a bi-concave ninth lens element L9; and a positive meniscus tenth lens element L10 with the convex surface facing the object side. Among these, the eighth lens element L8 and the ninth lens element L9 are cemented with each other. In the surface data of the corresponding Numerical Example described later, surface number 17 is imparted to an adhesive layer between the eighth lens element L8 and the ninth lens element L9. The seventh lens element L7 has two aspheric surfaces.

The third lens unit G3, as described later, consists of a third-a lens unit G3a and a third-b lens unit G3b in order from the object side to the image side. The third-a lens unit G3a, in order from the object side to the image side, comprises the seventh lens element L7, the eighth lens element L8, and the ninth lens element L9. The third-b lens unit G3b comprises solely the tenth lens element L10.

The fourth lens unit G4 comprises solely a positive meniscus eleventh lens element L11 with the convex surface facing the object side. The eleventh lens element L11 has two aspheric surfaces.

In the zoom lens system according to Embodiment 3, a plane parallel plate P is provided on the object side relative to the image surface S (between the image surface S and the eleventh lens element L11).

In the zoom lens system according to Embodiment 3, in zooming from a wide-angle limit to a telephoto limit at the time of image taking, the first lens unit G1 and the third lens unit G3 move to the object side, the second lens unit G2 moves to the image side with locus of a convex to the image side, and the fourth lens unit G4 moves with locus of a convex to the object side such that the position thereof at the telephoto limit is almost the same as the position at the wide-angle limit. That is, in zooming, the respective lens units individually move along the optical axis such that the interval between the first lens unit G1 and the second lens unit G2 increases, the interval between the second lens unit G2 and the third lens unit G3 decreases, and the interval between the third lens unit G3 and the fourth lens unit G4 increases.

(Embodiment 4)

Figure 10:
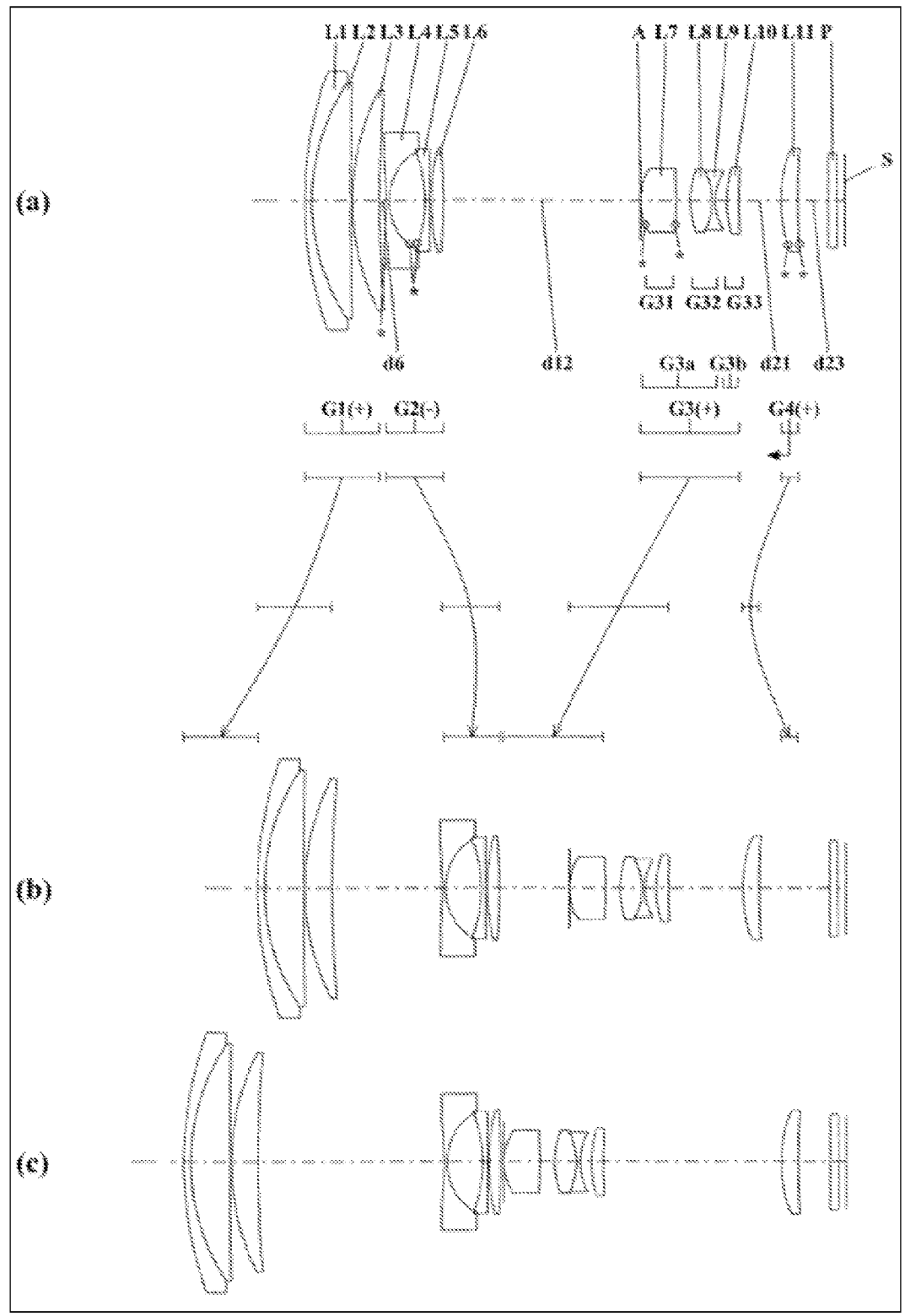
FIG. 10 is a lens arrangement diagram showing an infinity in-focus condition of a zoom lens system according to Embodiment 4 (Numerical Example 4)
Figure 11:
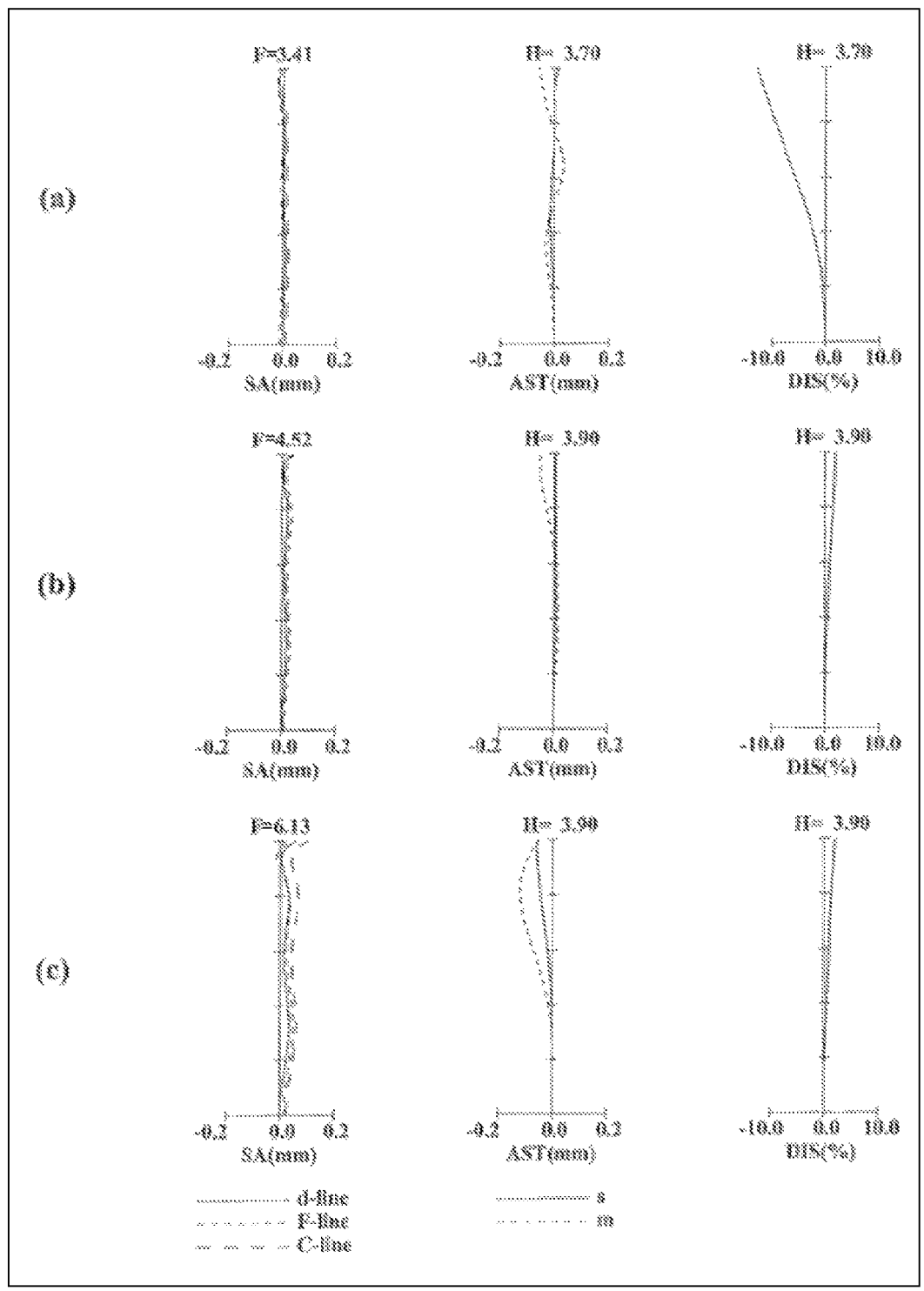
FIG. 11 is a longitudinal aberration diagram of an infinity in-focus condition of a zoom lens system according to Numerical Example 4.
Figure 12:
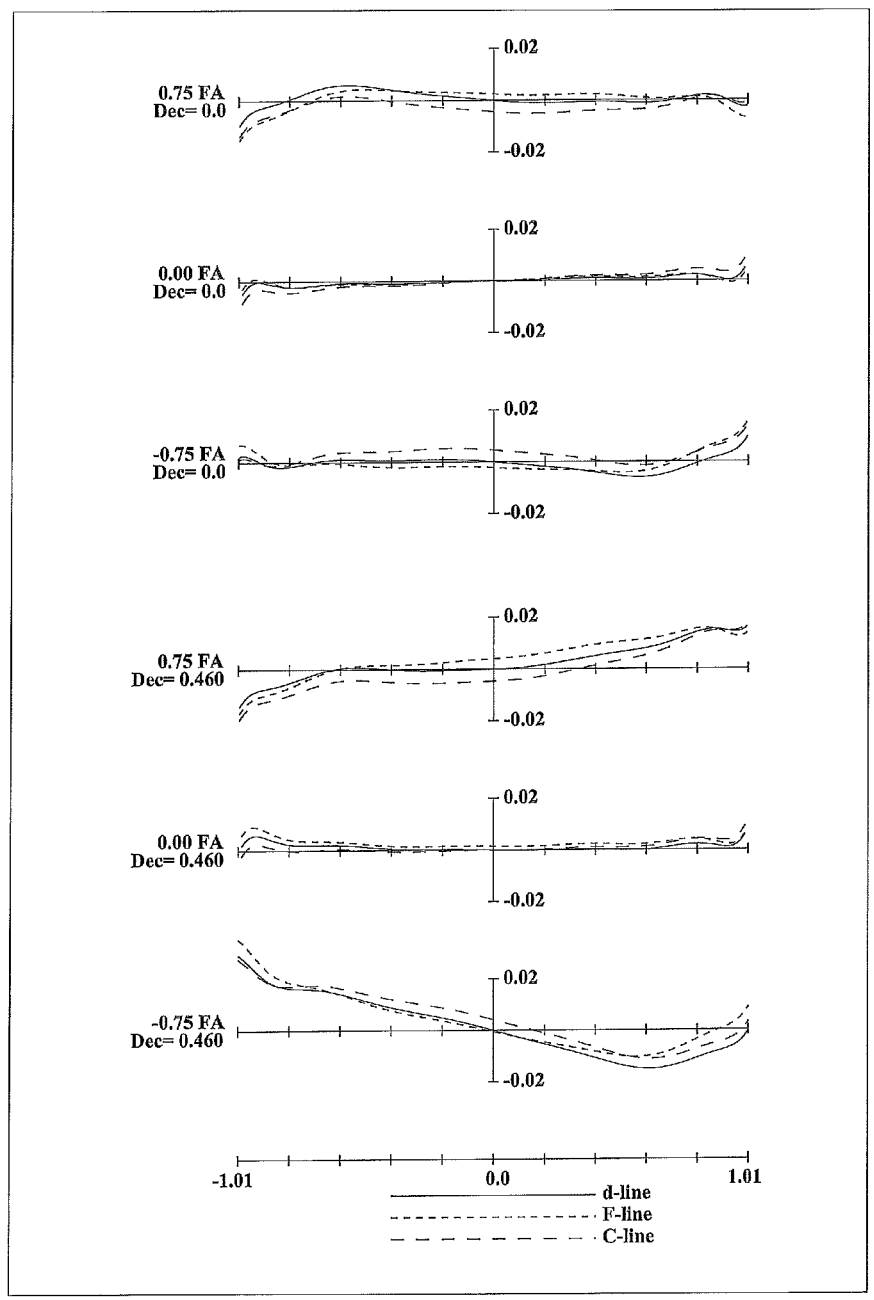
FIG. 12 is a lateral aberration diagram of a zoom lens system according to Numerical Example 4 at a telephoto limit in a basic state where image blur compensation is not performed and in an image blur compensation state.

As shown in FIG. 10, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a bi-concave fourth lens element L4; a bi-concave fifth lens element L5; and a bi-convex sixth lens element L6. Among these, the fourth lens element L4 has two aspheric surfaces. The fifth lens element L5 has an aspheric object side surface.

The third lens unit G3, in order from the object side to the image side, comprises: a bi-convex seventh lens element L7; a bi-convex eighth lens element L8, a bi-concave ninth lens element L9; and a positive meniscus tenth lens element L10 with the convex surface facing the object side. Among these, the eighth lens element L8 and the ninth lens element L9 are cemented with each other. In the surface data of the corresponding Numerical Example described later, surface number 17 is imparted to an adhesive layer between the eighth lens element L8 and the ninth lens element L9. The seventh lens element L7 has two aspheric surfaces.

The third lens unit G3, as described later, consists of a third-a lens unit G3a and a third-b lens unit G3b in order from the object side to the image side. The third-a lens unit G3a, in order from the object side to the image side, comprises the seventh lens element L7, the eighth lens element L8, and the ninth lens element L9. The third-b lens unit G3b comprises solely the tenth lens element L10.

The fourth lens unit G4 comprises solely a positive meniscus eleventh lens element L11 with the convex surface facing the object side. The eleventh lens element L11 has two aspheric surfaces.

In the zoom lens system according to Embodiment 4, a plane parallel plate P is provided on the object side relative to the image surface S (between the image surface S and the eleventh lens element L11).

In the zoom lens system according to Embodiment 4, in zooming from a wide-angle limit to a telephoto limit at the time of image taking, the first lens unit G1 and the third lens unit G3 move to the object side, the second lens unit G2 moves to the image side with locus of a convex to the image side, and the fourth lens unit G4 moves with locus of a convex to the object side such that the position thereof at the telephoto limit is almost the same as the position at the wide-angle limit. That is, in zooming, the respective lens units individually move along the optical axis such that the interval between the first lens unit G1 and the second lens unit G2 increases, the interval between the second lens unit G2 and the third lens unit G3 decreases, and the interval between the third lens unit G3 and the fourth lens unit G4 increases.

(Embodiment 5)

As shown in FIG. 13, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a negative meniscus fifth lens element L5 with the convex surface facing the image side; and a bi-convex sixth lens element L6. Among these, the fourth lens element L4 has two aspheric surfaces. The fifth lens element L5 has an aspheric object side surface.

The third lens unit G3, in order from the object side to the image side, comprises: a bi-convex seventh lens element L7; a bi-convex eighth lens element L8, a bi-concave ninth lens element L9; and a bi-convex tenth lens element L10. Among these, the eighth lens element L8 and the ninth lens element L9 are cemented with each other. In the surface data of the corresponding Numerical Example described later, surface number 17 is imparted to an adhesive layer between the eighth lens element L8 and the ninth lens element L9. The seventh lens element L7 has two aspheric surfaces.

The third lens unit G3, as described later, consists of a third-a lens unit G3a and a third-b lens unit G3b in order from the object side to the image side. The third-a lens unit G3a, in order from the object side to the image side, comprises the seventh lens element L7, the eighth lens element L8, and the ninth lens element L9. The third-b lens unit G3b comprises solely the tenth lens element L10.

The fourth lens unit G4 comprises solely a bi-concave eleventh lens element L11. The eleventh lens element L11 has an aspheric image side surface.

The fifth lens unit G5 comprises solely a positive meniscus twelfth lens element L12 with the convex surface facing the object side. The twelfth lens element L12 has two aspheric surfaces.

In the zoom lens system according to Embodiment 5, a plane parallel plate P is provided on the object side relative to the image surface S (between the image surface S and the twelfth lens element L12).

In the zoom lens system according to Embodiment 5, in zooming from a wide-angle limit to a telephoto limit at the time of image taking, the first lens unit G1, the third lens unit G3, and the fourth lens unit G4 move to the object side, the second lens unit G2 moves to the image side with locus of a convex to the image side, and the fifth lens unit G5 moves with locus of a convex to the object side such that the position thereof at the telephoto limit is almost the same as the position at the wide-angle limit. That is, in zooming, the respective lens units individually move along the optical axis such that the interval between the first lens unit G1 and the second lens unit G2 increases, the interval between the second lens unit G2 and the third lens unit G3 decreases, and the interval between the fourth lens unit G4 and the fifth lens unit G5 increases.

(Embodiment 6)

As shown in FIG. 16, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a bi-concave fifth lens element L5; and a bi-convex sixth lens element L6. Among these, the fourth lens element L4 has two aspheric surfaces. The fifth lens element L5 has an aspheric object side surface.

The third lens unit G3, in order from the object side to the image side, comprises: a bi-convex seventh lens element L7; a bi-convex eighth lens element L8, a bi-concave ninth lens element L9; and a positive meniscus tenth lens element L10 with the convex surface facing the object side. Among these, the eighth lens element L8 and the ninth lens element L9 are cemented with each other. In the surface data of the corresponding Numerical Example described later, surface number 17 is imparted to an adhesive layer between the eighth lens element L8 and the ninth lens element L9. The seventh lens element L7 has two aspheric surfaces.

The third lens unit G3, as described later, consists of a third-a lens unit G3a and a third-b lens unit G3b in order from the object side to the image side. The third-a lens unit G3a, in order from the object side to the image side, comprises the seventh lens element L7, the eighth lens element L8, and the ninth lens element L9. The third-b lens unit G3b comprises solely the tenth lens element L10.

The fourth lens unit G4 comprises solely a bi-convex eleventh lens element L11.

The fifth lens unit G5 comprises solely a positive meniscus twelfth lens element L12 with the convex surface facing the object side. The twelfth lens element L12 has two aspheric surfaces.

In the zoom lens system according to Embodiment 6, a plane parallel plate P is provided on the object side relative to the image surface S (between the image surface S and the twelfth lens element L12).

In the zoom lens system according to Embodiment 6, in zooming from a wide-angle limit to a telephoto limit at the time of image taking, the first lens unit G1, the third lens unit G3, and the fourth lens unit G4 move to the object side, the second lens unit G2 moves to the image side with locus of a convex to the image side, and the fifth lens unit G5 moves with locus of a convex to the object side such that the position thereof at the telephoto limit is almost the same as the position at the wide-angle limit. That is, in zooming, the respective lens units individually move along the optical axis such that the interval between the first lens unit G1 and the second lens unit G2 increases, the interval between the second lens unit G2 and the third lens unit G3 decreases, and the interval between the fourth lens unit G4 and the fifth lens unit G5 increases.

(Embodiment 7)

As shown in FIG. 19, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a negative meniscus fifth lens element L5 with the convex surface facing the image side; and a bi-convex sixth lens element L6. Among these, the fourth lens element L4 has two aspheric surfaces. The fifth lens element L5 has an aspheric object side surface.

The third lens unit G3, in order from the object side to the image side, comprises: a bi-convex seventh lens element L7; a bi-convex eighth lens element L8, a bi-concave ninth lens element L9; and a positive meniscus tenth lens element L10 with the convex surface facing the object side. Among these, the eighth lens element L8 and the ninth lens element L9 are cemented with each other. In the surface data of the corresponding Numerical Example described later, surface number 17 is imparted to an adhesive layer between the eighth lens element L8 and the ninth lens element L9. The seventh lens element L7 has two aspheric surfaces.

The third lens unit G3, as described later, consists of a third-a lens unit G3a and a third-b lens unit G3b in order from the object side to the image side. The third-a lens unit G3a, in order from the object side to the image side, comprises the seventh lens element L7, the eighth lens element L8, and the ninth lens element L9. The third-b lens unit G3b comprises solely the tenth lens element L10.

The fourth lens unit G4 comprises solely a positive meniscus eleventh lens element L11 with the convex surface facing the object side. The eleventh lens element L11 has two aspheric surfaces.

The fifth lens unit G5 comprises solely a bi-convex twelfth lens element L12. The twelfth lens element L12 has an aspheric object side surface.

In the zoom lens system according to Embodiment 7, a plane parallel plate P is provided on the object side relative to the image surface S (between the image surface S and the twelfth lens element L12).

In the zoom lens system according to Embodiment 7, in zooming from a wide-angle limit to a telephoto limit at the time of image taking, the first lens unit G1 and the third lens unit G3 move to the object side, the second lens unit G2 moves to the image side with locus of a convex to the image side, the fourth lens unit G4 moves with locus of a convex to the object side such that the position thereof at the telephoto limit is almost the same as the position at the wide-angle limit, and the fifth lens unit G5 moves to the image side. That is, in zooming, the respective lens units individually move along the optical axis such that the interval between the first lens unit G1 and the second lens unit G2 increases, the interval between the second lens unit G2 and the third lens unit G3 decreases, and the interval between the third lens unit G3 and the fourth lens unit G4 increases.

(Embodiment 8)

Figure 22:
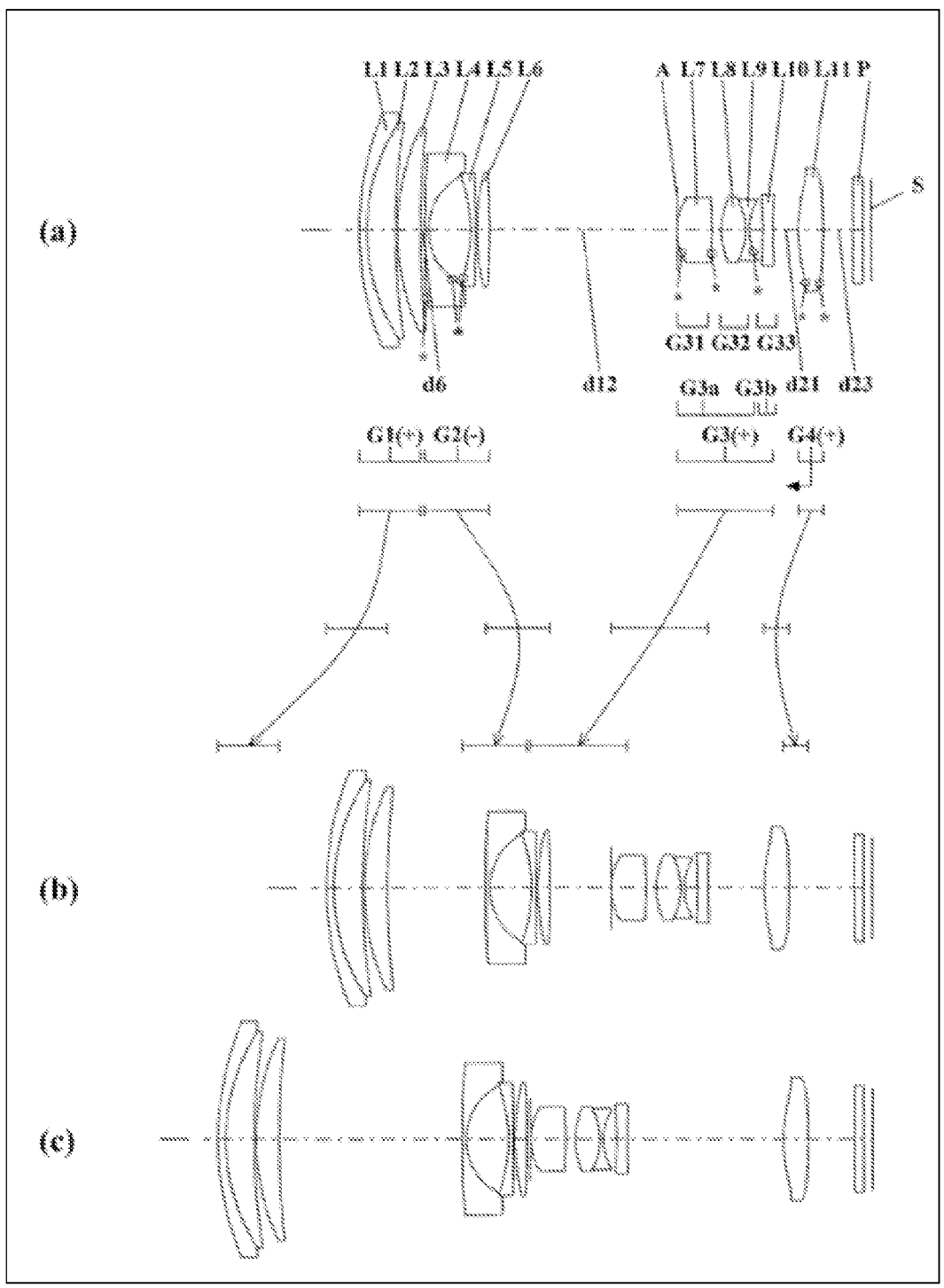
FIG. 22 is a lens arrangement diagram showing an infinity in-focus condition of a zoom lens system according to Embodiment 8 (Numerical Example 8)
Figure 23:
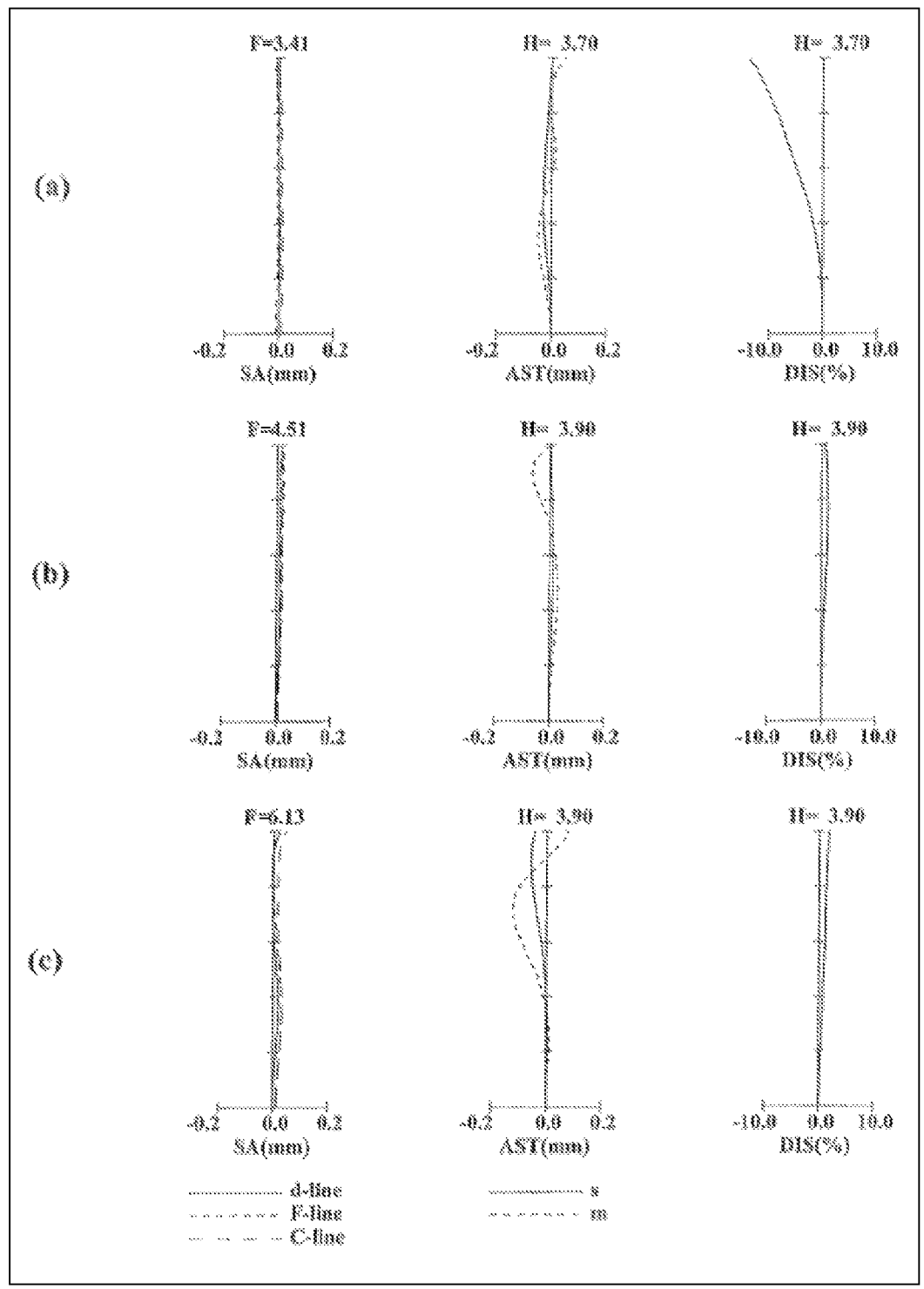
FIG. 23 is a longitudinal aberration diagram of an infinity in-focus condition of a zoom lens system according to Numerical Example 8.
Figure 24:
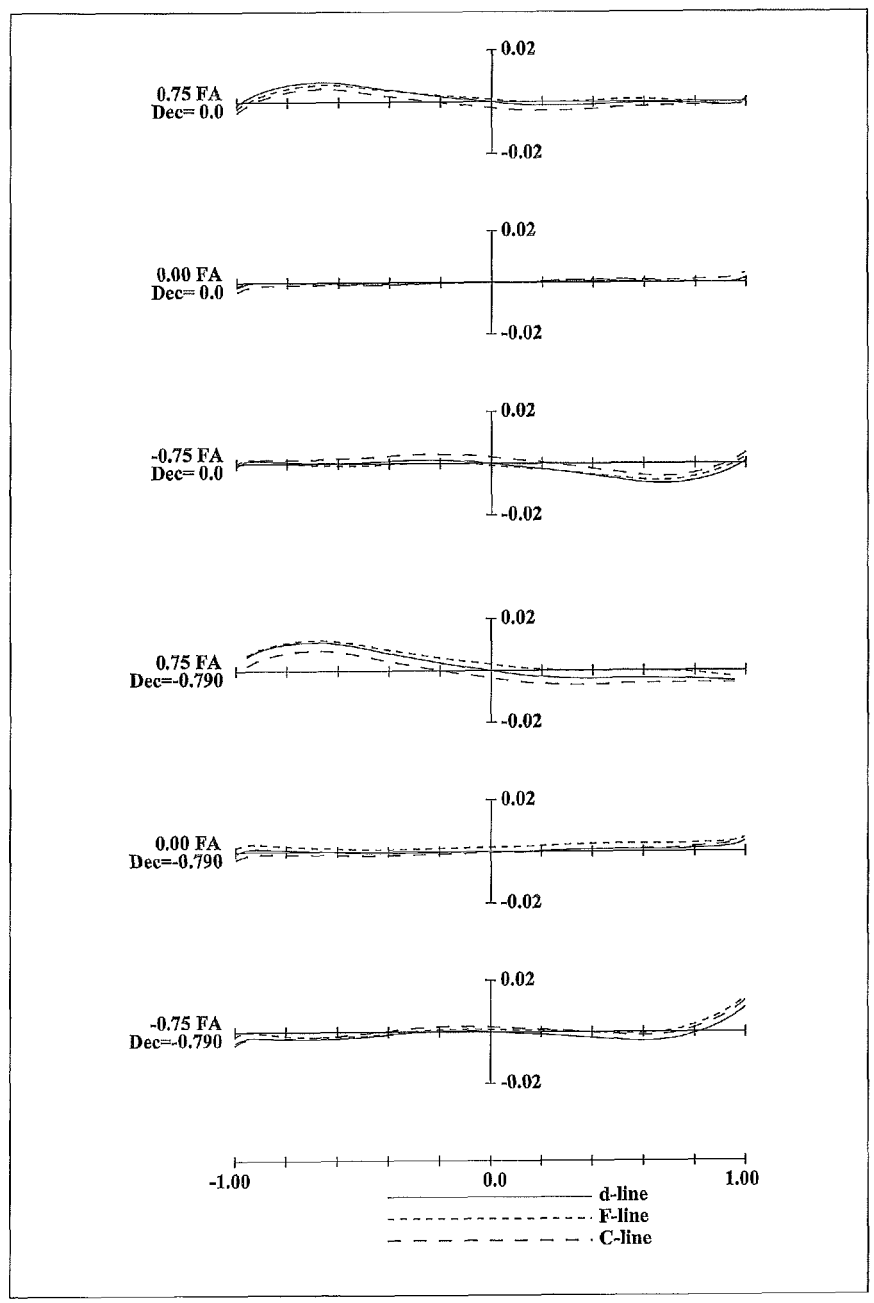
FIG. 24 is a lateral aberration diagram of a zoom lens system according to Numerical Example 8 at a telephoto limit in a basic state where image blur compensation is not performed and in an image blur compensation state.

As shown in FIG. 22, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus fourth lens element L4 with the convex surface facing the object side; a negative meniscus fifth lens element L5 with the convex surface facing the image side; and a bi-convex sixth lens element L6. Among these, the fourth lens element L4 has two aspheric surfaces. The fifth lens element L5 has an aspheric object side surface.

The third lens unit G3, in order from the object side to the image side, comprises: a bi-convex seventh lens element L7; a bi-convex eighth lens element L8, a bi-concave ninth lens element L9; and a bi-concave tenth lens element L10. Among these, the eighth lens element L8 and the ninth lens element L9 are cemented with each other. In the surface data of the corresponding Numerical Example described later, surface number 17 is imparted to an adhesive layer between the eighth lens element L8 and the ninth lens element L9. The seventh lens element L7 has two aspheric surfaces. The ninth lens element L9 has an aspheric image side surface.

The third lens unit G3, as described later, consists of a third-a lens unit G3a and a third-b lens unit G3b in order from the object side to the image side. The third-a lens unit G3a, in order from the object side to the image side, comprises the seventh lens element L7, the eighth lens element L8, and the ninth lens element L9. The third-b lens unit G3b comprises solely the tenth lens element L10.

The fourth lens unit G4 comprises solely a bi-convex eleventh lens element L11. The eleventh lens element L11 has two aspheric surfaces.

In the zoom lens system according to Embodiment 8, a plane parallel plate P is provided on the object side relative to the image surface S (between the image surface S and the eleventh lens element L11).

In the zoom lens system according to Embodiment 8, in zooming from a wide-angle limit to a telephoto limit at the time of image taking, the first lens unit G1 and the third lens unit G3 move to the object side, the second lens unit G2 moves to the image side with locus of a convex to the image side, and the fourth lens unit G4 moves with locus of a convex to the object side such that the position thereof at the telephoto limit is slightly closer to the object side than at the wide-angle limit. That is, in zooming, the respective lens units individually move along the optical axis such that the interval between the first lens unit G1 and the second lens unit G2 increases, the interval between the second lens unit G2 and the third lens unit G3 decreases, and the interval between the third lens unit G3 and the fourth lens unit G4 increases.

The zoom lens systems according to Embodiments 1 to 4 and 8 each include, as a subsequent lens unit, the fourth lens unit G4 having positive optical power. In zooming from a wide-angle limit to a telephoto limit at the time of image taking, the fourth lens unit G4 moves along the optical axis together with the first lens unit G1, the second lens unit G2, and the third lens unit G3. Therefore, it is possible to reduce the size of the entire lens system while maintaining high optical performance.

In the zoom lens systems according to Embodiments 1 to 4 and 8, in focusing from an infinity in-focus condition to a close-object in-focus condition, the fourth lens unit G4 moves along the optical axis to the object side. Therefore, high optical performance can be maintained also in the close-object in-focus condition. Further, since the lens element constituting the fourth lens unit G4 has the aspheric surface, it is possible to successfully compensate off-axis curvature of field from a wide-angle limit to a telephoto limit.

In the zoom lens systems according to Embodiments 1 to 4 and 8, since the fourth lens unit G4 is composed of two or less lens elements, reduction in the size of the entire lens system is realized, and rapid focusing is easily achieved when performing focusing from an infinite object to a close object.

The zoom lens systems according to Embodiments 5 to 7 each include, as subsequent lens units, the fourth lens unit G4 having positive optical power or negative optical power, and the fifth lens unit G5 having positive optical power. In zooming from a wide-angle limit to a telephoto limit at the time of image taking, the fourth lens unit G4 and the fifth lens unit G5 move along the optical axis together with the first lens unit G1, the second lens unit G2, and the third lens unit G3. Therefore, it is possible to reduce the size of the entire lens system while maintaining high optical performance.

In the zoom lens systems according to Embodiments 5 to 7, in focusing from an infinity in-focus condition to a close-object in-focus condition, the fourth lens unit G4 or the fifth lens unit G5 moves along the optical axis to the object side. Therefore, high optical performance can be maintained also in the close-object in-focus condition. Further, since the lens element constituting the fourth lens unit G4 or the fifth lens unit G5 has the aspheric surface, it is possible to successfully compensate off-axis curvature of field from a wide-angle limit to a telephoto limit.

In the zoom lens systems according to Embodiments 5 to 7, since each of the fourth lens unit G4 and the fifth lens unit G5 is composed of two or less lens elements, reduction in the size of the entire lens system is realized, and rapid focusing is easily achieved when performing focusing from an infinite object to a close object.

In the zoom lens system according to Embodiment 8, the third lens unit G3 has at least two air spaces, and includes, in order from the object side to the image side, a lens element having positive optical power, a lens element having positive optical power, and a lens element having negative optical power, which is located closest to the image side. Therefore, it is possible to successfully compensate spherical aberration, coma aberration, and chromatic aberration.

The zoom lens systems according to Embodiments 1 to 4 and 8 each have the four-unit configuration including the fourth lens unit G4 as a subsequent lens unit, and the zoom lens systems according to Embodiments 5 to 7 each have the five-unit configuration including the fourth lens unit G4 and the fifth lens unit G5 as subsequent lens units. However, the number of lens units constituting the subsequent lens unit is not particularly limited. Further, the optical power of each subsequent lens unit is also not particularly limited.

In the zoom lens systems according to Embodiments 1 to 8, a part of the third lens unit G3 is a third-b lens unit that moves in a direction perpendicular to the optical axis to optically compensate image blur. That is, the third lens unit G3, in order from the object side to the image side, comprises: a lens unit (third-a lens unit G3a) that, at the time of retracting, escapes along an axis different from that at the time of image taking; and the third-b lens unit G3b that moves in a direction perpendicular to the optical axis. The third-b lens unit G3b compensates movement of an image point caused by vibration of the entire system, that is, optically compensates image blur caused by hand blurring, vibration and the like.

When compensating the movement of the image point caused by vibration of the entire system, the lens elements constituting the third-b lens unit G3b move in the direction perpendicular to the optical axis, as described above. Thereby, image blur can be compensated in a state that size increase in the entire zoom lens system is suppressed to realize a compact configuration and that excellent imaging characteristics such as small decentering coma aberration and small decentering astigmatism are satisfied.

In the zoom lens systems according to Embodiments 1 to 8, the third lens unit G3 is composed of three lens units separated from each other by two air spaces. When it is assumed that the three lens units are a G31 unit, a G32 unit, and a G33 unit in order from the object side to the image side, the third-b lens unit G3b may be equivalent to the G33 unit, or to a combination of the G32 unit and the G33 unit. Further, the G33 unit may be composed of one lens element, or a plurality of lens elements.

In the zoom lens systems according to Embodiments 1 to 8, since the third-b lens unit G3b is composed of one lens element, highly-precise and rapid focusing can be easily performed when optically compensating image blur caused by hand blurring, vibration and the like.

As described above, Embodiments 1 to 8 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions to be satisfied by a zoom lens system like the zoom lens systems according to Embodiments 1 to 8. Here, a plurality of beneficial conditions is set forth for the zoom lens system according to each embodiment. A construction that satisfies all the plural conditions is most beneficial for the zoom lens system. However, when an individual condition is satisfied, a zoom lens system having the corresponding effect is obtained.

For example, in a zoom lens system like the zoom lens systems according to Embodiments 1 to 8, which comprises a plurality of lens units each composed of at least one lens element, that is, which comprises, in order from the object side to the image side, a first lens unit having positive optical power, a second lens unit having negative optical power, a third lens unit having positive optical power, and a subsequent lens unit, wherein in zooming from a wide-angle limit to a telephoto limit at the time of image taking, the first lens unit, the second lens unit, and the third lens unit are moved along the optical axis to perform magnification change, and a part of the third lens unit is a third-b lens unit that moves in a direction perpendicular to the optical axis to optically compensate image blur (this lens configuration is referred to as a basic configuration of the embodiment, hereinafter), the following conditions (2), (3) and (a)' are simultaneously satisfied.

$$1.5 < (D_2 + D_{3b} + D_B)/Ir < 2.4 \quad (2)$$

$$BF/Ir < 1.45 \quad (3)$$

$$Z = f_T/f_W > 9.0 \quad (a)'$$

where, $D_2$ is an optical axial thickness of the second lens unit, $D_{3b}$ is an optical axial thickness of the third-b lens unit, $D_B$ is an optical axial total thickness of the respective subsequent lens units, BF is a shortest optical axial distance that is converted with air, between an apex of a most image side lens surface and an image surface, Ir is a value represented by the following equation:

$$Ir = f_T \times \tan(\omega_T),$$

$f_T$ is a focal length of the entire system at a telephoto limit, $f_W$ is a focal length of the entire system at a wide-angle limit, and $\omega_T$ is a half view angle (°) at a telephoto limit.

The conditions (2) and (3) relate to thicknesses at the time of retracting. When the value goes below the lower limit of the condition (2), each of the thicknesses is reduced, but becomes thinner than the minimum thickness desired for securing favorable optical performance at the time of image taking, which causes difficulty in compensating aberrations such as curvature of field and distortion. In contract, when the value exceeds the upper limit of the condition (2), the lens system has a greater thickness than necessary for securing the optical performance. In addition, each of the thicknesses at the time of retracting increases, which causes difficulty in providing compact lens barrels, imaging devices, and cameras. Further, when the value exceeds the upper limit of the condition (3), the shortest optical axial distance between the apex of the most image side lens surface and the image surface becomes excessively long, which has an influence on the overall length of lens system to be increased. As a result, it becomes difficult to provide compact lens barrels, imaging devices, and cameras.

When at least one of the following conditions (2)' and (2)'' is satisfied, the above-mentioned effect is achieved more successfully.

$$1.9 < (D_2 + D_{3b} + D_B)/Ir \quad (2)'$$

$$(D_2 + D_{3b} + D_B)/Ir < 2.2 \quad (2)''$$

When the following condition (3)' is satisfied, the above-mentioned effect is achieved more successfully.

$$BF/Ir < 1.30 \quad (3)'$$

For example, in a zoom lens system having the basic configuration like the zoom lens systems according to Embodiments 1 to 8, it is beneficial that the following conditions (4) and (5) are simultaneously satisfied.

$$1.5 < L_T/D < 3.0 \quad (4)$$

$$3.0 < D/Ir < 6.5 \quad (5)$$

where, $L_T$ is an overall length of lens system (a distance from a most object side surface of the first lens unit to an image surface) at a telephoto limit, D is an optical axial total thickness of the respective lens units, Ir is a value represented by the following equation:

$$Ir = f_T \times \tan(\omega_T),$$

$f_T$ is a focal length of the entire system at a telephoto limit, and $\omega_T$ is a half view angle (°) at a telephoto limit.

The condition (4) sets forth the ratio between the overall length of lens system at a telephoto limit and the optical axial total thickness of the respective lens units. When the value goes below the lower limit of the condition (4), the overall length of lens system becomes excessively short relative to the total thickness, which may cause difficulty in securing image surface quality, and in compensating aberrations such as chromatic aberration. It is considered that the overall length of lens system, which is desired for maintaining performance, is secured, and the total thickness is increased accordingly. In this case, however, it may become difficult to provide compact lens barrels, imaging devices, and cameras. So, the condition (5) sets forth the upper limit to avoid excessive increase in the total thickness. In contract, when the value exceeds the upper limit of the condition (4), the total thickness becomes excessively thin relative to the overall length of lens system, which may cause difficulty in compensating aberrations such as spherical aberration and coma aberration.

When the following condition (4)' is satisfied, the above-mentioned effect is achieved more successfully.

$$2.3 < L_T/D \tag{4}'$$

The condition (5) relates to the optical axial total thickness of the respective lens units. When the value goes below the lower limit of the condition (5), the thickness is reduced, but becomes thinner than the minimum thickness desired for securing favorable optical performance at the time of image taking, which may cause difficulty in compensating aberrations such as spherical aberration and coma aberration. In contrast, when the value exceeds the upper limit of the condition (5), the lens system has a greater thickness than necessary for securing the optical performance, which may cause difficulty in providing compact lens barrels, imaging devices, and cameras.

When at least one of the following conditions (5)' and (5)" is satisfied, the above-mentioned effect is achieved more successfully.

$$4.5 < D/Ir \tag{5}'$$

$$D/Ir < 5.6 \tag{5}''$$

For example, in a zoom lens system having the basic configuration like the zoom lens systems according to Embodiments 1 to 8, it is beneficial that the following conditions (6) and (7) are simultaneously satisfied.

$$L_W/Ir < 14.0 \tag{6}$$

$$L_T/Ir < 17.0 \tag{7}$$

where, $L_W$ is an overall length of lens system (a distance from a most object side surface of the first lens unit to an image surface) at a wide-angle limit, $L_T$ is an overall length of lens system (a distance from a most object side surface of the first lens unit to an image surface) at a telephoto limit, Ir is a value represented by the following equation:

$$Ir = f_T \times \tan(\omega_T),$$

$f_T$ is a focal length of the entire system at a telephoto limit, and $\omega_T$ is a half view angle (°) at a telephoto limit.

The condition (6) sets forth the relationship between the overall length of the zoom lens system at a wide-angle limit, and the maximum image height. When the value exceeds the upper limit of the condition (6), the tendency of increase in the overall length of the zoom lens system at the wide-angle limit is prominent, which may cause difficulty in achieving compact zoom lens systems.

When the following condition (6)' is satisfied, the above-mentioned effect is achieved more successfully.

$$L_W/Ir < 12.6 \tag{6}'$$

The condition (7) sets forth the relationship between the overall length of the zoom lens system at a telephoto limit, and the maximum image height. When the value exceeds the upper limit of the condition (7), the tendency of increase in the overall length of the zoom lens system at the telephoto limit is prominent, which may cause difficulty in achieving compact zoom lens systems.

When the following condition (7)' is satisfied, the above-mentioned effect is achieved more successfully.

$$L_T/Ir < 15.0 \tag{7}'$$

For example, in a zoom lens system having the basic configuration like the zoom lens systems according to Embodiments 1 to 8, it is beneficial that the following condition (8) is satisfied.

$$M_{12}/Ir < 4.7 \tag{8}$$

where, $M_{12}$ is an amount of relative movement between the first lens unit and the second lens unit in zooming from a wide-angle limit to a telephoto limit at the time of image taking, Ir is a value represented by the following equation:

$$Ir = f_T \times \tan(\omega_T),$$

$f_T$ is a focal length of the entire system at a telephoto limit, and $\omega_T$ is a half view angle (°) at a telephoto limit.

The condition (8) sets forth the relationship between the amount of relative movement between the first lens unit and the second lens unit, and the maximum image height. The amount of relative movement between the first lens unit and the second lens unit tends to increase in order to secure high magnification. However, when the value exceeds the upper limit of the condition (8), the amount of relative movement becomes excessively great, which may cause difficulty in providing compact lens barrels, imaging devices, and cameras.

When the following condition (8)' is satisfied, the above-mentioned effect is achieved more successfully.

$$M_{12}/Ir < 4.2 \tag{8}'$$

For example, in a zoom lens system having the basic configuration like the zoom lens systems according to Embodiments 1 to 8, it is beneficial that the following condition (9) is satisfied.

$$M_{12} \times f_1/Ir^2 < 44.0 \tag{9}$$

where, $M_{12}$ is an amount of relative movement between the first lens unit and the second lens unit in zooming from a wide-angle limit to a telephoto limit at the time of image taking, $f_1$ is a composite focal length of the first lens unit,
Ir is a value represented by the following equation:

$$Ir = f_T \times \tan(\omega_T),$$

$f_T$ is a focal length of the entire system at a telephoto limit, and $\omega_T$ is a half view angle (°) at a telephoto limit.

The condition (9) sets forth the relationship between a product obtained by multiplying the amount of relative movement between the first lens unit and the second lens unit by the focal length of the first lens unit, and the maximum image height. When the value exceeds the upper limit of the condition (9), the amount of relative movement becomes excessively great, which may cause difficulty in providing compact lens barrels, imaging devices, and cameras. In addition, the focal length of the first lens unit increases, and the amount of movement of the first lens unit, which is desired for securing high magnification, becomes excessively great, which may cause difficulty in providing compact lens barrels, imaging devices, and cameras.

When the following condition (9)' is satisfied, the above-mentioned effect is achieved more successfully.

$$M_{12} \times f_1 / Ir^2 < 35.0 \qquad (9)'$$

For example, in a zoom lens system having the basic configuration like the zoom lens systems according to Embodiments 1 to 8, it is beneficial that the following condition (10) is satisfied.

$$0.50 < |f_1/f_{3b}| < 1.50 \qquad (10)$$

where, $f_1$ is a composite focal length of the first lens unit, and
$f_{3b}$ is a composite focal length of the third-b lens unit.

The condition (10) sets forth the ratio between the focal length of the first lens unit and the focal length of the third-b lens unit. When the value goes below the lower limit of the condition (10), the focal length of the first lens unit becomes excessively short, and aberration fluctuation at the time of magnification change increases, which causes difficulty in compensating aberrations. In addition, the diameter of the first lens unit increases, which may cause difficulty in providing compact lens barrels, imaging devices, and cameras. Further, the error sensitivity to inclination of the first lens unit becomes excessively high, which may cause difficulty in assembling optical systems. In contrast, when the value exceeds the upper limit of the condition (10), the focal length of the third-b lens unit becomes excessively short, and aberration fluctuation at the time of blur compensation increases, which may cause difficulty in compensating aberrations. Further, the focal length of the first lens unit increases, and the amount of movement of the first lens unit, which is desired for securing high magnification, becomes excessively great, which may cause difficulty in providing compact lens barrels, imaging devices, and cameras.

When at least one of the following conditions (10)' and (10)" is satisfied, the above-mentioned effect is achieved more successfully.

$$0.85 < |f_1/f_{3b}| \qquad (10)'$$

$$|f_1/f_{3b}| < 1.30 \qquad (10)''$$

For example, in a zoom lens system which has the basic configuration, and in which the third lens unit further includes a third-a lens unit that, at the time of retracting, escapes along an axis different from that at the time of image taking, like the zoom lens systems according to Embodiments 1 to 8, it is beneficial that the following condition (11) is satisfied.

$$0.10 < |f_{3a}/f_{3b}| < 0.65 \qquad (11)$$

where, $f_{3a}$ is a composite focal length of the third-a lens unit, and
$f_{3b}$ is a composite focal length of the third-b lens unit.

The condition (11) sets forth the ratio between the focal length of the third-a lens unit and the focal length of the third-b lens unit. When the value goes below the lower limit of the condition (11), the focal length of the third-b lens unit becomes excessively long, which may cause difficulty in sufficiently compensating blur. Further, the amount of movement of the third-b lens unit in the direction perpendicular to the optical axis becomes excessively great, which may cause difficulty in providing compact lens barrels, imaging devices, and cameras. In contrast, when the value exceeds the upper limit of the condition (11), the focal length of the third-b lens unit becomes excessively short, and aberration fluctuation at the time of blur compensation increases, which may cause difficulty in compensating aberrations.

When at least one of the following conditions (11)' and (11)" is satisfied, the above-mentioned effect is achieved more successfully.

$$0.30 < |f_{3a}/f_{3b}| \qquad (11)'$$

$$|f_{3a}/f_{3b}| < 0.45 \qquad (11)''$$

For example, in a zoom lens system having the basic configuration like the zoom lens systems according to Embodiments 1 to 8, it is beneficial that the entire system satisfies the following conditions (12) and (13).

$$|Y_T| > |Y| \qquad (12)$$

$$1.5 < (Y/Y_T)/(f/f_T) < 3.0 \qquad (13)$$

where, f is a focal length of the entire system,
$f_T$ is a focal length of the entire system at a telephoto limit,
Y is an amount of movement of the third-b lens unit in a direction perpendicular to the optical axis at the time of maximum blur compensation with the focal length f of the entire system, and
$Y_T$ is an amount of movement of the third-b lens unit in a direction perpendicular to the optical axis at the time of maximum blur compensation with the focal length $f_T$ of the entire system at a telephoto limit.

The conditions (12) and (13) set forth the amount of movement of the third-b lens unit that moves in the direction perpendicular to the optical axis at the time of maximum blur compensation. In the case of a zoom lens system, when the compensation angle is constant over the entire zoom range, the amount of movement of a lens unit or lens element that moves in the direction perpendicular to the optical axis increases with increase in the zooming ratio. On the contrary, the amount of movement of the lens unit or lens element that moves in the direction perpendicular to the optical axis decreases with decrease in the zooming ratio. When the condition (12) is not satisfied or when the value exceeds the upper limit of the condition (13), blur compensation becomes excessive, which may cause remarkable degradation in the optical performance. On the other hand, when the value goes below the lower limit of the condition (13), it may become difficult to sufficiently compensate blur.

When at least one of the following conditions (13)' and (13)" is satisfied, the above-mentioned effect is achieved more successfully.

$$2.0 < (Y/Y_T)/(f/f_T) \qquad (13)'$$

$$(Y/Y_T)/(f/f_T) < 2.5 \qquad (13)''$$

Each of the lens units constituting the zoom lens systems according to Embodiments 1 to 8 is composed exclusively of refractive type lens elements that deflect the incident light by refraction (that is, lens elements of a type in which deflection is achieved at the interface between media each having a distinct refractive index). However, the present disclosure is not limited to this. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in the refractive-diffractive hybrid type lens elements, when a diffraction structure is formed in the interface between media having mutually different refractive indices, wavelength dependence in the diffraction efficiency is improved. Thus, such a configuration is beneficial.

Moreover, in each embodiment, a configuration has been described that on the object side relative to the image surface S (Embodiments 1 to 4 and 8: between the image surface S and the most image side lens surface of the fourth lens unit G4; Embodiments 5 to 7: between the image surface S and the most image side lens surface of the fifth lens unit G5), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves desired characteristics of optical cut-off frequency by diffraction.

(Embodiment 9)

Figure 25:
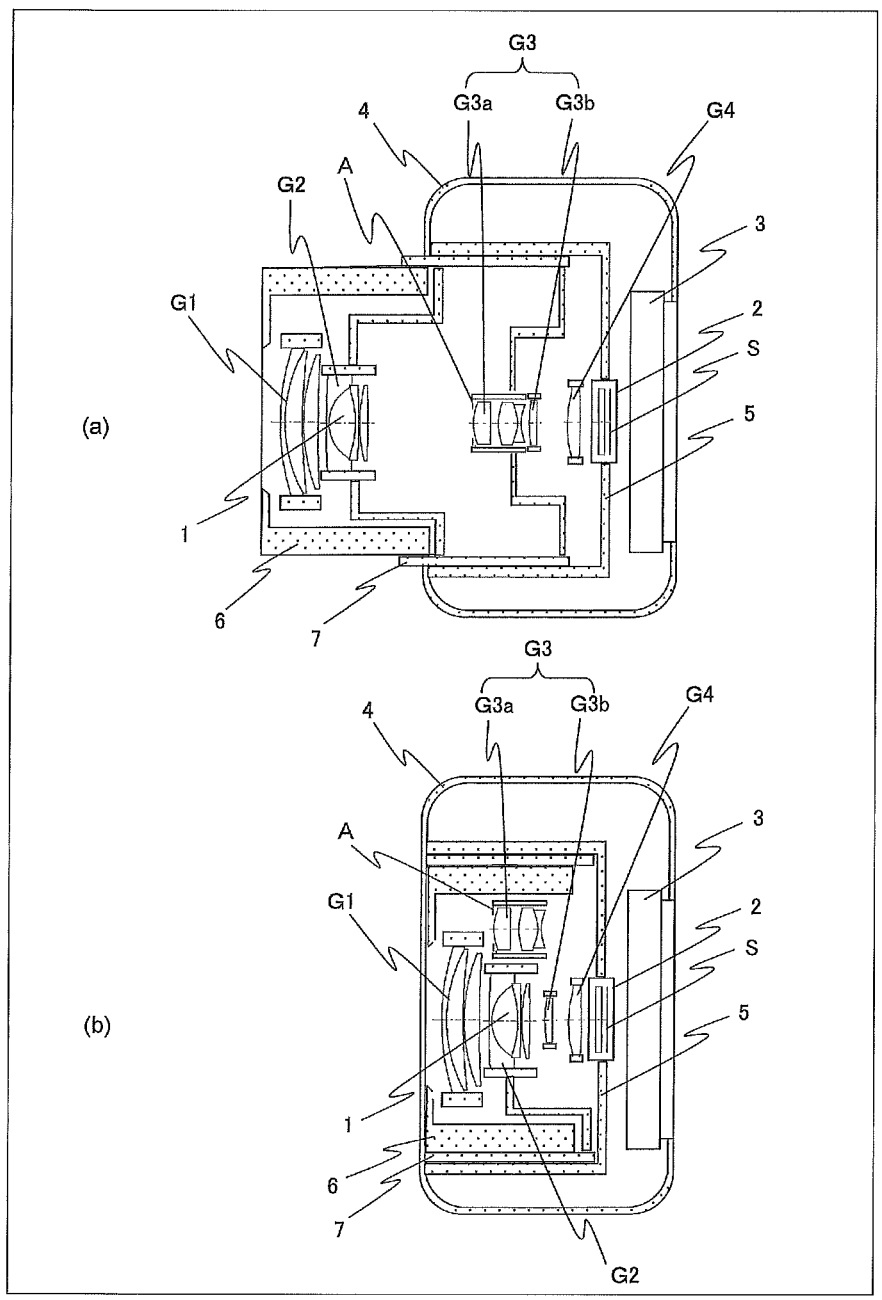
FIG. 25 is a schematic configuration diagram of a digital still camera according to Embodiment 9.

FIG. 25 is a schematic configuration diagram of a digital still camera according to Embodiment 9, wherein part (a) shows a schematic configuration diagram at the time of image taking, and part (b) shows a schematic configuration diagram at the time of retracting. In FIG. 25, the digital still camera comprises: an imaging device having a zoom lens system 1 and an image sensor 2 that is a CCD; a liquid crystal display monitor 3; and a body 4. A zoom lens system according to Embodiment 1 is employed as the zoom lens system 1. In FIG. 25, the zoom lens system 1 comprises a first lens unit G1, a second lens unit G2, an aperture diaphragm A, a third lens unit G3 consisting of a third-a lens unit G3$a$ and a third-b lens unit G3$b$, and a fourth lens unit G4. In the body 4, the zoom lens system 1 is arranged on the front side, and the image sensor 2 is arranged on the rear side of the zoom lens system 1. On the rear side of the body 4, the liquid crystal display monitor 3 is arranged, and an optical image of a photographic object generated by the zoom lens system 1 is formed on an image surface S.

A lens barrel comprises a main barrel 5, a moving barrel 6, and a cylindrical cam 7. When the cylindrical cam 7 is rotated, the first lens unit G1, the second lens unit G2, the aperture diaphragm A and the third lens unit G3, and the fourth lens unit G4 move to predetermined positions relative to the image sensor 2, so that zooming from a wide-angle limit to a telephoto limit is achieved. The lens barrel is a so-called sliding lens barrel. As shown in part (b) of FIG. 25, at the time of retracting, the third-a lens unit G3$a$ that is a part of the third lens unit G3 escapes from the optical axis. That is, at the time of retracting, the third-a lens unit G3$a$ escapes along an axis different from that at the time of image taking. The fourth lens unit G4 is movable in the optical axis direction by a motor for focus adjustment.

As such, when the zoom lens system according to Embodiment 1 is employed in a digital still camera, a small digital still camera can be obtained that has a high resolution and high capability of compensating curvature of field and that has a short overall length of lens system at the time of non-use. In the digital still camera shown in FIG. 25, any one of the zoom lens systems according to Embodiments 2 to 8 may be employed in place of the zoom lens system according to Embodiment 1. Further, the optical system of the digital still camera shown in FIG. 25 is applicable also to a digital video camera for moving images. In this case, moving images with high resolution can be acquired in addition to still images.

The digital still camera according to Embodiment 9 has been described for a case that the employed zoom lens system 1 is any one of the zoom lens systems according to Embodiments 1 to 8. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 8.

An imaging device comprising any one of the zoom lens systems according to Embodiments 1 to 8, and an image sensor such as a CCD or a CMOS may be applied to a mobile terminal device such as a smart-phone, a Personal Digital Assistance, a surveillance camera in a surveillance system, a Web camera, a vehicle-mounted camera or the like.

As described above, Embodiment 9 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 8 are implemented. In the numerical examples, the units of the length in the tables are all "mm", while the units of the view angle in the tables are all "°". In the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1 + \sqrt{1 - (1+\kappa)(h/r)^2}} +$$
$$A4h^4 + A6h^6 + A8h^8 + A10h^{10} + A12h^{12} + A14h^{14}$$

Here, κ is the conic constant, A4, A6, A8, A10, A12 and A14 are a fourth-order, sixth-order, eighth-order, tenth-order, twelfth-order and fourteenth-order aspherical coefficients, respectively.

FIGS. 2, 5, 8, 11, 14, 17, 20 and 23 are longitudinal aberration diagrams of the zoom lens systems according to Embodiments 1 to 8, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as "F"), and the solid line, the short dash line and the long dash line indicate the characteristics to the d-line, the F-line and the C-line, respectively. In each astigmatism diagram, the vertical axis indicates the image height (in each Fig., indicated as "H"), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as "H").

FIGS. 3, 6, 9, 12, 15, 18, 21 and 24 are lateral aberration diagrams of the zoom lens systems at a telephoto limit according to Embodiments 1 to 8, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the most image side lens element in the third lens unit G3 (third-b lens unit G3b) is moved by a predetermined amount in a direction perpendicular to the optical axis at a telephoto limit. Among the lateral aberration diagrams of a basic state, the upper part shows the lateral aberration at an image point of 75% of the maximum image height, the middle part shows the lateral aberration at the axial image point, and the lower part shows the lateral aberration at an image point of −75% of the maximum image height. Among the lateral aberration diagrams of an image blur compensation state, the upper part shows the lateral aberration at an image point of 75% of the maximum image height, the middle part shows the lateral aberration at the axial image point, and the lower part shows the lateral aberration at an image point of −75% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

In the zoom lens system according to each numerical example, the amount of movement of the most image side lens element in the third lens unit G3 (third-b lens unit G3b) in a direction perpendicular to the optical axis in an image blur compensation state at a telephoto limit is as follows.

| | |
|---|---|
| Numerical Example 1 | 0.380 mm |
| Numerical Example 2 | 0.420 mm |
| Numerical Example 3 | 0.360 mm |
| Numerical Example 4 | 0.460 mm |
| Numerical Example 5 | 0.320 mm |
| Numerical Example 6 | 0.410 mm |
| Numerical Example 7 | 0.410 mm |
| Numerical Example 8 | 0.790 mm |

Here, when the shooting distance is infinity, at a telephoto limit, the amount of image decentering in a case that the zoom lens system inclines by 0.3° is equal to the amount of image decentering in a case that the most image side lens element in the third lens unit G3 (third-b lens unit G3b) moves in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +75% image point and the lateral aberration at the −75% image point are compared with each other in a basic state, all have a small degree of curvature and almost the same inclination in the aberration curve. Thus, decentering coma aberration and decentering astigmatism are small. This indicates that sufficient imaging performance is obtained even in an image blur compensation state. Further, when the image blur compensation angle of a zoom lens system is the same, the amount of parallel movement desired for image blur compensation decreases with decreasing focal length of the entire zoom lens system. Thus, at arbitrary zoom positions, sufficient image blur compensation can be performed for image blur compensation angles up to 0.3° without degrading the imaging characteristics.

NUMERICAL EXAMPLE 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data.

TABLE 1

(Surface data)

| Surface number | r | d | nd | vd |
|---|---|---|---|---|
| Object surface | ∞ | | | |
| 1 | 26.16640 | 0.65000 | 1.84666 | 23.8 |
| 2 | 16.87260 | 0.01000 | 1.56732 | 42.8 |
| 3 | 16.87260 | 2.29370 | 1.49700 | 81.6 |
| 4 | 58.08220 | 0.15000 | | |
| 5 | 22.56010 | 1.68840 | 1.80420 | 46.5 |
| 6 | 113.60170 | Variable | | |
| 7* | 479.64580 | 0.30000 | 1.80470 | 41.0 |
| 8* | 5.35330 | 3.55510 | | |
| 9* | −13.06530 | 0.40000 | 1.77200 | 50.0 |
| 10 | 1020.12530 | 0.15000 | | |
| 11 | 19.55860 | 1.07810 | 1.94595 | 18.0 |
| 12 | −89.63610 | Variable | | |
| 13(Diaphragm) | ∞ | 0.00000 | | |
| 14* | 5.17740 | 2.23510 | 1.51845 | 70.0 |
| 15* | −22.90790 | 0.73320 | | |
| 16 | 7.12790 | 2.09740 | 1.74400 | 44.7 |
| 17 | −6.83580 | 0.01000 | 1.56732 | 42.8 |
| 18 | −6.83580 | 0.30000 | 1.90366 | 31.3 |
| 19 | 4.35700 | 1.28850 | | |
| 20 | 13.81280 | 0.89600 | 1.49700 | 81.6 |
| 21 | 859.87630 | Variable | | |
| 22* | 17.51620 | 1.34500 | 1.77200 | 50.0 |
| 23* | 96.78090 | Variable | | |
| 24 | ∞ | 0.78000 | 1.51680 | 64.2 |
| 25 | ∞ | (BF) | | |
| Image surface | ∞ | | | |

TABLE 2

(Aspherical data)

Surface No. 7

K = 0.00000E+00, A4 = −3.89079E−04, A6 = 4.98917E−05,
A8 = −1.89028E−06 A10 = 3.10699E−08, A12 = −1.99009E−10,
A14 = 0.00000E+00

Surface No. 8

K = 0.00000E+00, A4 = −7.18555E−04, A6 = 3.47356E−05,
A8 = 2.99389E−06 A10 = −3.29477E−07, A12 = 1.83371E−08,
A14 = −4.67338E−10

Surface No. 9

K = 0.00000E+00, A4 = −3.01424E−05, A6 = 1.09721E−05,
A8 = −1.80340E−06 A10 = 1.74030E−07, A12 = −6.08132E−09,
A14 = 6.70912E−11

Surface No. 14

K = 0.00000E+00, A4 = −1.01933E−04, A6 = 9.17188E−05,
A8 = −2.38544E−05 A10 = 5.70399E−06, A12 = −4.54685E−07,
A14 = 9.77076E−09

TABLE 2-continued (Aspherical data)

Surface No. 15

K = 0.00000E+00, A4 = 1.03317E−03, A6 = 7.86252E−05,
A8 = −2.01278E−06 A10 = 8.02553E−07, A12 = 2.13081E−07,
A14 = −2.40496E−08
Surface No. 22

K = 0.00000E+00, A4 = −6.34089E−05, A6 = −1.95567E−06,
A8 = −1.07258E−06 A10 = 6.45858E−09, A12 = 0.00000E+00,
A14 = 0.00000E+00
Surface No. 23

K = 0.00000E+00, A4 = 1.99061E−05, A6 = −1.83589E−05,
A8 = −4.73078E−07 A10 = 0.00000E+00, A12 = 0.00000E+00,
A14 = 0.00000E+00

TABLE 3

(Various data)

Zooming ratio 9.39150

| | Wide-angle limit | Middle position | Telephoto limit |
|---|---|---|---|
| Focal length | 4.6449 | 14.2408 | 43.6229 |
| F-number | 3.19247 | 4.33397 | 5.80463 |
| Half-view angle | 42.5914 | 15.1233 | 5.0150 |
| Image height | 3.7000 | 3.9020 | 3.9020 |
| Overall length of lens system | 43.7701 | 45.3322 | 53.9940 |
| BF | 0.77806 | 0.76271 | 0.76177 |
| d6 | 0.3063 | 7.9591 | 15.8810 |
| d12 | 16.7125 | 5.2676 | 0.3000 |
| d21 | 3.1000 | 4.6876 | 13.9219 |
| d23 | 2.9127 | 6.6947 | 3.1688 |
| Entrance pupil position | 7.1954 | 22.6435 | 61.4754 |
| Exit pupil position | 9.9523 | −37.8815 | −60.9063 |
| Front principal points position | 14.1921 | 31.6364 | 74.2402 |
| Back principal points position | 39.1251 | 31.0914 | 10.3710 |

Single lens data

| Lens element | Initial surface number | Focal length |
|---|---|---|
| 1 | 1 | −57.9664 |
| 2 | 3 | 46.9808 |
| 3 | 5 | 34.7174 |
| 4 | 7 | −6.7295 |
| 5 | 9 | −16.7071 |
| 6 | 11 | 17.0546 |
| 7 | 14 | 8.3729 |
| 8 | 16 | 5.0111 |
| 9 | 18 | −2.9077 |
| 10 | 20 | 28.2363 |
| 11 | 22 | 27.5001 |

Zoom lens unit data

| Lens unit | Initial surface No. | Focal length | Overall length of lens unit | Front principal points position | Back principal points position |
|---|---|---|---|---|---|
| 1 | 1 | 31.72186 | 4.79210 | 0.91444 | 2.70158 |
| 2 | 7 | −6.95359 | 5.48320 | −0.03537 | 0.56284 |
| 3 | 13 | 10.18296 | 7.56020 | −3.00192 | 0.70435 |
| 4 | 22 | 27.50006 | 1.34500 | −0.16650 | 0.42504 |

TABLE 3-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.31033 | −0.47130 | −1.01778 |
| 3 | 13 | −0.57991 | −1.40767 | −1.67862 |
| 4 | 22 | 0.81364 | 0.67667 | 0.80492 |

NUMERICAL EXAMPLE 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows various data.

TABLE 4

(Surface data)

| Surface number | r | d | nd | vd |
|---|---|---|---|---|
| Object surface | ∞ | | | |
| 1 | 18.18950 | 0.65000 | 1.84666 | 23.8 |
| 2 | 13.48870 | 0.01000 | 1.56732 | 42.8 |
| 3 | 13.48870 | 3.59480 | 1.58332 | 59.1 |
| 4* | −390.98650 | Variable | | |
| 5* | 83.26520 | 0.30000 | 1.84973 | 40.6 |
| 6* | 5.25780 | 3.48870 | | |
| 7* | −13.26330 | 0.40000 | 1.68966 | 53.0 |
| 8 | −221.99470 | 0.15000 | | |
| 9 | 23.18200 | 1.05020 | 1.94595 | 18.0 |
| 10 | −72.81230 | Variable | | |
| 11(Diaphragm) | ∞ | 0.00000 | | |
| 12* | 4.52630 | 2.62910 | 1.51845 | 70.0 |
| 13* | −65.83540 | 0.15150 | | |
| 14 | 6.57030 | 2.01120 | 1.72916 | 54.7 |
| 15 | −6.66480 | 0.01000 | 1.56732 | 42.8 |
| 16 | −6.66480 | 0.30000 | 1.91082 | 35.2 |
| 17 | 4.30720 | 1.29980 | | |
| 18 | 15.44020 | 0.86440 | 1.49700 | 81.6 |
| 19 | −1122.04350 | Variable | | |
| 20* | 11.59550 | 1.24960 | 1.58332 | 59.1 |
| 21* | 33.00420 | Variable | | |
| 22 | ∞ | 0.78000 | 1.51680 | 64.2 |
| 23 | ∞ | (BF) | | |
| Image surface | ∞ | | | |

TABLE 5

(Aspherical data)

Surface No. 4

K = 0.00000E+00, A4 = 8.13298E−06, A6 = −6.20822E−09,
A8 = −9.01085E−11 A10 = 3.92960E−13, A12 = 0.00000E+00,
A14 = 0.00000E+00
Surface No. 5

K = 0.00000E+00, A4 = −5.31248E−04, A6 = 4.94090E−05,
A8 = −1.86957E−06 A10 = 3.16100E−08, A12 = −2.16209E−10,
A14 = 0.00000E+00
Surface No. 6

K = 0.00000E+00, A4 = −7.58792E−04, A6 = 2.71556E−05,
A8 = 3.41683E−06 A10 = −4.11882E−07, A12 = 2.09001E−08,
A14 = −4.78902E−10

TABLE 5-continued (Aspherical data)

Surface No. 7

K = 0.00000E+00, A4 = 9.87471E-05, A6 = 1.93881E-05,
A8 = -2.73583E-06 A10 = 2.29004E-07, A12 = -7.42552E-09,
A14 = 9.63360E-11
Surface No. 12

K = 0.00000E+00, A4 = 1.94518E-04, A6 = 1.15042E-04,
A8 = -2.37675E-05 A10 = 5.97973E-06, A12 = -4.62688E-07,
A14 = 9.77076E-09
Surface No. 13

K = 0.00000E+00, A4 = 2.04364E-03, A6 = 1.65386E-04,
A8 = -1.08751E-06 A10 = 2.65193E-06, A12 = 2.13080E-07,
A14 = -2.40496E-08
Surface No. 20

K = 0.00000E+00, A4 = -2.24128E-04, A6 = 4.26709E-05,
A8 = -2.71062E-06 A10 = 3.07043E-08, A12 = 0.00000E+00,
A14 = 0.00000E+00
Surface No. 21

K = 0.00000E+00, A4 = -6.63149E-05, A6 = 2.08287E-05,
A8 = -1.52882E-06 A10 = 0.00000E+00, A12 = 0.00000E+00,
A14 = 0.00000E+00

TABLE 6

(Various data)

Zooming ratio 9.39159

| | Wide-angle limit | Middle position | Telephoto limit |
|---|---|---|---|
| Focal length | 4.6450 | 14.2411 | 43.6237 |
| F-number | 2.40348 | 3.41386 | 4.57845 |
| Half-view angle | 42.5499 | 15.1048 | 5.0138 |
| Image height | 3.7000 | 3.9020 | 3.9020 |
| Overall length of lens system | 42.8050 | 44.7925 | 53.9765 |
| BF | 0.77744 | 0.76167 | 0.74695 |
| d4 | 0.3001 | 8.7237 | 17.4211 |
| d10 | 17.0211 | 5.5104 | 0.3000 |
| d19 | 2.5007 | 4.2219 | 13.0968 |
| d21 | 3.2664 | 6.6355 | 3.4723 |
| Entrance pupil position | 6.9221 | 24.0722 | 67.3514 |
| Exit pupil position | 9.9739 | -32.8631 | -45.0331 |
| Front principal points position | 13.9132 | 32.2818 | 69.4062 |
| Back principal points position | 38.1601 | 30.5514 | 10.3528 |

Single lens data

| Lens element | Initial surface number | Focal length |
|---|---|---|
| 1 | 1 | -65.8192 |
| 2 | 3 | 22.4263 |
| 3 | 5 | -6.6164 |
| 4 | 7 | -20.4697 |
| 5 | 9 | 18.6879 |
| 6 | 12 | 8.2744 |
| 7 | 14 | 4.8482 |
| 8 | 16 | -2.8356 |
| 9 | 18 | 30.6530 |
| 10 | 20 | 30.0000 |

TABLE 6-continued (Various data)

Zoom lens unit data

| Lens unit | Initial surface No. | Focal length | Overall length of lens unit | Front principal points position | Back principal points position |
|---|---|---|---|---|---|
| 1 | 1 | 34.82157 | 4.25480 | -0.10165 | 1.51673 |
| 2 | 5 | -7.26682 | 5.38890 | -0.18610 | 0.30059 |
| 3 | 11 | 10.17703 | 7.26600 | -3.19460 | 0.57446 |
| 4 | 20 | 30.00002 | 1.24960 | -0.41847 | 0.05852 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | -0.29417 | -0.44639 | -0.95847 |
| 3 | 11 | -0.56096 | -1.31524 | -1.62870 |
| 4 | 20 | 0.80836 | 0.69658 | 0.80251 |

NUMERICAL EXAMPLE 3

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows various data.

TABLE 7

(Surface data)

| Surface number | r | d | nd | vd |
|---|---|---|---|---|
| Object surface | ∞ | | | |
| 1 | 32.98660 | 0.65000 | 1.84666 | 23.8 |
| 2 | 19.29210 | 0.01000 | 1.56732 | 42.8 |
| 3 | 19.29210 | 2.88350 | 1.49700 | 81.6 |
| 4 | 186.62540 | 0.15000 | | |
| 5 | 22.85250 | 2.12650 | 1.80420 | 46.5 |
| 6 | 113.68470 | Variable | | |
| 7* | -56.70780 | 0.30000 | 1.80470 | 41.0 |
| 8* | 5.58800 | 3.50600 | | |
| 9* | -11.53190 | 0.40000 | 1.77200 | 50.0 |
| 10 | -150.26040 | 0.15000 | | |
| 11 | 22.72440 | 1.09220 | 1.94595 | 18.0 |
| 12 | -50.17290 | Variable | | |
| 13(Diaphragm) | ∞ | 0.00000 | | |
| 14* | 5.47000 | 3.42540 | 1.51845 | 70.0 |
| 15* | -27.25050 | 1.17550 | | |
| 16 | 9.08990 | 1.96990 | 1.74400 | 44.7 |
| 17 | -6.53250 | 0.01000 | 1.56732 | 42.8 |
| 18 | -6.53250 | 0.30000 | 1.90366 | 31.3 |
| 19 | 5.32010 | 1.12400 | | |
| 20 | 10.05270 | 1.22400 | 1.49700 | 81.6 |
| 21 | 58.52130 | Variable | | |
| 22* | 15.06450 | 1.53970 | 1.77200 | 50.0 |
| 23* | 89.61500 | Variable | | |
| 24 | ∞ | 0.78000 | 1.51680 | 64.2 |
| 25 | ∞ | (BF) | | |
| Image surface | ∞ | | | |

TABLE 8

(Aspherical data)

Surface No. 7

K = 0.00000E+00, A4 = -1.78054E-04, A6 = 4.87857E-05,
A8 = -1.92618E-06 A10 = 3.11771E-08, A12 = -1.98035E-10,
A14 = 0.00000E+00

TABLE 8-continued (Aspherical data)

Surface No. 8

K = 0.00000E+00, A4 = −6.15715E−04, A6 = 3.54329E−05,
A8 = 3.39574E−06 A10 = −3.24029E−07, A12 = 2.30597E−08,
A14 = −6.62002E−10

Surface No. 9

K = 0.00000E+00, A4 = −6.89382E−05, A6 = 4.47455E−06,
A8 = −8.95100E−07 A10 = 1.67335E−07, A12 = −7.34789E−09,
A14 = 1.12687E−10

Surface No. 14

K = 0.00000E+00, A4 = −1.83783E−04, A6 = 8.23332E−05,
A8 = −2.90236E−05 A10 = 5.73502E−06, A12 = −4.54757E−07,
A14 = 9.77076E−09

Surface No. 15

K = 0.00000E+00, A4 = 9.56808E−04, A6 = 4.66025E−05,
A8 = −2.44285E−06 A10 = 2.23228E−07, A12 = 2.13081E−07,
A14 = −2.40496E−08

Surface No. 22

K = 0.00000E+00, A4 = −6.66750E−05, A6 = 1.44621E−05,
A8 = −6.43388E−07 A10 = 5.48989E−09, A12 = 0.00000E+00,
A14 = 0.00000E+00

Surface No. 23

K = 0.00000E+00, A4 = −2.27364E−05, A6 = 6.22248E−06,
A8 = −3.33711E−07 A10 = 0.00000E+00, A12 = 0.00000E+00,
A14 = 0.00000E+00

TABLE 9

(Various data)

Zooming ratio 11.28083

| | Wide-angle limit | Middle position | Telephoto limit |
|---|---|---|---|
| Focal length | 4.6450 | 15.5999 | 52.3994 |
| F-number | 3.22157 | 4.34379 | 5.85721 |
| Half-view angle | 42.5970 | 13.8787 | 4.1805 |
| Image height | 3.7000 | 3.9020 | 3.9020 |
| Overall length of lens system | 48.2367 | 51.3826 | 59.4444 |
| BF | 0.77545 | 0.75181 | 0.74337 |
| d6 | 0.4906 | 8.9958 | 16.5000 |
| d12 | 17.6570 | 5.6905 | 0.3000 |
| d21 | 3.8367 | 6.4278 | 16.0843 |
| d23 | 2.6602 | 6.7000 | 3.0000 |
| Entrance pupil position | 8.0530 | 27.1025 | 73.7442 |
| Exit pupil position | 9.1198 | −82.0690 | −304.0824 |
| Front principal points position | 15.2837 | 39.7640 | 117.1362 |
| Back principal points position | 43.5917 | 35.7827 | 7.0450 |

Single lens data

| Lens element | Initial surface number | Focal length |
|---|---|---|
| 1 | 1 | −56.1068 |
| 2 | 3 | 43.0464 |
| 3 | 5 | 35.1984 |
| 4 | 7 | −6.3078 |
| 5 | 9 | −16.1997 |
| 6 | 11 | 16.6555 |
| 7 | 14 | 9.1126 |
| 8 | 16 | 5.3992 |

TABLE 9-continued (Various data)

| | | |
|---|---|---|
| 9 | 18 | −3.2062 |
| 10 | 20 | 24.2190 |
| 11 | 22 | 23.2476 |

Zoom lens unit data

| Lens unit | Initial surface No. | Focal length | Overall length of lens unit | Front principal points position | Back principal points position |
|---|---|---|---|---|---|
| 1 | 1 | 30.43445 | 5.82000 | 1.47940 | 3.65346 |
| 2 | 7 | −6.56017 | 5.44820 | −0.08374 | 0.46328 |
| 3 | 13 | 10.92688 | 9.22880 | −2.97444 | 1.41732 |
| 4 | 22 | 23.24756 | 1.53970 | −0.17401 | 0.50453 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.30798 | −0.51269 | −1.23976 |
| 3 | 13 | −0.63084 | −1.63147 | −1.79813 |
| 4 | 22 | 0.78557 | 0.61281 | 0.77233 |

NUMERICAL EXAMPLE 4

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows various data.

TABLE 10

(Surface data)

| Surface number | r | d | nd | vd |
|---|---|---|---|---|
| Object surface | ∞ | | | |
| 1 | 36.53130 | 0.65000 | 1.84666 | 23.8 |
| 2 | 20.60560 | 0.01000 | 1.56732 | 42.8 |
| 3 | 20.60560 | 3.69600 | 1.49700 | 81.6 |
| 4 | 495.95260 | 0.15000 | | |
| 5 | 23.57650 | 2.56190 | 1.80420 | 46.5 |
| 6 | 118.98210 | Variable | | |
| 7* | −31.36170 | 0.30000 | 1.80470 | 41.0 |
| 8* | 5.89080 | 3.39080 | | |
| 9* | −12.80210 | 0.40000 | 1.77200 | 50.0 |
| 10 | 325.88280 | 0.15000 | | |
| 11 | 19.13470 | 1.14430 | 1.94595 | 18.0 |
| 12 | −70.46300 | Variable | | |
| 13(Diaphragm) | ∞ | 0.00000 | | |
| 14* | 5.72660 | 3.42480 | 1.51845 | 70.0 |
| 15* | −31.26490 | 1.37100 | | |
| 16 | 8.94370 | 2.05870 | 1.74400 | 44.7 |
| 17 | −6.23260 | 0.01000 | 1.56732 | 42.8 |
| 18 | −6.23260 | 0.30000 | 1.90366 | 31.3 |
| 19 | 5.56600 | 1.09310 | | |
| 20 | 11.24320 | 1.15270 | 1.49700 | 81.6 |
| 21 | 65.75400 | Variable | | |
| 22* | 14.74060 | 1.59400 | 1.77200 | 50.0 |
| 23* | 93.11780 | Variable | | |
| 24 | ∞ | 0.78000 | 1.51680 | 64.2 |
| 25 | ∞ | (BF) | | |
| Image surface | ∞ | | | |

TABLE 11

(Aspherical data)

Surface No. 7

$K = 0.00000E+00, A4 = -8.58774E-05, A6 = 4.93898E-05,$
$A8 = -1.93244E-06\ A10 = 3.10404E-08, A12 = -1.96085E-10,$
$A14 = 0.00000E+00$

Surface No. 8

$K = 0.00000E+00, A4 = -6.32340E-04, A6 = 3.47251E-05,$
$A8 = 3.55755E-06\ A10 = -3.27972E-07, A12 = 2.35443E-08,$
$A14 = -6.48041E-10$

Surface No. 9

$K = 0.00000E+00, A4 = -1.52455E-04, A6 = -1.19476E-06,$
$A8 = -6.60745E-07\ A10 = 1.65320E-07, A12 = -7.45618E-09,$
$A14 = 1.09719E-10$

Surface No. 14

$K = 0.00000E+00, A4 = -1.66766E-04, A6 = 9.35994E-05,$
$A8 = -3.19597E-05\ A10 = 5.97000E-06, A12 = -4.56658E-07,$
$A14 = 9.85421E-09$

Surface No. 15

$K = 0.00000E+00, A4 = 7.92875E-04, A6 = 4.44402E-05,$
$A8 = -3.65432E-06\ A10 = 2.43466E-07, A12 = 2.14983E-07,$
$A14 = -2.39062E-08$

Surface No. 22

$K = 0.00000E+00, A4 = -5.26996E-05, A6 = 1.71711E-05,$
$A8 = -5.23359E-07\ A10 = 5.54034E-09, A12 = 0.00000E+00,$
$A14 = 0.00000E+00$

Surface No. 23

$K = 0.00000E+00, A4 = -2.22035E-05, A6 = 1.08471E-05,$
$A8 = -2.27154E-07\ A10 = 0.00000E+00, A12 = 0.00000E+00,$
$A14 = 0.00000E+00$

TABLE 12

(Various data)

Zooming ratio 13.13225

| | Wide-angle limit | Middle position | Telephoto limit |
|---|---|---|---|
| Focal length | 4.6449 | 16.7994 | 60.9984 |
| F-number | 3.24252 | 4.33845 | 5.88945 |
| Half-view angle | 42.3856 | 12.8500 | 3.5930 |
| Image height | 3.7000 | 3.9020 | 3.9020 |
| Overall length of lens system | 51.2734 | 55.7916 | 62.8055 |
| BF | 0.77607 | 0.74365 | 0.74673 |
| d6 | 0.6275 | 10.4291 | 17.5772 |
| d12 | 18.6962 | 6.6413 | 0.3000 |
| d21 | 3.9936 | 7.0403 | 16.8915 |
| d23 | 2.9427 | 6.7000 | 3.0528 |
| Entrance pupil position | 9.0743 | 33.4049 | 88.1132 |
| Exit pupil position | 8.5390 | -167.7650 | -6439.5354 |
| Front principal points position | 16.4985 | 48.5294 | 148.5338 |
| Back principal points position | 46.6284 | 38.9923 | 1.8071 |

Single lens data

| Lens element | Initial surface number | Focal length |
|---|---|---|
| 1 | 1 | -56.8912 |
| 2 | 3 | 43.1460 |
| 3 | 5 | 36.1290 |
| 4 | 7 | -6.1408 |
| 5 | 9 | -15.9480 |

TABLE 12-continued (Various data)

| | | |
|---|---|---|
| 6 | 11 | 16.0075 |
| 7 | 14 | 9.6404 |
| 8 | 16 | 5.2400 |
| 9 | 18 | -3.2149 |
| 10 | 20 | 27.0980 |
| 11 | 22 | 22.4859 |

Zoom lens unit data

| Lens unit | Initial surface No. | Focal length | Overall length of lens unit | Front principal points position | Back principal points position |
|---|---|---|---|---|---|
| 1 | 1 | 30.85080 | 7.06790 | 1.98462 | 4.61364 |
| 2 | 7 | -6.44428 | 5.38510 | -0.09673 | 0.49650 |
| 3 | 13 | 11.35332 | 9.41030 | -3.26879 | 1.37313 |
| 4 | 22 | 22.48587 | 1.59400 | -0.16769 | 0.53466 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | -0.30083 | -0.55459 | -1.44109 |
| 3 | 13 | -0.65454 | -1.63923 | -1.80281 |
| 4 | 22 | 0.76464 | 0.59898 | 0.76105 |

NUMERICAL EXAMPLE 5

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows various data.

TABLE 13

(Surface data)

| Surface number | r | d | nd | vd |
|---|---|---|---|---|
| Object surface | ∞ | | | |
| 1 | 34.09060 | 0.65000 | 1.84666 | 23.8 |
| 2 | 19.49590 | 0.01000 | 1.56732 | 42.8 |
| 3 | 19.49590 | 2.44880 | 1.49700 | 81.6 |
| 4 | 108.72980 | 0.15000 | | |
| 5 | 21.78740 | 1.93480 | 1.80420 | 46.5 |
| 6 | 107.26760 | Variable | | |
| 7* | 226.21220 | 0.30000 | 1.80470 | 41.0 |
| 8* | 5.31320 | 3.75900 | | |
| 9* | -11.38950 | 0.40000 | 1.77200 | 50.0 |
| 10 | -86.57080 | 0.15000 | | |
| 11 | 26.72740 | 1.07590 | 1.94595 | 18.0 |
| 12 | -43.48240 | Variable | | |
| 13(Diaphragm) | ∞ | 0.00000 | | |
| 14* | 5.39480 | 2.26460 | 1.51845 | 70.0 |
| 15* | -22.40410 | 0.55810 | | |
| 16 | 6.63210 | 2.11530 | 1.74400 | 44.7 |
| 17 | -8.04460 | 0.01000 | 1.56732 | 42.8 |
| 18 | -8.04460 | 0.30000 | 1.90366 | 31.3 |
| 19 | 4.37760 | 1.28410 | | |
| 20 | 17.49510 | 0.94390 | 1.49700 | 81.6 |
| 21 | -38.81860 | Variable | | |
| 22 | -45.42900 | 0.30000 | 1.90715 | 35.4 |
| 23* | 45.42900 | Variable | | |
| 24* | 13.42830 | 1.68010 | 1.77200 | 50.0 |
| 25* | 164.09720 | Variable | | |
| 26 | ∞ | 0.78000 | 1.51680 | 64.2 |
| 27 | ∞ | (BF) | | |
| Image surface | ∞ | | | |

TABLE 14

(Aspherical data)

Surface No. 7

K = 0.00000E+00, A4 = −4.00321E−04, A6 = 4.98170E−05,
A8 = −1.89114E−06 A10 = 3.10475E−08, A12 = −1.99601E−10,
A14 = 0.00000E+00
Surface No. 8

K = 0.00000E+00, A4 = −6.99056E−04, A6 = 3.31724E−05,
A8 = 3.05555E−06 A10 = −3.30343E−07, A12 = 1.83075E−08,
A14 = −4.71629E−10
Surface No. 9

K = 0.00000E+00, A4 = −5.01540E−06, A6 = 1.33919E−05,
A8 = −1.84607E−06 A10 = 1.72431E−07, A12 = −6.04585E−09,
A14 = 7.25462E−11
Surface No. 14

K = 0.00000E+00, A4 = −2.48823E−05, A6 = 8.72076E−05,
A8 = −2.47595E−05 A10 = 5.77557E−06, A12 = −4.54685E−07,
A14 = 9.77076E−09
Surface No. 15

K = 0.00000E+00, A4 = 1.00098E−03, A6 = 7.10112E−05,
A8 = −3.23801E−06 A10 = 8.13026E−07, A12 = 2.13081E−07,
A14 = −2.40496E−08
Surface No. 23

K = 0.00000E+00, A4 = 1.04453E−04, A6 = 9.06780E−06,
A8 = −7.08667E−08 A10 = −1.91277E−08, A12 = 0.00000E+00,
A14 = 0.00000E+00
Surface No. 24

K = 0.00000E+00, A4 = −5.17281E−05, A6 = −1.07031E−06,
A8 = −7.28533E−07 A10 = 2.51487E−09, A12 = 0.00000E+00,
A14 = 0.00000E+00
Surface No. 25

K = 0.00000E+00, A4 = 1.61721E−05, A6 = −1.47876E−05,
A8 = −3.54720E−07 A10 = 0.00000E+00, A12 = 0.00000E+00,
A14 = 0.00000E+00

TABLE 15

(Various data)

Zooming ratio 9.39186

|  | Wide-angle limit | Middle position | Telephoto limit |
|---|---|---|---|
| Focal length | 4.6449 | 14.2407 | 43.6245 |
| F-number | 3.20683 | 4.23507 | 5.83306 |
| Half-view angle | 42.6300 | 15.0486 | 5.0149 |
| Image height | 3.7000 | 3.9020 | 3.9020 |
| Overall length of lens system | 45.6712 | 46.2980 | 54.2910 |
| BF | 0.76810 | 0.77191 | 0.74951 |
| d6 | 0.3000 | 8.4080 | 15.7445 |
| d12 | 17.5838 | 5.6751 | 0.4137 |
| d21 | 0.9587 | 2.5673 | 4.5000 |
| d23 | 2.1000 | 1.6426 | 8.2315 |
| d25 | 2.8460 | 6.1185 | 3.5372 |
| Entrance pupil position | 7.4845 | 24.2561 | 60.8988 |
| Exit pupil position | 9.9637 | −33.7302 | −81.9963 |
| Front principal points position | 14.4758 | 32.6190 | 81.5239 |
| Back principal points position | 41.0263 | 32.0573 | 10.6665 |

TABLE 15-continued (Various data)

Single lens data

| Lens element | Initial surface number | Focal length |
|---|---|---|
| 1 | 1 | −54.9075 |
| 2 | 3 | 47.3663 |
| 3 | 5 | 33.6577 |
| 4 | 7 | −6.7656 |
| 5 | 9 | −17.0277 |
| 6 | 11 | 17.6301 |
| 7 | 14 | 8.6262 |
| 8 | 16 | 5.2061 |
| 9 | 18 | −3.1016 |
| 10 | 20 | 24.4012 |
| 11 | 22 | −25.0000 |
| 12 | 24 | 18.8528 |

Zoom lens unit data

| Lens unit | Initial surface No. | Focal length | Overall length of lens unit | Front principal points position | Back principal points position |
|---|---|---|---|---|---|
| 1 | 1 | 31.55091 | 5.19360 | 1.27528 | 3.22895 |
| 2 | 7 | −7.01843 | 5.68490 | −0.07928 | 0.43656 |
| 3 | 13 | 9.61320 | 7.47600 | −2.06466 | 1.08534 |
| 4 | 22 | −25.00003 | 0.30000 | 0.07853 | 0.22147 |
| 5 | 24 | 18.85283 | 1.68010 | −0.08409 | 0.65245 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.31406 | −0.49290 | −1.01678 |
| 3 | 13 | −0.47177 | −0.98867 | −1.18115 |
| 4 | 22 | 1.36765 | 1.67571 | 1.66652 |
| 5 | 24 | 0.72651 | 0.55273 | 0.69084 |

NUMERICAL EXAMPLE 6

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows various data.

TABLE 16

(Surface data)

| Surface number | r | d | nd | vd |
|---|---|---|---|---|
| Object surface | ∞ |  |  |  |
| 1 | 27.36560 | 0.65000 | 1.84666 | 23.8 |
| 2 | 17.50700 | 0.01000 | 1.56732 | 42.8 |
| 3 | 17.50700 | 2.31140 | 1.49700 | 81.6 |
| 4 | 66.55860 | 0.15000 |  |  |
| 5 | 22.99430 | 1.70060 | 1.80420 | 46.5 |
| 6 | 116.77250 | Variable |  |  |
| 7* | 423.06520 | 0.30000 | 1.80470 | 41.0 |
| 8* | 5.38070 | 3.51300 |  |  |
| 9* | −13.49680 | 0.40000 | 1.77200 | 50.0 |
| 10 | 165.15700 | 0.15000 |  |  |
| 11 | 17.77750 | 1.08830 | 1.94595 | 18.0 |
| 12 | −142.52680 | Variable |  |  |
| 13(Diaphragm) | ∞ | 0.00000 |  |  |
| 14* | 5.18600 | 2.17260 | 1.51845 | 70.0 |
| 15* | −22.50980 | 0.70730 |  |  |
| 16 | 7.26580 | 2.07390 | 1.74400 | 44.7 |
| 17 | −6.83130 | 0.01000 | 1.56732 | 42.8 |
| 18 | −6.83130 | 0.30000 | 1.90366 | 31.3 |

TABLE 16-continued (Surface data)

| Surface number | r | d | nd | vd |
|---|---|---|---|---|
| 19 | 4.41440 | 1.27610 | | |
| 20 | 13.96520 | 0.86220 | 1.49700 | 81.6 |
| 21 | 145.93880 | Variable | | |
| 22 | 139.69450 | 0.30000 | 1.69878 | 47.1 |
| 23 | −139.69450 | Variable | | |
| 24* | 19.69770 | 1.29890 | 1.77200 | 50.0 |
| 25* | 126.90490 | Variable | | |
| 26 | ∞ | 0.78000 | 1.51680 | 64.2 |
| 27 | ∞ | (BF) | | |
| Image surface | ∞ | | | |

TABLE 17

(Aspherical data)

Surface No. 7

K = 0.00000E+00, A4 = −3.88394E−04, A6 = 4.99032E−05,
A8 = −1.89039E−06 A10 = 3.10733E−08, A12 = −1.98706E−10,
A14 = 0.00000E+00

Surface No. 8

K = 0.00000E+00, A4 = −7.25095E−04, A6 = 3.40011E−05,
A8 = 2.96023E−06 A10 = −3.26939E−07, A12 = 1.83618E−08,
A14 = −4.65100E−10

Surface No. 9

K = 0.00000E+00, A4 = −6.24673E−05, A6 = 1.03630E−05,
A8 = −1.79004E−06 A10 = 1.74942E−07, A12 = −6.10851E−09,
A14 = 6.48782E−11

Surface No. 14

K = 0.00000E+00, A4 = −9.96181E−05, A6 = 9.15266E−05,
A8 = −2.37780E−05 A10 = 5.74371E−06, A12 = −4.54685E−07,
A14 = 9.77076E−09

Surface No. 15

K = 0.00000E+00, A4 = 1.01627E−03, A6 = 7.72953E−05,
A8 = −1.86830E−06 A10 = 8.22156E−07, A12 = 2.13081E−07,
A14 = −2.40496E−08

Surface No. 24

K = 0.00000E+00, A4 = −6.15277E−05, A6 = −2.15138E−06,
A8 = −9.97641E−07 A10 = 3.46774E−09, A12 = 0.00000E+00,
A14 = 0.00000E+00

Surface No. 25

K = 0.00000E+00, A4 = 1.92574E−05, A6 = −1.75853E−05,
A8 = −4.83897E−07 A10 = 0.00000E+00, A12 = 0.00000E+00,
A14 = 0.00000E+00

TABLE 18

(Various data)

Zooming ratio 9.39168

| | Wide-angle limit | Middle position | Telephoto limit |
|---|---|---|---|
| Focal length | 4.6449 | 14.2406 | 43.6233 |
| F-number | 3.19972 | 4.26584 | 5.82401 |
| Half-view angle | 42.5729 | 15.0788 | 5.0149 |
| Image height | 3.7000 | 3.9020 | 3.9020 |
| Overall length of lens system | 44.1001 | 45.9749 | 54.9776 |
| BF | 0.77494 | 0.75804 | 0.75192 |
| d6 | 0.3000 | 8.2464 | 15.8375 |
| d12 | 16.7452 | 5.3138 | 0.3000 |
| d21 | 1.2038 | 2.5000 | 4.6538 |
| d23 | 2.4727 | 2.5296 | 10.3801 |
| d25 | 2.5492 | 6.5728 | 3.0000 |
| Entrance pupil position | 7.1777 | 23.3643 | 60.5395 |
| Exit pupil position | 9.5663 | −43.4130 | −70.1216 |
| Front principal points position | 14.2767 | 33.0138 | 77.3123 |
| Back principal points position | 39.4553 | 31.7343 | 11.3543 |

Single lens data

| Lens element | Initial surface number | Focal length |
|---|---|---|
| 1 | 1 | −59.1863 |
| 2 | 3 | 47.0616 |
| 3 | 5 | 35.3182 |
| 4 | 7 | −6.7749 |
| 5 | 9 | −16.1464 |
| 6 | 11 | 16.7645 |
| 7 | 14 | 8.3536 |
| 8 | 16 | 5.0493 |
| 9 | 18 | −2.9303 |
| 10 | 20 | 31.0053 |
| 11 | 22 | 100.0000 |
| 12 | 24 | 30.0446 |

Zoom lens unit data

| Lens unit | Initial surface No. | Focal length | Overall length of lens unit | Front principal points position | Back principal points position |
|---|---|---|---|---|---|
| 1 | 1 | 31.79584 | 4.82200 | 0.97100 | 2.76922 |
| 2 | 7 | −6.89612 | 5.45130 | 0.01312 | 0.65991 |
| 3 | 13 | 10.42079 | 7.40210 | −3.18120 | 0.56003 |
| 4 | 22 | 100.00002 | 0.30000 | 0.08834 | 0.21166 |
| 5 | 24 | 30.04459 | 1.29890 | −0.13397 | 0.43576 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.30603 | −0.47274 | −0.98568 |
| 3 | 13 | −0.61512 | −1.56482 | −2.01062 |
| 4 | 22 | 0.91999 | 0.85254 | 0.83480 |
| 5 | 24 | 0.84352 | 0.71016 | 0.82928 |

NUMERICAL EXAMPLE 7

The zoom lens system of Numerical Example 7 corresponds to Embodiment 7 shown in FIG. 19. Table 19 shows the surface data of the zoom lens system of Numerical Example 7. Table 20 shows the aspherical data. Table 21 shows various data.

TABLE 19

(Surface data)

| Surface number | r | d | nd | vd |
|---|---|---|---|---|
| Object surface | ∞ | | | |
| 1 | 35.13230 | 0.65000 | 1.84666 | 23.8 |
| 2 | 20.03470 | 0.01000 | 1.56732 | 42.8 |
| 3 | 20.03470 | 2.45180 | 1.49700 | 81.6 |
| 4 | 123.44660 | 0.15000 | | |
| 5 | 20.37390 | 2.07020 | 1.80420 | 46.5 |
| 6 | 76.91630 | Variable | | |
| 7* | 165.08270 | 0.30000 | 1.80470 | 41.0 |
| 8* | 5.33090 | 3.68440 | | |

TABLE 19-continued (Surface data)

| Surface number | r | d | nd | vd |
|---|---|---|---|---|
| 9* | −10.47890 | 0.40000 | 1.77200 | 50.0 |
| 10 | −64.17700 | 0.15000 | | |
| 11 | 28.22460 | 1.05370 | 1.94595 | 18.0 |
| 12 | −39.00710 | Variable | | |
| 13(Diaphragm) | ∞ | 0.00000 | | |
| 14* | 5.16230 | 2.41130 | 1.51845 | 70.0 |
| 15* | −24.91140 | 0.74930 | | |
| 16 | 7.15140 | 2.09050 | 1.74400 | 44.7 |
| 17 | −6.58510 | 0.01000 | 1.56732 | 42.8 |
| 18 | −6.58510 | 0.30000 | 1.90366 | 31.3 |
| 19 | 4.41910 | 1.27510 | | |
| 20 | 12.15630 | 0.88220 | 1.49700 | 81.6 |
| 21 | 64.76980 | Variable | | |
| 22* | 19.74400 | 1.20050 | 1.77200 | 50.0 |
| 23* | 72.01610 | Variable | | |
| 24* | 48.62150 | 1.00000 | 1.48786 | 70.3 |
| 25 | −48.62150 | Variable | | |
| 26 | ∞ | 0.78000 | 1.51680 | 64.2 |
| 27 | ∞ | (BF) | | |
| Image surface | ∞ | | | |

TABLE 20

(Aspherical data)

Surface No. 7

K = 0.00000E+00, A4 = −4.08575E−04, A6 = 4.96900E−05,
A8 = −1.89373E−06 A10 = 3.10661E−08, A12 = −1.98167E−10,
A14 = 0.00000E+00
Surface No. 8

K = 0.00000E+00, A4 = −6.80426E−04, A6 = 2.69976E−05,
A8 = 3.43955E−06 A10 = −3.38451E−07, A12 = 1.82942E−08,
A14 = −4.71760E−10
Surface No. 9

K = 0.00000E+00, A4 = 3.73019E−06, A6 = 1.28953E−05,
A8 = −1.73323E−06 A10 = 1.69941E−07, A12 = −6.09688E−09,
A14 = 7.13836E−11
Surface No. 14

K = 0.00000E+00, A4 = −3.84337E−05, A6 = 9.01694E−05,
A8 = −2.51217E−05 A10 = 5.73805E−06, A12 = −4.54685E−07,
A14 = 9.77076E−09
Surface No. 15

K = 0.00000E+00, A4 = 1.14168E−03, A6 = 7.41960E−05,
A8 = −2.50130E−06 A10 = 8.24987E−07, A12 = 2.13081E−07,
A14 = −2.40496E−08
Surface No. 22

K = 0.00000E+00, A4 = −9.61949E−05, A6 = −1.04964E−05,
A8 = −3.17950E−07 A10 = −1.18593E−08, A12 = 0.00000E+00,
A14 = 0.00000E+00
Surface No. 23

K = 0.00000E+00, A4 = −1.31920E−04, A6 = −1.02358E−05,
A8 = −4.94168E−07 A10 = 0.00000E+00, A12 = 0.00000E+00,
A14 = 0.00000E+00
Surface No. 24

K = 0.00000E+00, A4 = −6.75514E−04, A6 = 5.77171E−05,
A8 = −2.48485E−06 A10 = 6.06957E−08, A12 = 0.00000E+00,
A14 = 0.00000E+00

TABLE 21

(Various data)

Zooming ratio 9.39173

| | Wide-angle limit | Middle position | Telephoto limit |
|---|---|---|---|
| Focal length | 4.6450 | 14.2412 | 43.6250 |
| F-number | 3.20080 | 4.26732 | 5.81510 |
| Half-view angle | 42.7385 | 15.0377 | 5.0098 |
| Image height | 3.7000 | 3.9020 | 3.9020 |
| Overall length of lens system | 44.7349 | 46.6754 | 54.7598 |
| BF | 0.77338 | 0.76409 | 0.74452 |
| d6 | 0.3581 | 8.5800 | 15.8330 |
| d12 | 16.5784 | 5.5630 | 0.3000 |
| d21 | 2.5197 | 3.0714 | 13.3706 |
| d23 | 1.8844 | 5.7064 | 2.3404 |
| d25 | 1.0019 | 1.3715 | 0.5523 |
| Entrance pupil position | 7.6861 | 25.1824 | 63.1594 |
| Exit pupil position | 9.3709 | −62.0134 | −202.3563 |
| Front principal points position | 14.8407 | 36.1929 | 97.4140 |
| Back principal points position | 40.0898 | 32.4342 | 11.1348 |

Single lens data

| Lens element | Initial surface number | Focal length |
|---|---|---|
| 1 | 1 | −56.1732 |
| 2 | 3 | 47.7455 |
| 3 | 5 | 33.9097 |
| 4 | 7 | −6.8515 |
| 5 | 9 | −16.2754 |
| 6 | 11 | 17.4443 |
| 7 | 14 | 8.4801 |
| 8 | 16 | 4.9278 |
| 9 | 18 | −2.8890 |
| 10 | 20 | 29.9441 |
| 11 | 22 | 34.8862 |
| 12 | 24 | 50.0000 |

Zoom lens unit data

| Lens unit | Initial surface No. | Focal length | Overall length of lens unit | Front principal points position | Back principal points position |
|---|---|---|---|---|---|
| 1 | 1 | 31.46718 | 5.33200 | 1.17189 | 3.20003 |
| 2 | 7 | −6.97759 | 5.58810 | −0.04159 | 0.48197 |
| 3 | 13 | 10.28493 | 7.71840 | −3.23322 | 0.73114 |
| 4 | 22 | 34.88620 | 1.20050 | −0.25336 | 0.27637 |
| 5 | 24 | 50.00000 | 1.00000 | 0.33719 | 0.66281 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.31657 | −0.50492 | −1.06265 |
| 3 | 13 | −0.59269 | −1.34414 | −1.63764 |
| 4 | 22 | 0.83036 | 0.70921 | 0.83241 |
| 5 | 24 | 0.94747 | 0.94026 | 0.95704 |

NUMERICAL EXAMPLE 8

The zoom lens system of Numerical Example 8 corresponds to Embodiment 8 shown in FIG. 22. Table 22 shows the surface data of the zoom lens system of Numerical Example 8. Table 23 shows the aspherical data. Table 24 shows various data.

TABLE 22

(Surface data)

| Surface number | r | d | nd | vd |
|---|---|---|---|---|
| Object surface | ∞ | | | |
| 1 | 26.52200 | 0.65000 | 1.84666 | 23.8 |
| 2 | 17.32350 | 0.01000 | 1.56732 | 42.8 |
| 3 | 17.32350 | 2.46240 | 1.49700 | 81.6 |
| 4 | 61.07240 | 0.15000 | | |
| 5 | 21.02000 | 1.99660 | 1.80420 | 46.5 |
| 6 | 81.41130 | Variable | | |
| 7* | 308.54550 | 0.30000 | 1.80470 | 41.0 |
| 8* | 5.28620 | 3.58240 | | |
| 9* | −13.42040 | 0.40000 | 1.77200 | 50.0 |
| 10 | −648.30400 | 0.15000 | | |
| 11 | 20.44370 | 1.04240 | 1.94595 | 18.0 |
| 12 | −93.28300 | Variable | | |
| 13(Diaphragm) | ∞ | 0.00000 | | |
| 14* | 5.16880 | 3.02350 | 1.51845 | 70.0 |
| 15* | −19.58140 | 0.82300 | | |
| 16 | 7.38130 | 2.08110 | 1.74338 | 44.7 |
| 17 | −5.52350 | 0.01000 | 1.56732 | 42.8 |
| 18 | −5.52350 | 0.30000 | 1.90453 | 29.3 |
| 19* | 5.41140 | 1.13900 | | |
| 20 | −48.32330 | 0.90490 | 1.52625 | 52.4 |
| 21 | 58.13950 | Variable | | |
| 22* | 14.92940 | 2.13320 | 1.77200 | 50.0 |
| 23* | −47.83980 | Variable | | |
| 24 | ∞ | 0.78000 | 1.51680 | 64.2 |
| 25 | ∞ | (BF) | | |
| Image surface | ∞ | | | |

TABLE 23

(Aspherical data)

Surface No. 7

K = 0.00000E+00, A4 = −3.91513E−04, A6 = 4.98664E−05,
A8 = −1.89044E−06 A10 = 3.10698E−08, A12 = −1.99335E−10,
A14 = 0.00000E+00

Surface No. 8

K = 0.00000E+00, A4 = −7.40892E−04, A6 = 3.46511E−05,
A8 = 3.10370E−06 A10 = −3.29090E−07, A12 = 1.82092E−08,
A14 = −4.80007E−10

Surface No. 9

K = 0.00000E+00, A4 = 1.10557E−05, A6 = 9.63559E−06,
A8 = −1.78891E−06 A10 = 1.74520E−07, A12 = −6.09446E−09,
A14 = 6.73871E−11

Surface No. 14

K = 0.00000E+00, A4 = −1.09054E−04, A6 = 7.98463E−05,
A8 = −2.54906E−05 A10 = 5.45100E−06, A12 = −4.54685E−07,
A14 = 9.77076E−09

Surface No. 15

K = 0.00000E+00, A4 = 1.08055E−03, A6 = 5.91226E−05,
A8 = −4.56934E−06 A10 = 7.60109E−07, A12 = 2.13081E−07,
A14 = −2.40496E−08

Surface No. 19

K = 0.00000E+00, A4 = 5.19188E−04, A6 = 5.37414E−05,
A8 = −6.41731E−07 A10 = −5.83048E−07, A12 = 0.00000E+00,
A14 = 0.00000E+00

Surface No. 22

K = 0.00000E+00, A4 = 4.86875E−06, A6 = 3.83391E−06,
A8 = −7.12995E−07 A10 = 8.21904E−10, A12 = 0.00000E+00,
A14 = 0.00000E+00

Surface No. 23

K = 0.00000E+00, A4 = 1.72646E−04, A6 = −1.23123E−05,
A8 = −2.90937E−07 A10 = 0.00000E+00, A12 = 0.00000E+00,
A14 = 0.00000E+00

TABLE 24

(Various data)

Zooming ratio 9.39159

| | Wide-angle limit | Middle position | Telephoto limit |
|---|---|---|---|
| Focal length | 4.6450 | 14.2410 | 43.6241 |
| F-number | 3.20252 | 4.26837 | 5.81038 |
| Half-view angle | 42.6783 | 15.2150 | 5.0176 |
| Image height | 3.7000 | 3.9020 | 3.9020 |
| Overall length of lens system | 43.8768 | 46.7180 | 55.9985 |
| BF | 0.77921 | 0.74823 | 0.76884 |
| d6 | 0.3693 | 8.4012 | 15.6921 |
| d12 | 16.0481 | 5.2222 | 0.3000 |
| d21 | 2.1709 | 4.8185 | 13.3777 |
| d23 | 2.5708 | 5.5894 | 3.9214 |
| Entrance pupil position | 7.7241 | 25.1267 | 64.4437 |
| Exit pupil position | 9.3660 | −91.4581 | 86.1051 |
| Front principal points position | 14.8819 | 37.1682 | 130.3686 |
| Back principal points position | 39.2318 | 32.4771 | 12.3744 |

Single lens data

| Lens element | Initial surface number | Focal length |
|---|---|---|
| 1 | 1 | −60.9702 |
| 2 | 3 | 47.7660 |
| 3 | 5 | 34.7237 |
| 4 | 7 | −6.6866 |
| 5 | 9 | −17.7563 |
| 6 | 11 | 17.8063 |
| 7 | 14 | 8.2310 |
| 8 | 16 | 4.5638 |
| 9 | 18 | −2.9831 |
| 10 | 20 | −50.0000 |
| 11 | 22 | 14.9605 |

Zoom lens unit data

| Lens unit | Initial surface No. | Focal length | Overall length of lens unit | Front principal points position | Back principal points position |
|---|---|---|---|---|---|
| 1 | 1 | 31.23752 | 5.26900 | 0.86635 | 2.85909 |
| 2 | 7 | −6.97011 | 5.47480 | −0.05130 | 0.52211 |
| 3 | 13 | 10.13775 | 8.28150 | −5.09894 | 0.80696 |
| 4 | 22 | 14.96050 | 2.13320 | 0.29063 | 1.20190 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 7 | −0.32360 | −0.51601 | −1.12119 |
| 3 | 13 | −0.67631 | −1.84156 | −2.11162 |
| 4 | 22 | 0.67945 | 0.47975 | 0.58987 |

The following Table 25 shows the corresponding values to the individual conditions in the zoom lens systems of the numerical examples. Here, in Table 25, $Y_W$ is an amount of movement of the third-b lens unit in a direction perpendicular to the optical axis at the time of maximum blur compensation with the focal length $f_W$ of the entire system at a wide-angle limit, and indicates a value obtained in a state that the zoom lens system is at a wide-angle limit. That is, a corresponding value $(Y_W/Y_T)/(f_W/f_T)$ at the time of $Y=Y_W$ ($f=f_W$) in the condition (13) was obtained.

TABLE 25

(Values corresponding to conditions)

| | | Numerical Example | | | | | | | |
|---|---|---|---|---|---|---|---|---|---|
| Condition | | 1 | 2 | 3 | 4 | 5 | 6 | 7 | 8 |
| (2) | $(D_2 + D_{3b} + D_B)/Ir$ | 2.02 | 1.96 | 2.14 | 2.12 | 2.25 | 2.07 | 2.27 | 2.22 |
| (3) | $BF/Ir$ | 1.16 | 1.24 | 1.12 | 1.25 | 1.26 | 1.12 | 0.48 | 1.36 |
| (a)' | $f_T/f_W$ | 9.4 | 9.4 | 11.3 | 13.1 | 9.4 | 9.4 | 9.4 | 9.4 |
| (4) | $L_T/D$ | 2.82 | 2.97 | 2.70 | 2.68 | 2.67 | 2.85 | 2.63 | 2.65 |
| (5) | $D/Ir$ | 5.01 | 4.75 | 5.75 | 6.12 | 5.31 | 5.03 | 5.45 | 5.52 |
| (6) | $L_W/Ir$ | 11.43 | 11.18 | 12.59 | 13.39 | 11.93 | 11.52 | 11.70 | 11.45 |
| (7) | $L_T/Ir$ | 14.11 | 14.11 | 15.53 | 16.40 | 14.19 | 14.37 | 14.33 | 14.62 |
| (8) | $M_{12}/Ir$ | 4.07 | 4.47 | 4.18 | 4.42 | 4.03 | 4.06 | 4.05 | 4.00 |
| (9) | $M_{12} \times f_1/Ir^2$ | 33.72 | 40.71 | 33.20 | 35.64 | 33.25 | 33.71 | 33.29 | 32.62 |
| (10) | $|f_1/f_{3b}|$ | 1.12 | 1.14 | 1.26 | 1.14 | 1.29 | 1.03 | 1.05 | 0.62 |
| (11) | $|f_{3a}/f_{3b}|$ | 0.42 | 0.38 | 0.54 | 0.50 | 0.46 | 0.39 | 0.40 | 0.19 |
| (13) | $(Y_W/Y_T)/(f_W/f_T)$ | 2.11 | 2.10 | 2.12 | 2.10 | 2.12 | 2.11 | 2.09 | 2.15 |
| | $Ir = f_T \times \tan(\omega_T)$ | 3.83 | 3.83 | 3.83 | 3.83 | 3.83 | 3.83 | 3.82 | 3.83 |
| | $Y_W$ | 0.09 | 0.09 | 0.07 | 0.07 | 0.07 | 0.09 | 0.09 | −0.18 |
| | $Y_T$ | 0.38 | 0.42 | 0.36 | 0.46 | 0.32 | 0.41 | 0.41 | −0.79 |

The present disclosure is applicable to a digital input device such as a digital camera, a mobile terminal device such as a smart-phone, a Personal Digital Assistance, a surveillance camera in a surveillance system, a Web camera or a vehicle-mounted camera. In particular, the present disclosure is suitable for a photographing optical system where high image quality is desired like in a digital camera.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A zoom lens system comprising a plurality of lens units each composed of at least one lens element, the zoom lens system, in order from an object end to an image end thereof, comprising:
   a first lens unit having positive optical power;
   a second lens unit having negative optical power;
   a third lens unit having positive optical power; and
   one or more subsequent lens units, as being in an interval from the image end-ward side of the third lens unit to an image surface defining the image end of the zoom lens system; wherein
   in zooming from a wide-angle limit to a telephoto limit at a time of image taking, the first lens unit, the second lens unit, and the third lens unit are moved along an optical axis to perform magnification change, wherein
   two air spaces are included within the third lens unit, wherein
   the third lens unit consists of three lens elements separated from each other by the two air spaces, wherein
   the three lens elements constituting the third lens unit are, in order from the object end to the image end, a lens element having positive optical power, a cemented lens element having optical power, and a lens element having optical power, wherein a part of the third lens unit is a third-b lens unit that moves in a direction perpendicular to the optical axis to optically compensate image blur, and wherein the following conditions (2) and (3) are satisfied:

$$1.5 < (D_2 + D_{3b} + D_B)/Ir < 2.4 \quad (2)$$

$$BF/Ir < 1.45 \quad (3)$$

where,
$D_2$ is an optical axial thickness of the second lens unit,
$D_{3b}$ is an optical axial thickness of the third-b lens unit,
$D_B$ is the aggregate sum of the optical axial thicknesses of the one or more subsequent lens units in the interval from the image end-ward side of the third lens unit to the image surface,
BF is a shortest optical axial distance that is converted with air, between an apex of a most image side lens surface and the image surface,
Ir is a value represented by the following equation:

$$Ir = f_T \times \tan(\omega_T),$$

$f_T$ is a focal length of the zoom lens system at a telephoto limit,
$f_W$ is a focal length of the zoom lens system at a wide-angle limit, and
$\omega_T$ is a half view angle (°) at a telephoto limit.

2. The zoom lens system as claimed in claim 1, wherein the subsequent lens unit comprises a fourth lens unit having positive optical power.

3. The zoom lens system as claimed in claim 2, wherein the fourth lens unit moves along the optical axis in zooming from the wide-angle limit to the telephoto limit at the time of image taking.

4. The zoom lens system as claimed in claim 2, wherein the fourth lens unit moves along the optical axis to the object end in focusing from an infinity in-focus condition to a close-object in-focus condition.

5. The zoom lens system as claimed in claim 2, wherein the fourth lens unit is composed of two or less lens elements.

6. The zoom lens system as claimed in claim 1, wherein the one or more subsequent lens units comprise a fourth lens unit, and a fifth lens unit having positive optical power.

7. The zoom lens system as claimed in claim 6, wherein the fourth lens unit moves along the optical axis in zooming from the wide-angle limit to the telephoto limit at the time of image taking.

8. The zoom lens system as claimed in claim 6, wherein the fifth lens unit moves along the optical axis in zooming from the wide-angle limit to the telephoto limit at the time of image taking.

9. The zoom lens system as claimed in claim 6, wherein any of the fourth lens unit and the fifth lens unit move along the optical axis to the object end in focusing from an infinity in-focus condition to a close-object in-focus condition.

10. The zoom lens system as claimed in claim 6, wherein each of the fourth lens unit and the fifth lens unit is composed of two or less lens elements.

11. The zoom lens system as claimed in claim 1, wherein the following conditions (4) and (5) are satisfied:

$$1.5 < L_T/D < 3.0 \quad (4)$$

$$3.0 < D/Ir < 6.5 \quad (5)$$

where,
$L_T$ is an overall length of lens system (a distance from a most object side surface of the first lens unit to the image surface) at a telephoto limit,
D is an optical axial total thickness of the respective lens units.

12. The zoom lens system as claimed in claim 1, wherein the following conditions (6) and (7) are satisfied:

$$L_W/Ir < 14.0 \quad (6)$$

$$L_T/Ir < 17.0 \quad (7)$$

where,
$L_W$ is an overall length of lens system (a distance from a most object side surface of the first lens unit to the image surface) at a wide-angle limit,
$L_T$ is an overall length of lens system (a distance from a most object side surface of the first lens unit to the image surface) at a telephoto limit.

13. The zoom lens system as claimed in claim 1, wherein the following condition (8) is satisfied:

$$M_{12}/Ir < 4.7 \quad (8)$$

where,
$M_{12}$ is an amount of relative movement between the first lens unit and the second lens unit in zooming from the wide-angle limit to the telephoto limit at the time of image taking.

14. The zoom lens system as claimed in claim 1, wherein the following condition (9) is satisfied:

$$M_{12} \times f_1/Ir^2 < 44.0 \quad (9)$$

where,
$M_{12}$ is an amount of relative movement between the first lens unit and the second lens unit in zooming from the wide-angle limit to the telephoto limit at the time of image taking,
$f_1$ is a composite focal length of the first lens unit.

15. The zoom lens system as claimed in claim 1, wherein the following condition (10) is satisfied:

$$0.50 < |f_1/f_{3b}| < 1.50 \quad (10)$$

where,
$f_1$ is a composite focal length of the first lens unit, and
$f_{3b}$ is a composite focal length of the third-b lens unit.

16. The zoom lens system as claimed in claim 1, wherein the third lens unit further includes a third-a lens unit that, at the time of retracting, escapes along an axis different from that at the time of image taking, and wherein the following condition (11) is satisfied:

$$0.10 < |f_{3a}/f_{3b}| < 0.65 \quad (11)$$

where,
$f_{3a}$ is a composite focal length of the third-a lens unit, and
$f_{3b}$ is a composite focal length of the third-b lens unit.

17. The zoom lens system as claimed in claim 1, wherein the third-b lens unit is composed of one lens element.

18. The zoom lens system as claimed in claim 1, wherein the zoom lens system satisfies the following conditions (12) and (13):

$$|Y_T| > |Y| \quad (12)$$

$$1.5 < (Y/Y_T)/(f/f_T) < 3.0 \quad (13)$$

where,
f is a focal length of the zoom lens system,
Y is an amount of movement of the third-b lens unit in a direction perpendicular to the optical axis at the time of maximum blur compensation with the focal length f of the zoom lens system, and
$Y_T$ is an amount of movement of the third-b lens unit in a direction perpendicular to the optical axis at the time of maximum blur compensation with the focal length $f_T$ of the zoom lens system at a telephoto limit.

19. An imaging device capable of outputting an optical image of an object as an electric image signal, comprising:
a zoom lens system that forms the optical image of the object; and
an image sensor that converts the optical image formed by the zoom lens system into the electric image signal, wherein
the zoom lens system is a zoom lens system as claimed in claim 1.

20. A camera for converting an optical image of an object into an electric image signal and then performing at least one of displaying and storing of the converted image signal, comprising:
an imaging device including a zoom lens system that forms the optical image of the object, and an image sensor that converts the optical image formed by the zoom lens system into the electric image signal, wherein
the zoom lens system is a zoom lens system as claimed in claim 1.

* * * * *